US011593683B2

(12) United States Patent
Cerrahoğlu et al.

(10) Patent No.: US 11,593,683 B2
(45) Date of Patent: Feb. 28, 2023

(54) EVENT MODEL TRAINING USING IN SITU DATA

(71) Applicant: Lytt Limited, Middlesex (GB)

(72) Inventors: Çağri Cerrahoğlu, London (GB); Pradyumna Thiruvenkatanathan, London (GB)

(73) Assignee: LYTT LIMITED, Middlesex (GB)

( * ) Notice: Subject to any disclaimer, the term of this patent is extended or adjusted under 35 U.S.C. 154(b) by 0 days.

(21) Appl. No.: 17/351,217

(22) Filed: Jun. 17, 2021

(65) Prior Publication Data

US 2021/0397994 A1 Dec. 23, 2021

(30) Foreign Application Priority Data

Jun. 18, 2020 (WO) ................. PCT/EP2020/067245
Jun. 4, 2021 (WO) ................. PCT/EP2021/065081

(51) Int. Cl.
*G06N 5/04* (2006.01)
*E21B 47/00* (2012.01)
*G06N 20/00* (2019.01)

(52) U.S. Cl.
CPC ............... *G06N 5/04* (2013.01); *E21B 47/00* (2013.01); *G06N 20/00* (2019.01); *E21B 2200/20* (2020.05)

(58) Field of Classification Search
CPC .......... G06N 5/04; G06N 20/00; E21B 47/00; E21B 2200/20
USPC .......................................................... 706/12
See application file for complete search history.

(56) References Cited

U.S. PATENT DOCUMENTS

| 3,563,311 A | 2/1971 | Stein |
| 3,753,257 A | 8/1973 | Arnold |
| 3,841,144 A | 10/1974 | Baldwin |
| 3,854,323 A | 12/1974 | Hearn et al. |
| 4,668,093 A | 5/1987 | Cahill |
| 5,042,297 A | 8/1991 | Lessi |
| 5,113,941 A | 5/1992 | Donovan |
| 5,257,530 A | 11/1993 | Beattie et al. |
| 5,812,493 A | 9/1998 | Robein et al. |

(Continued)

FOREIGN PATENT DOCUMENTS

| CA | 2760662 A1 | 12/2010 |
| CA | 2953938 A1 | 1/2016 |

(Continued)

OTHER PUBLICATIONS

Elichev et al. (Understanding Well Events with Machine Learning, 2019, SPE, pp. 1-12) (Year: 2019).*

(Continued)

*Primary Examiner* — Iftekhar A Khan
(74) *Attorney, Agent, or Firm* — Conley Rose, P.C.

(57) ABSTRACT

A method of identifying events within a wellbore comprises obtaining a first set of measurements of a first signal within a wellbore, identifying one or more events within the wellbore using the first set of measurements, obtaining a second set of measurements of a second signal within the wellbore, wherein the first signal and the second signal represent different physical measurements, training one or more event models using the second set of measurements and the identification of the one or more events as inputs, and using the one or more event models to identify at least one additional event within the wellbore.

25 Claims, 9 Drawing Sheets

(56) References Cited

U.S. PATENT DOCUMENTS

| | | |
|---|---|---|
| 5,825,017 A | 10/1998 | Pryor |
| 5,971,095 A | 10/1999 | Ozbek |
| 6,075,611 A | 6/2000 | Dussan V. et al. |
| 6,151,556 A | 11/2000 | Allen |
| 6,201,765 B1 | 3/2001 | Ireson |
| 6,450,037 B1 | 9/2002 | McGuinn et al. |
| 6,501,067 B2 | 12/2002 | Jones et al. |
| 6,516,275 B2 | 2/2003 | Lazaratos |
| 6,550,342 B2 | 4/2003 | Croteau et al. |
| 6,555,807 B2 | 4/2003 | Clayton et al. |
| 6,587,798 B2 | 7/2003 | Kersey et al. |
| 6,601,458 B1 | 8/2003 | Gysling et al. |
| 6,601,671 B1 | 8/2003 | Zhao et al. |
| 6,651,007 B2 | 11/2003 | Ozbek |
| 6,672,131 B1 | 1/2004 | Aldal et al. |
| 6,738,715 B2 | 5/2004 | Shatilo et al. |
| 6,751,559 B2 | 6/2004 | Fookes et al. |
| 6,782,150 B2 | 8/2004 | Davis et al. |
| 6,813,403 B2 | 11/2004 | Tennyson |
| 6,829,538 B2 | 12/2004 | de Kok |
| 6,837,098 B2 | 1/2005 | Gysling et al. |
| 6,904,368 B2 | 6/2005 | Reshef et al. |
| 6,933,491 B2 | 8/2005 | Maida, Jr. |
| 6,995,352 B2 | 2/2006 | Hay et al. |
| 7,028,543 B2 | 4/2006 | Hardage et al. |
| 7,030,971 B1 | 4/2006 | Payton |
| 7,072,044 B2 | 7/2006 | Kringlebotn et al. |
| 7,088,639 B2 | 8/2006 | Walls et al. |
| 7,130,496 B2 | 10/2006 | Rogers |
| 7,219,762 B2 | 5/2007 | James et al. |
| 7,355,923 B2 | 4/2008 | Reshef et al. |
| 7,357,021 B2 | 4/2008 | Blacklaw |
| 7,395,864 B2 | 7/2008 | Ramachandran et al. |
| 7,398,697 B2 | 7/2008 | Allen et al. |
| 7,404,456 B2 | 7/2008 | Weaver et al. |
| 7,503,217 B2 | 3/2009 | Johansen |
| 7,652,245 B2 | 1/2010 | Crickmore et al. |
| 7,659,828 B2 | 2/2010 | Wehrs et al. |
| 7,660,200 B2 | 2/2010 | Tang |
| 7,872,736 B2 | 1/2011 | Rogers et al. |
| 7,890,280 B2 | 2/2011 | Fomme |
| 7,896,069 B2 | 3/2011 | Dria et al. |
| 7,940,389 B2 | 5/2011 | Rogers et al. |
| 7,946,341 B2 | 5/2011 | Hartog et al. |
| 3,020,616 A1 | 9/2011 | Greenaway |
| 8,023,829 B2 | 9/2011 | Nash et al. |
| 8,131,121 B2 | 3/2012 | Huffman |
| 8,200,049 B2 | 6/2012 | Kaplan et al. |
| 8,245,780 B2 | 8/2012 | Fidan et al. |
| 8,248,589 B2 | 8/2012 | DeFreitas et al. |
| 8,264,676 B2 | 9/2012 | Kanellopoulos et al. |
| 8,408,064 B2 * | 4/2013 | Hartog .................. E21B 47/107 73/643 |
| 8,520,197 B2 | 8/2013 | Handerek |
| 8,534,114 B2 | 9/2013 | Ellson |
| 8,564,786 B2 | 10/2013 | Crickmore et al. |
| 8,576,386 B2 | 11/2013 | Jones et al. |
| 8,605,542 B2 * | 12/2013 | Coates .................. G01H 9/004 367/25 |
| 8,614,795 B2 | 12/2013 | Duncan et al. |
| 8,634,681 B2 | 1/2014 | Rogers |
| 8,661,907 B2 | 3/2014 | Davis et al. |
| 8,755,643 B2 | 6/2014 | Nash et al. |
| 8,797,824 B2 | 8/2014 | Crickmore et al. |
| 8,902,704 B2 | 12/2014 | Zamow et al. |
| 8,923,663 B2 | 12/2014 | Hill et al. |
| 8,941,821 B2 | 1/2015 | Coupe et al. |
| 8,950,482 B2 | 2/2015 | Hill et al. |
| 8,973,444 B2 | 3/2015 | Hill et al. |
| 8,996,298 B2 | 3/2015 | Yamada |
| 8,997,585 B2 | 4/2015 | Hayward |
| 9,002,149 B2 | 4/2015 | Rogers |
| 9,052,230 B2 | 6/2015 | Kutlik et al. |
| 9,075,155 B2 | 7/2015 | Luscombe et al. |
| 9,109,944 B2 | 8/2015 | Den Boer et al. |
| 9,110,018 B2 | 8/2015 | Handerek |
| 9,140,582 B2 | 9/2015 | Farhadiroushan et al. |
| 9,140,815 B2 | 9/2015 | Lopez et al. |
| 9,146,151 B2 | 9/2015 | Kupershmidt |
| 9,228,889 B2 | 1/2016 | McCann |
| 9,243,949 B2 | 1/2016 | Crickmore et al. |
| 9,250,112 B2 | 2/2016 | Godfrey |
| 9,250,120 B2 | 2/2016 | Smith et al. |
| 9,255,836 B2 | 2/2016 | Taverner et al. |
| 9,304,017 B2 | 4/2016 | Handerek |
| 9,341,731 B2 | 5/2016 | Biswas |
| 9,347,313 B2 | 5/2016 | Wills et al. |
| 9,354,338 B1 | 5/2016 | Psaila |
| 9,377,551 B2 | 6/2016 | Hartog et al. |
| 9,377,559 B2 | 6/2016 | Cooper |
| 9,388,685 B2 | 7/2016 | Ravi et al. |
| 9,416,644 B2 | 8/2016 | Mcewen-King et al. |
| 9,423,523 B2 | 8/2016 | McEwen-King |
| 9,429,466 B2 | 8/2016 | Barfoot et al. |
| 9,430,507 B2 | 8/2016 | Stowe et al. |
| 9,435,668 B2 | 9/2016 | Lewis et al. |
| 9,435,902 B2 | 9/2016 | Hill et al. |
| 9,453,821 B2 | 9/2016 | Minto et al. |
| 9,459,329 B2 | 10/2016 | McEwen-King et al. |
| 9,465,126 B2 | 10/2016 | Lewis et al. |
| 9,478,937 B1 | 10/2016 | Kupershmidt et al. |
| 9,507,030 B2 | 11/2016 | Godfrey |
| 9,512,711 B2 | 12/2016 | Sobolewski et al. |
| 9,523,790 B1 | 12/2016 | Valishin |
| 9,541,425 B2 | 1/2017 | Farhadiroushan et al. |
| 9,557,195 B2 | 1/2017 | Barfoot et al. |
| 9,561,812 B2 | 2/2017 | Godfrey |
| 9,575,196 B2 | 2/2017 | Ji et al. |
| 9,594,002 B2 | 3/2017 | Godfrey et al. |
| 9,599,489 B2 | 3/2017 | Nash et al. |
| 9,605,537 B2 | 3/2017 | Hull et al. |
| 9,606,250 B2 | 3/2017 | Hull et al. |
| 9,625,348 B2 | 4/2017 | Hill et al. |
| 9,631,972 B2 * | 4/2017 | Hill ....................... G01H 9/004 |
| 9,651,474 B2 | 5/2017 | Farhadiroushan et al. |
| 9,651,709 B2 | 5/2017 | Jaaskelainen |
| 9,677,956 B2 | 6/2017 | Hill et al. |
| 9,702,244 B2 | 7/2017 | Willis et al. |
| 9,719,846 B2 | 8/2017 | Ellmauthaler et al. |
| 9,733,120 B2 | 8/2017 | Stokely et al. |
| 9,739,645 B2 | 8/2017 | Hill et al. |
| 9,746,393 B2 | 8/2017 | Godfrey |
| 9,759,824 B2 | 9/2017 | Lumens et al. |
| 9,766,371 B2 | 9/2017 | Barfoot et al. |
| 9,778,097 B2 | 10/2017 | McEwen-King |
| 9,784,642 B2 | 10/2017 | Strong et al. |
| 9,788,469 B2 | 10/2017 | Gimblet et al. |
| 9,797,239 B2 | 10/2017 | Godfrey |
| 9,810,809 B2 | 11/2017 | Farhadiroushan et al. |
| 9,816,853 B2 | 11/2017 | Crickmore et al. |
| 9,823,114 B2 | 11/2017 | Farhadiroushan et al. |
| 9,829,368 B2 | 11/2017 | Kutlik et al. |
| 9,850,749 B2 | 12/2017 | Finfer et al. |
| 9,869,795 B2 | 1/2018 | Jaaskelainen |
| 9,880,047 B2 | 1/2018 | Martin et al. |
| 9,896,929 B2 | 2/2018 | Farhadiroushan et al. |
| 9,909,903 B2 | 3/2018 | Lewis et al. |
| 9,945,215 B2 | 4/2018 | Godfrey |
| 9,945,979 B2 | 4/2018 | Stokely et al. |
| 9,983,293 B2 | 5/2018 | Farhadiroushan et al. |
| 9,989,388 B2 | 6/2018 | Farhadiroushan et al. |
| 10,018,036 B2 | 7/2018 | Ellmauthaler et al. |
| 10,031,044 B2 | 7/2018 | Kumar et al. |
| 10,067,030 B2 | 9/2018 | Hartog et al. |
| 10,101,182 B2 | 10/2018 | Barfoot |
| 10,120,104 B2 | 11/2018 | Roy et al. |
| 10,139,268 B2 | 11/2018 | Nunes et al. |
| 10,145,821 B2 | 12/2018 | Farhadiroushan et al. |
| 10,151,626 B2 | 12/2018 | Godfrey et al. |
| 10,175,374 B2 * | 1/2019 | Dusterhoft ............... G01V 1/42 |
| 10,180,515 B2 | 1/2019 | Ellmauthaler et al. |
| 10,197,693 B2 | 2/2019 | Kalyanraman et al. |
| 10,198,946 B2 | 2/2019 | Crickmore et al. |
| 10,215,017 B2 | 2/2019 | Hull et al. |

(56) References Cited

U.S. PATENT DOCUMENTS

| | | | |
|---|---|---|---|
| 10,221,681 B2 | 3/2019 | McEwen-King et al. | |
| 10,234,345 B2 | 3/2019 | Hull et al. | |
| 10,247,584 B2 | 4/2019 | Crickmore et al. | |
| 10,260,937 B2 | 4/2019 | Dankers et al. | |
| 10,267,141 B2 | 4/2019 | Nunes et al. | |
| 10,274,381 B2 | 4/2019 | Kulkarni et al. | |
| 10,275,402 B2 | 4/2019 | Guerriero et al. | |
| 10,281,341 B2 * | 5/2019 | Hull | G01B 11/161 |
| 10,310,113 B2 | 6/2019 | Sun et al. | |
| 10,317,262 B2 | 6/2019 | Kippersund et al. | |
| 10,379,239 B2 | 8/2019 | Udengaard | |
| 10,393,921 B2 * | 8/2019 | Cuny | G01V 1/46 |
| 10,401,519 B2 | 9/2019 | Willis et al. | |
| 10,416,328 B2 | 9/2019 | Walters et al. | |
| 10,422,365 B2 | 9/2019 | Hull et al. | |
| 10,422,901 B2 | 9/2019 | Walters et al. | |
| 10,429,530 B2 | 10/2019 | Rickett et al. | |
| 10,444,388 B2 | 10/2019 | Dusterhoft et al. | |
| 10,444,391 B2 | 10/2019 | Ellmauthaler et al. | |
| 10,444,393 B2 | 10/2019 | Cheng et al. | |
| 10,458,224 B2 | 10/2019 | Dickenson et al. | |
| 10,481,579 B1 | 11/2019 | Putman et al. | |
| 10,520,625 B2 | 12/2019 | Walters et al. | |
| 10,578,757 B2 | 3/2020 | Dong et al. | |
| 10,890,730 B2 | 1/2021 | Petersen | |
| 10,975,687 B2 | 4/2021 | Langnes et al. | |
| 11,053,791 B2 | 7/2021 | Langnes et al. | |
| 11,098,576 B2 * | 8/2021 | Cerrahoglu | E21B 47/135 |
| 11,162,353 B2 | 11/2021 | Thiruvenkatanathan | |
| 11,199,084 B2 * | 12/2021 | Langnes | E21B 47/135 |
| 11,199,085 B2 | 12/2021 | Langnes et al. | |
| 11,215,049 B2 | 1/2022 | Langnes et al. | |
| 11,333,636 B2 | 5/2022 | Langnes et al. | |
| 2001/0037883 A1 | 11/2001 | Veneruso et al. | |
| 2002/0195246 A1 | 6/2002 | Davidson | |
| 2002/0125009 A1 | 9/2002 | Wetzel et al. | |
| 2002/0139929 A1 | 10/2002 | Mullins et al. | |
| 2003/0010126 A1 | 1/2003 | Romanet | |
| 2003/0014199 A1 | 1/2003 | Toomey | |
| 2003/0029241 A1 | 2/2003 | Mandal | |
| 2004/0059505 A1 | 3/2004 | Gallagher | |
| 2004/0252748 A1 | 12/2004 | Gleitman | |
| 2005/0100172 A1 | 5/2005 | Schliep et al. | |
| 2005/0246111 A1 | 11/2005 | Gysling et al. | |
| 2006/0113089 A1 | 6/2006 | Henriksen et al. | |
| 2006/0165239 A1 * | 7/2006 | Langner | G10L 25/48 381/94.2 |
| 2006/0165344 A1 | 7/2006 | Mendez et al. | |
| 2007/0047867 A1 | 3/2007 | Goldner | |
| 2007/0163780 A1 | 7/2007 | Onodera et al. | |
| 2007/0199696 A1 | 8/2007 | Walford | |
| 2007/0215345 A1 | 9/2007 | Lafferty et al. | |
| 2007/0234789 A1 | 10/2007 | Glasbergen et al. | |
| 2007/0247631 A1 | 10/2007 | Paulson | |
| 2007/0253561 A1 | 11/2007 | Williams et al. | |
| 2008/0065362 A1 | 3/2008 | Lee et al. | |
| 2008/0137475 A1 | 6/2008 | Maisons | |
| 2008/0154510 A1 | 6/2008 | Scott | |
| 2008/0232748 A1 | 9/2008 | Nash | |
| 2008/0314142 A1 | 12/2008 | Davies | |
| 2009/0010104 A1 | 1/2009 | Leaney | |
| 2009/0055098 A1 | 2/2009 | Mese et al. | |
| 2009/0132183 A1 | 5/2009 | Hartog et al. | |
| 2009/0202192 A1 | 8/2009 | Taverner et al. | |
| 2009/0213692 A1 | 8/2009 | Martinez et al. | |
| 2010/0107754 A1 * | 5/2010 | Hartog | E21B 47/107 73/152.47 |
| 2010/0163223 A1 | 7/2010 | Brown | |
| 2010/0243241 A1 | 9/2010 | Hampton et al. | |
| 2010/0258304 A1 | 10/2010 | Hegeman | |
| 2010/0268489 A1 | 10/2010 | Lie et al. | |
| 2011/0011577 A1 | 1/2011 | Dusterhoft et al. | |
| 2011/0030467 A1 | 2/2011 | Bakulin | |
| 2011/0042071 A1 | 2/2011 | Hsu et al. | |
| 2011/0085415 A1 | 4/2011 | Morton et al. | |
| 2011/0094741 A1 | 4/2011 | Vigneaux et al. | |
| 2011/0110191 A1 | 5/2011 | Williams-Stroud et al. | |
| 2011/0139538 A1 | 6/2011 | Hill et al. | |
| 2011/0149688 A1 | 6/2011 | Hill et al. | |
| 2011/0188346 A1 * | 8/2011 | Hull | E21B 47/107 367/35 |
| 2011/0255077 A1 | 10/2011 | Rogers | |
| 2011/0301882 A1 | 12/2011 | Andersen | |
| 2011/0315369 A1 | 12/2011 | Holderman et al. | |
| 2012/0020184 A1 | 1/2012 | Ison et al. | |
| 2012/0043079 A1 | 2/2012 | Wassouf et al. | |
| 2012/0057432 A1 | 3/2012 | Hill et al. | |
| 2012/0092960 A1 | 4/2012 | Gaston et al. | |
| 2012/0096922 A1 | 4/2012 | Ellson | |
| 2012/0111560 A1 | 5/2012 | Hill et al. | |
| 2012/0137781 A1 | 6/2012 | Hill et al. | |
| 2012/0152024 A1 | 6/2012 | Johansen | |
| 2012/0155218 A1 | 6/2012 | Beasley et al. | |
| 2012/0201096 A1 | 8/2012 | Valero et al. | |
| 2012/0257475 A1 | 10/2012 | Luscombe et al. | |
| 2012/0290213 A1 | 11/2012 | Huo et al. | |
| 2012/0298421 A1 | 11/2012 | Coates | |
| 2013/0139600 A1 | 6/2013 | McEwen-King et al. | |
| 2013/0151203 A1 | 6/2013 | McEwen-King et al. | |
| 2013/0166227 A1 | 6/2013 | Hermann et al. | |
| 2013/0167628 A1 * | 7/2013 | Hull | G01V 1/001 73/152.58 |
| 2013/0170519 A1 | 7/2013 | Alliot | |
| 2013/0298665 A1 * | 11/2013 | Minchau | E21B 43/26 73/152.51 |
| 2013/0299165 A1 | 11/2013 | Crow | |
| 2013/0319121 A1 | 12/2013 | Hill et al. | |
| 2014/0025319 A1 | 1/2014 | Farhadiroushan et al. | |
| 2014/0036627 A1 | 2/2014 | Hull et al. | |
| 2014/0036628 A1 | 2/2014 | Hill et al. | |
| 2014/0044222 A1 | 2/2014 | Kim et al. | |
| 2014/0069173 A1 | 3/2014 | Roy et al. | |
| 2014/0086009 A1 | 3/2014 | Yoneshima | |
| 2014/0110124 A1 | 4/2014 | Goldner et al. | |
| 2014/0150523 A1 | 6/2014 | Stokely et al. | |
| 2014/0150548 A1 | 6/2014 | Childers et al. | |
| 2014/0172302 A1 * | 6/2014 | Kalia | G06F 15/00 702/6 |
| 2014/0204368 A1 | 7/2014 | Lewis et al. | |
| 2014/0216151 A1 | 8/2014 | Godfrey et al. | |
| 2014/0334253 A1 | 11/2014 | Lumens et al. | |
| 2014/0362668 A1 | 12/2014 | McEwen-King | |
| 2015/0000415 A1 | 1/2015 | Kelley | |
| 2015/0085610 A1 | 3/2015 | Raum et al. | |
| 2015/0144333 A1 | 5/2015 | Lee et al. | |
| 2015/0146759 A1 | 5/2015 | Johnston | |
| 2015/0234526 A1 | 8/2015 | Chalubert et al. | |
| 2015/0235544 A1 | 8/2015 | Hernandez et al. | |
| 2015/0308191 A1 | 10/2015 | Zhan et al. | |
| 2015/0308909 A1 | 10/2015 | Carneal et al. | |
| 2016/0123798 A1 | 5/2016 | Godfrey et al. | |
| 2016/0138386 A1 | 5/2016 | Stokely et al. | |
| 2016/0146962 A1 | 5/2016 | Hayward | |
| 2016/0154142 A1 * | 6/2016 | Stokely | G01V 11/002 73/152.58 |
| 2016/0162519 A1 * | 6/2016 | Stowe | E21B 47/135 707/755 |
| 2016/0201453 A1 | 7/2016 | Kaiser et al. | |
| 2016/0223389 A1 | 8/2016 | Farhadiroushan et al. | |
| 2016/0259079 A1 | 9/2016 | Wilson et al. | |
| 2016/0265345 A1 | 9/2016 | In T Panhuis et al. | |
| 2016/0281494 A1 | 9/2016 | Shirdel et al. | |
| 2016/0312552 A1 | 10/2016 | Early et al. | |
| 2016/0312604 A1 | 10/2016 | Hull et al. | |
| 2016/0320232 A1 | 11/2016 | Nunes et al. | |
| 2016/0327419 A1 | 11/2016 | Hellevang et al. | |
| 2016/0342569 A1 | 11/2016 | Al Marzouqi | |
| 2016/0356665 A1 | 12/2016 | Felemban et al. | |
| 2016/0369590 A1 | 12/2016 | Tonkin et al. | |
| 2016/0369607 A1 | 12/2016 | Roy et al. | |
| 2017/0010385 A1 | 1/2017 | Englich et al. | |
| 2017/0016312 A1 | 1/2017 | Clarke et al. | |
| 2017/0039826 A1 | 2/2017 | Cojocaur | |
| 2017/0045410 A1 | 2/2017 | Crickmore et al. | |

(56) References Cited

U.S. PATENT DOCUMENTS

| | | |
|---|---|---|
| 2017/0052049 A1 | 2/2017 | Crickmore et al. |
| 2017/0052050 A1 | 2/2017 | Crickmore et al. |
| 2017/0074998 A1* | 3/2017 | McColpin ................ G01V 1/42 |
| 2017/0074999 A1 | 3/2017 | Walters et al. |
| 2017/0075001 A1* | 3/2017 | McColpin .............. G01V 1/303 |
| 2017/0075002 A1* | 3/2017 | Ranjan .................... E21B 49/00 |
| 2017/0075003 A1 | 3/2017 | Dusterhoft et al. |
| 2017/0075004 A1 | 3/2017 | McColpin et al. |
| 2017/0075005 A1 | 3/2017 | Ranjan et al. |
| 2017/0082766 A1 | 3/2017 | Milne et al. |
| 2017/0090054 A1 | 3/2017 | Willis et al. |
| 2017/0119255 A1 | 5/2017 | Mahajan et al. |
| 2017/0123089 A1 | 5/2017 | Walters et al. |
| 2017/0153154 A1 | 6/2017 | Hull et al. |
| 2017/0205253 A1 | 7/2017 | Handerek |
| 2017/0234999 A1 | 8/2017 | Dykstra et al. |
| 2017/0241830 A1 | 8/2017 | Jaaskelainen |
| 2017/0241831 A1 | 8/2017 | Jaaskelainen |
| 2017/0275986 A1 | 9/2017 | Nunes et al. |
| 2017/0292862 A1 | 10/2017 | Godfrey |
| 2017/0315261 A1 | 11/2017 | Bartling et al. |
| 2017/0342814 A1 | 11/2017 | Krueger et al. |
| 2017/0343389 A1 | 11/2017 | Parker et al. |
| 2017/0350234 A1 | 12/2017 | Xia et al. |
| 2017/0363756 A1 | 12/2017 | El Allouche et al. |
| 2017/0371057 A1 | 12/2017 | Mateeva et al. |
| 2018/0010443 A1 | 1/2018 | Lu et al. |
| 2018/0024260 A1 | 1/2018 | Hornman et al. |
| 2018/0031413 A1 | 2/2018 | Stokely et al. |
| 2018/0045543 A1 | 2/2018 | Farhadiroushan et al. |
| 2018/0045768 A1 | 2/2018 | Godfrey et al. |
| 2018/0058196 A1 | 3/2018 | Jaaskelainen et al. |
| 2018/0066490 A1 | 3/2018 | Kjos |
| 2018/0087372 A1 | 3/2018 | Stokely et al. |
| 2018/0094952 A1 | 4/2018 | Handerek |
| 2018/0112519 A1 | 4/2018 | Duan et al. |
| 2018/0112520 A1 | 4/2018 | Duan |
| 2018/0112523 A1 | 4/2018 | Yang et al. |
| 2018/0136354 A1 | 5/2018 | Haldorsen |
| 2018/0172860 A1 | 6/2018 | Wilson et al. |
| 2018/0180658 A1 | 6/2018 | Godfrey |
| 2018/0203144 A1 | 7/2018 | Karrenbach et al. |
| 2018/0222498 A1 | 8/2018 | Kelley |
| 2018/0224572 A1 | 8/2018 | Farhadiroushan et al. |
| 2018/0230797 A1 | 8/2018 | Seshadri et al. |
| 2018/0231658 A1 | 8/2018 | Jalilian et al. |
| 2018/0238167 A1 | 8/2018 | Ravi et al. |
| 2018/0252097 A1 | 9/2018 | Skinner et al. |
| 2018/0259662 A1 | 9/2018 | Srinivasan |
| 2018/0266854 A1 | 9/2018 | Moore et al. |
| 2018/0267201 A1 | 9/2018 | Lewis |
| 2018/0284752 A1 | 10/2018 | Cella et al. |
| 2018/0292569 A1 | 10/2018 | LeBlanc et al. |
| 2018/0320827 A1 | 11/2018 | Hull et al. |
| 2018/0340801 A1 | 11/2018 | Kelley et al. |
| 2018/0342156 A1 | 11/2018 | Martin et al. |
| 2018/0354534 A1 | 12/2018 | Cole |
| 2018/0356210 A1 | 12/2018 | Moore et al. |
| 2019/0003499 A1 | 1/2019 | Logan et al. |
| 2019/0003903 A1 | 1/2019 | Godfrey |
| 2019/0025094 A1 | 1/2019 | Lewis et al. |
| 2019/0026634 A1 | 1/2019 | Homeyer et al. |
| 2019/0033898 A1 | 1/2019 | Shah et al. |
| 2019/0064030 A1 | 2/2019 | Sundermann |
| 2019/0072379 A1 | 3/2019 | Jalilian et al. |
| 2019/0113641 A1 | 4/2019 | Fang et al. |
| 2019/0120044 A1 | 4/2019 | Langnes et al. |
| 2019/0137045 A1 | 5/2019 | Jalilian et al. |
| 2019/0169985 A1 | 6/2019 | Dickenson et al. |
| 2019/0186958 A1 | 6/2019 | Godfrey |
| 2019/0197846 A1 | 6/2019 | Englund |
| 2019/0225250 A1 | 7/2019 | Esprey et al. |
| 2019/0257169 A1 | 8/2019 | Grimsbo et al. |
| 2019/0257699 A1 | 8/2019 | Handerek et al. |
| 2019/0277135 A1* | 9/2019 | Zha ........................ E21B 47/12 |
| 2019/0323863 A1 | 10/2019 | Shatalin et al. |
| 2019/0324444 A1 | 10/2019 | Cella et al. |
| 2019/0331819 A1 | 10/2019 | Wu et al. |
| 2019/0338621 A1 | 11/2019 | Jin et al. |
| 2019/0339688 A1 | 11/2019 | Cella et al. |
| 2019/0345803 A1 | 11/2019 | Madasu et al. |
| 2019/0353814 A1 | 11/2019 | Cha et al. |
| 2019/0375213 A1 | 12/2019 | Theopold et al. |
| 2019/0390546 A1 | 12/2019 | Langnes et al. |
| 2020/0018149 A1 | 1/2020 | Luo et al. |
| 2020/0024942 A1 | 1/2020 | Lolla et al. |
| 2020/0032639 A1 | 1/2020 | Langnes et al. |
| 2020/0032645 A1 | 1/2020 | LeBlanc et al. |
| 2020/0048999 A1 | 2/2020 | Langnes et al. |
| 2020/0056907 A1 | 2/2020 | Godfrey |
| 2020/0057220 A1 | 2/2020 | Hull et al. |
| 2020/0070862 A1 | 3/2020 | Bilodeau et al. |
| 2020/0072993 A1 | 3/2020 | Wilson et al. |
| 2020/0081145 A1 | 3/2020 | Padhi et al. |
| 2020/0088022 A1 | 3/2020 | Shen et al. |
| 2020/0102821 A1 | 4/2020 | Willis et al. |
| 2020/0124489 A1 | 4/2020 | Godfrey |
| 2020/0131900 A1 | 4/2020 | Leblanc et al. |
| 2020/0158594 A1 | 5/2020 | Dankers et al. |
| 2020/0172130 A1 | 6/2020 | Esprey |
| 2020/0173273 A1* | 6/2020 | Thiruvenkatanathan ..................... G01V 1/282 |
| 2020/0173818 A1 | 6/2020 | Handerek et al. |
| 2020/0174149 A1* | 6/2020 | Thiruvenkatanathan ..................... G06N 7/005 |
| 2020/0182047 A1 | 6/2020 | Langnes et al. |
| 2020/0184556 A1 | 6/2020 | Cella |
| 2020/0190971 A1* | 6/2020 | Thiruvenkatanathan ..................... G01H 3/04 |
| 2020/0200000 A1* | 6/2020 | Langnes ................. E21B 47/00 |
| 2020/0200943 A1 | 6/2020 | Adeyemi et al. |
| 2020/0233107 A1 | 7/2020 | Constantinou et al. |
| 2020/0256834 A1* | 8/2020 | Langnes ................. G01M 3/24 |
| 2020/0291772 A1* | 9/2020 | Thiruvenkatanathan ..................... E21B 47/18 |
| 2020/0309982 A1 | 10/2020 | Jin et al. |
| 2021/0025383 A1* | 1/2021 | Bodishbaugh ........ F04B 49/007 |
| 2021/0042634 A1* | 2/2021 | Maucec ................. G06F 16/906 |
| 2021/0047916 A1 | 2/2021 | Thiruvenkatanathan et al. |
| 2021/0073314 A1 | 3/2021 | Ray et al. |
| 2021/0081823 A1* | 3/2021 | Boguslawski ........... G06N 5/04 |
| 2021/0087923 A1* | 3/2021 | Thiruvenkatanathan ..................... E21B 47/06 |
| 2021/0087925 A1 | 3/2021 | Heidari et al. |
| 2021/0115767 A1* | 4/2021 | Tajallipour .............. E21B 47/18 |
| 2021/0115785 A1 | 4/2021 | Cerrahoglu et al. |
| 2021/0115786 A1 | 4/2021 | Cerrahoglu et al. |
| 2021/0148199 A1* | 5/2021 | Thiruvenkatanathan ..................... E21B 43/121 |
| 2021/0189874 A1 | 6/2021 | Jaaskelainen et al. |
| 2021/0231830 A1 | 7/2021 | Nitsche et al. |
| 2021/0301659 A1* | 9/2021 | Al Shahri ............... E21B 47/06 |

FOREIGN PATENT DOCUMENTS

| | | |
|---|---|---|
| CA | 2866274 A1 | 3/2016 |
| CN | 101769442 A | 7/2010 |
| CN | 102226390 A | 10/2011 |
| CN | 203561437 U | 4/2014 |
| CN | 105135219 A | 12/2015 |
| CN | 105676267 A | 6/2016 |
| CN | 205746047 U | 11/2016 |
| CN | 108918405 A | 11/2018 |
| CN | 109000157 A | 12/2018 |
| CN | 110231409 A | 9/2019 |
| CN | 209858753 U | 12/2019 |
| EP | 2418466 A2 | 2/2012 |
| EP | 3006908 A1 | 4/2016 |
| EP | 3032441 A2 | 6/2016 |
| EP | 3073051 A1 | 9/2016 |
| EP | 3314308 A1 | 5/2018 |
| EP | 3440314 A2 | 2/2019 |
| GB | 1299843 A | 12/1972 |

(56) References Cited

FOREIGN PATENT DOCUMENTS

| | | | |
|---|---|---|---|
| GB | 2354782 | A | 4/2001 |
| GB | 2359834 | A | 9/2001 |
| GB | 2522061 | A | 7/2015 |
| GB | 2555550 | A | 5/2018 |
| GB | 2555637 | A | 5/2018 |
| GB | 18203315 | | 12/2018 |
| JP | 5518424 | B2 | 5/2018 |
| NL | 9000577 | A | 10/1990 |
| RU | 2007101037 | A | 7/2008 |
| WO | 9721116 | A1 | 6/1997 |
| WO | 2004031738 | A1 | 4/2004 |
| WO | 2007024763 | A2 | 3/2007 |
| WO | 2008147953 | A1 | 12/2008 |
| WO | 2009048340 | A2 | 4/2009 |
| WO | 2009086279 | A2 | 7/2009 |
| WO | 2009109747 | A1 | 9/2009 |
| WO | 2010099484 | A2 | 9/2010 |
| WO | 2012011831 | A1 | 1/2012 |
| WO | 2013114135 | A2 | 8/2013 |
| WO | 2015011394 | A1 | 1/2015 |
| WO | 2015025216 | A2 | 2/2015 |
| WO | 2015060981 | A1 | 4/2015 |
| WO | 2015170113 | A1 | 11/2015 |
| WO | 2015170116 | A1 | 11/2015 |
| WO | 2016010550 | A1 | 1/2016 |
| WO | 2016020654 | A1 | 2/2016 |
| WO | 2016/108914 | A1 | 7/2016 |
| WO | 2016108914 | A1 | 7/2016 |
| WO | 2016115030 | A1 | 7/2016 |
| WO | 2016207341 | A1 | 12/2016 |
| WO | 2017009606 | A1 | 1/2017 |
| WO | 2017044923 | A1 | 3/2017 |
| WO | 2017064472 | A1 | 4/2017 |
| WO | 2017078536 | A1 | 5/2017 |
| WO | 2017109467 | A1 | 6/2017 |
| WO | 2017156339 | A1 | 9/2017 |
| WO | 2017174746 | A1 | 10/2017 |
| WO | 2017174750 | A2 | 10/2017 |
| WO | 2017203271 | A1 | 11/2017 |
| WO | 2017214729 | A1 | 12/2017 |
| WO | 2018044309 | A1 | 3/2018 |
| WO | 2018057029 | A1 | 3/2018 |
| WO | 2018088994 | A1 | 5/2018 |
| WO | 2018136050 | A1 | 7/2018 |
| WO | 2018154275 | A1 | 8/2018 |
| WO | 2018/178279 | A1 | 10/2018 |
| WO | 2018195661 | A1 | 11/2018 |
| WO | 2019005050 | A1 | 1/2019 |
| WO | 2019027466 | A1 | 2/2019 |
| WO | 2019038401 | A1 | 2/2019 |
| WO | 2019072899 | A2 | 4/2019 |
| WO | 2019094140 | A1 | 5/2019 |
| WO | 2019094474 | A1 | 5/2019 |
| WO | 2019136556 | A1 | 7/2019 |
| WO | 2019139564 | A1 | 7/2019 |
| WO | 2020109426 | A2 | 6/2020 |
| WO | 2020109427 | A2 | 6/2020 |
| WO | 2020119957 | A1 | 6/2020 |
| WO | 2020182312 | A1 | 9/2020 |
| WO | 2020260928 | A1 | 12/2020 |
| WO | 2021034300 | A1 | 2/2021 |
| WO | 2021037586 | A1 | 3/2021 |
| WO | 2021052604 | A1 | 3/2021 |
| WO | 2021052605 | A1 | 3/2021 |
| WO | 2021052607 | A1 | 3/2021 |
| WO | 2021073740 | A1 | 4/2021 |
| WO | 2021073741 | A1 | 4/2021 |
| WO | 2021073763 | A1 | 4/2021 |
| WO | 2021073776 | A1 | 4/2021 |
| WO | 2021093974 | A1 | 5/2021 |
| WO | 2021093976 | A1 | 5/2021 |
| WO | 2021148141 | A1 | 7/2021 |
| WO | 2021151504 | A1 | 8/2021 |
| WO | 2021151521 | A1 | 8/2021 |
| WO | 2021249643 | A1 | 12/2021 |
| WO | 2021254632 | A1 | 12/2021 |
| WO | 2021254633 | A1 | 12/2021 |
| WO | 2021254799 | A1 | 12/2021 |

OTHER PUBLICATIONS

Saeed et al. (Event Detection for Managed-Pressure Drilling: A New Paradigm, 2012, SPE, pp. 1-12) (Year: 2012).*
European Search Report dated Apr. 22, 2020, for European Application No. 20154638.9.
International Search Report and Written Opinion dated Jun. 29, 2018, PCT Application No. PCT/EP2018/058174.
International Preliminary Report on Patentability dated Oct. 10, 2019, PCT Application No. PCT/EP2018/058174.
Office Action dated Jan. 24, 2020, U.S. Appl. No. 16/566,711, filed Sep. 10, 2019.
Final Office Action dated Aug. 4, 2020, U.S. Appl. No. 16/566,711, filed Sep. 10, 2019.
Advisory Action dated Oct. 16, 2020, U.S. Appl. No. 16/566,711, filed Sep. 10, 2019.
Notice of Allowance dated Dec. 11, 2020, U.S. Appl. No. 16/566,711, filed Sep. 10, 2019.
European Article 94(3) Examination Report dated Jan. 15, 2020, for European Application No. 18714513.1.
European Article 94(3) Examination Report dated Jul. 29, 2020, for European Application No. 18714513.1.
European Search Report dated Dec. 4, 2019, for European Application No. 19198488.9.
European Article 94(3) Examination Report dated Feb. 3, 2020,, for European Application No. 19198488.9.
Intention to Grant dated Aug. 10, 2020, for European Application No. 19198488.9.
Eurasian Office Action dated Sep. 3, 2020, for Eurasian Application No. 201992243/31.
International Search Report and Written Opinion dated Nov. 28, 2018, PCT Application No. PCT/EP2018/072811.
International Preliminary Report on Patentability dated Mar. 5, 2020, PCT Application No. PCT/EP2018/072811.
Office Action dated Apr. 29, 2021, U.S. Appl. No. 16/639,774, filed Feb. 18, 2020.
Notice of Allowance dated Aug. 10, 2021, U.S. Appl. No. 16/639,774, filed Feb. 18, 2020.
International Search Report and Written Opinion dated Feb. 14, 2020, PCT Application No. PCT/EP2019/057149.
Office Action dated Mar. 4, 2020, U.S. Appl. No. 16/710,237, filed Dec. 11, 2019.
Final Office Action dated Sep. 3, 2020, U.S. Appl. No. 16/710,237, filed Dec. 11, 2019.
Office Action dated Feb. 11, 2021, U.S. Appl. No. 16/710,237, filed Dec. 11, 2019.
Office Action dated Jul. 22, 2021, U.S. Appl. No. 16/710,237, filed Dec. 11, 2019.
International Search Report and Written Opinion dated Jun. 4, 2019, PCT Application No. PCT/EP2018/077568.
International Preliminary Report on Patentability date Apr. 23, 2020, PCT Application No. PCT/EP2018/077568.
International Search Report and Written Opinion dated Jul. 9, 2020, PCT Application No. PCT/EP2018/082985.
International Search Report and Written Opinion dated Jul. 9, 2020, PCT Application No. PCT/EP2019/082808.
Office Action dated Feb. 24, 2020, U.S. Appl. No. 16/698,335, filed Nov. 11, 2019.
Final Office Action dated Jun. 24, 2020, U.S. Appl. No. 16/698,335, filed Nov. 11, 2019.
Advisory Action dated Aug. 25, 2020, U.S. Appl. No. 16/698,335, filed Nov. 11, 2019.
Office Action dated Dec. 3, 2020, U.S. Appl. No. 16/698,335, filed Nov. 11, 2019.
Final Office Action dated Jun. 15, 2021, U.S. Appl. No. 16/698,335, filed Nov. 11, 2019.
International Search Report and Written Opinion dated Jan. 27, 2020, PCT Application No. PCT/EP2019/056425.

(56) References Cited

OTHER PUBLICATIONS

International Search Report and Written Opinion dated Feb. 28, 2020, PCT Application No. PCT/IB2019/055355.
International Search Report and Written Opinion dated Jun. 16, 2020, PCT Application No. PCT/EP2019/075385.
International Search Report and Written Opinion dated Jun. 16, 2020, PCT Application No. PCT/EP2019/075378.
International Search Report and Written Opinion dated Jun. 17, 2020, PCT Application No. PCT/US2019/046759.
International Search Report and Written Opinion dated May 12, 2020, PCT Application No. PCT/EP2019/072891.
International Search Report and Written Opinion dated Nov. 6, 2020, PCT Application No. PCT/EP2020/072811.
International Search Report and Written Opinion dated Jul. 9, 2020, PCT Application No. PCT/EP2019/078195.
Office Action dated Jan. 7, 2021, U.S. Appl. No. 17/071,031, filed Oct. 15, 2020.
Notice of Allowance dated Apr. 22, 2021, U.S. Appl. No. 17/071,031, filed Oct. 15, 2020.
International Search Report and Written Opinion dated Jun. 16, 2020, PCT Application No. PCT/EP2019/075387.
International Search Report and Written Opinion dated Jun. 16, 2020, PCT Application No. PCT/EP2019/075382.
Partial International Search Report Search Report dated Sep. 10, 2020, PCT Application No. PCT/EP2019/085454.
International Search Report and Written Opinion dated Jul. 9, 2020, PCT Application No. PCT/EP2019/078197.
Office Action dated Jan. 14, 2021, U.S. Appl. No. 17/071,021, filed Oct. 20, 2020.
Final Office Action dated May 11, 2021, U.S. Appl. No. 17/071,021, filed Oct. 20, 2020.
Advisory Action dated Jul. 28, 2021, U.S. Appl. No. 17/071,021, filed Oct. 20, 2020.
International Search Report and Written Opinion dated May 29, 2020, PCT Application No. PCT/EP2019/082809.
Office Action dated Mar. 12, 2020, U.S. Appl. No. 16/698,407, filed Nov. 27, 2019.
Final Office Action dated Jun. 30, 2020, U.S. Appl. No. 16/698,407, filed Nov. 27, 2019.
Office Action dated Mar. 22, 2021, U.S. Appl. No. 16/698,407, filed Nov. 27, 2019.
Final Office Action dated Jun. 29, 2021, U.S. Appl. No. 16/698,407, filed Nov. 27, 2019.
Examination Report dated Jul. 15, 2020, GCC Application No. GC 2019-38726.
International Search Report and Written Opinion dated Jul. 24, 2020, PCT Application No. PCT/EP2019/081542.
Office Action dated Dec. 30, 2020, U.S. Appl. No. 17/091,940, filed Nov. 6, 2020.
Final Office Action dated Apr. 7, 2021, U.S. Appl. No. 17/091,940, filed Nov. 6, 2020.
Notice of Allowance dated Jun. 29, 2021, U.S. Appl. No. 17/091,940, filed Nov. 6, 2020.
International Search Report and Written Opinion dated Jul. 24, 2020, PCT Application No. PCT/EP2019/081545.
International Search Report and Written Opinion dated Feb. 3, 2021, PCT Application No. PCT/EP2020/066171.
Partial International Search Report dated Oct. 20, 2020, PCT Application No. PCT/EP2020/051814.
International Search Report and Written Opinion dated Dec. 11, 2020, PCT Application No. PCT/EP2020/051814.
Partial International Search Report dated Oct. 16, 2020, PCT Application No. PCT/EP2020/051817.
International Search Report and Written Opinion dated Dec. 20, 2020, PCT Application No. PCT/EP2020/051817.
International Search Report and Written Opinion dated Dec. 9, 2020, PCT Application No. PCT/EP2020/067043.
International Search Report and Written Opinion dated Mar. 12, 2021, PCT Application No. PCT/EP2020/067044.
PCT/EP2020/067045 International Search Report and Written Opinion dated Mar. 15, 2021 (15 p.).
Xiao, J., et al., "Dynamic Water Injection Profiling in Intelligent Wells Using Distributed Acoustic Sensor with Multimode Optical Fibers," SPE Annual Technical Conference and Exhibition, Sep. 28-30, 2015, Houston, Texas, US, SPE-174865-MS, https://doi.org/10.2118/174865-MS.
Xiao, J.J., et al., "Intelligent Distributed Acoustic Sensing for In-well Monitoring," SPE Saudi Arabia Section Technical Symposium and Exhibition, Apr. 21-24, 2014, Al-Khobar, SA, SPE-172197-MS, https://doi.org/10.2118/172197-MS.
PCT/EP2021/065081 International Search Report and Written Opinion dated Sep. 14, 2021 (14 p.).
International Search Report and Written Opinion dated Oct. 5, 2017, PCT Application No. PCT/EP2017/058300.
International Preliminary Report on Patentability dated Oct. 18, 2018, PCT Application No. PCT/EP2017/058300.
Intention to Grant dated Dec. 12, 2019, EP Application No. 17715935.7.
Decision to Grant dated May 8, 2020, EP Application No. 17715935.7.
Office Action dated Dec. 29, 2019, U.S. Appl. No. 16/563,544, filed Sep. 16, 2019.
Notice of Allowance dated Apr. 22, 2020, U.S. Appl. No. 16/563,544, filed Sep. 16, 2019.
European Search Report dated Aug. 10, 2020, EP Application No. 20170700.7.
International Search Report and Written Opinion dated Sep. 22, 2017, PCT Application No. PCT/EP2017/058292.
International Preliminary Report on Patentability dated Oct. 18, 2018, PCT Application No. PCT/EP2017/058292.
Restriction Requirement dated Dec. 15, 2020, U.S. Appl. No. 16/291,929, filed Oct. 5, 2018.
Office Action dated Mar. 30, 2021, U.S. Appl. No. 16/291,929, filed Oct. 5, 2018.
Notice of Allowance dated Aug. 6, 2021, U.S. Appl. No. 16/291,929, filed Oct. 5, 2018.
Office Action dated Dec. 4, 2019, U.S. Appl. No. 16/563,689, filed Sep. 6, 2019.
Notice of Allowance dated May 20, 2020, U.S. Appl. No. 16/563,689, filed Sep. 6, 2019.
Corrected Notice of Allowability dated Jun. 19, 2020, U.S. Appl. No. 16/563,689, filed Sep. 6, 2019.
Notice of Allowance dated Apr. 21, 2021, U.S. Appl. No. 16/563,689, filed Sep. 6, 2019.
Abdelgaward, Ahemd, "Distributed Sand Monitoring Framework Using Wireless Sensor Networks," School of Engineering Technology, Central Michigan University, Mount Pleasant, MI 48859, US, Oct. 2013, vol. 1 Is. 1, pp. 1-10.
Abukhamsin, Ahmed Yasin, et al., "In Flow Profiling and Production Optimization in Smart Wells Using Di stri but ed Acoustic and Temperature Measurements," Jun. 1, 2017 (Jun. 1, 2017), XP055604495, Retrieved from the Internet: URL: https://pangea.stanrord.edu/ERE/pdf/pereports/PhD/Abukhamsin2016.pdf [retrieved on Jul. 11, 2019] paragraphs [0001], [0002], [0004].
Bakku, Sudhish K., et al., "Vertical Seismic Profiling Using Distributed Acoustic Sensing in a Hydrofrac Treatment Well," SEG Technical Program Expanded Abstracts Denver 2014 ISSN (print): 1052-3812, ISSN (online): 1949-4645, https://doi.org/10.1190/segam2014-1559.1.
Broesch, James "Digital Signal Processing: Instant Access," Chapter 7, www.newnespress.com.
Brown, Gerald K., "External Acoustic Sensors and Instruments for the Detection of Sand in Oil and Gas Wells," Offshore Technology Conference, May 5-8, 1997, Houston, Texas, US, OTC-8478-MS, https://doi.org/10.4043/8478-MS.
Brown, Gerald K., et al., "Solids and Sand Monitoring—An Overview," CORROSION, Mar. 26-31, 2000, Orlando, Florida, US, NACE International, NACE-00091.
Cannon, Robert Thayer, et al., "Distributed Acoustic Sensing: State of the Art," SPE Digital Energy Conference, Mar. 5-7, 2013, The Woodlands, Texas, US, SPE-163688-MS, https://doi.org/10.2118/163688-MS.

(56) References Cited

OTHER PUBLICATIONS

Chen, Jianyou, et al., "Distributed acoustic sensing coupling noise removal based on sparse optimization," Society of Exploration Geophysicists and American Association of Petroleum Geologists, vol. 7, Issue 2, May 2019, pp. 1M-T563, ISSN (print): 2324-8858, ISSN (online): 2324-8866, https://doi.org/10.1190/INT-2018-0080. 1.
Chhantyal, Khim et al., "Upstream Ultrasonic Level Based Soft Sensing of Volumetric Flow of Non-Newtonian Fluids in Open Venturi Channels," IEEE Sensors Journal, vol. 18, No. 12, Jun. 15, 2018.
ClampOn DSP-06 Particle Monitor, Aug. 2009.
ClampOn SandQ® Monitor, Aug. 2014.
Conway, Chris, et al., "An introduction to fiber optic Intelligent Distributed Acoustic Sensing (iDAS) technology for power industry applications," 9th International Conference on Insulated Power Cables, Jicable15—Versailles Jun. 21-25, 2015, A3.4.
Correa, Julia, et al., "3D vertical seismic profile acquired with distributed acoustic sensing on tubing installation: A case study from the CO2CRC Otway Project," Interpretation—a Journal of Subsurface Characterization, 7(1), ISSN 2324-8858, Feb. 1, 2019, DOI 10.1190/INT-2018-0086.1, https://escholarship.org/uc/item/2br8g398.
De la Cruz Salas, Luis M., "Computational Methods for Oil Recovery", Instituto de Geofisica Universidad Nacional Autonoma de Mexico, Jan. 2011, Slides 1-97 (Year: 2011).
Finfer, D.C., et al., "Borehole Flow Monitoring using a Non-intrusive Passive Distributed Acoustic Sensing (DAS)," Society of Petroleum Engineers, SPE-170844-MS, SPE Annual Technical Conference and Exhibition held in Amsterdam, The Netherlands, Oct. 27-29, 2014.
Folkestad, Trond, et al., "Acoustic measurements detect sand in North Sea flow lines," Oil and Gas Journal; (USA), Journal vol. 88:35; Journal ID: ISSN 0030-1388.
Gardner, Neil, et al., "Distributed Fiber-Optic Technologies Drive New Intervention Applications," SPE JPT-7975, vol. 67 | Issue: 1, Jan. 1, 2015.
Hill, David, Permanent real-time full wellbore flow monitoring using distributed fiber-optic sensing, OptaSense, 2015.
Hofman, Joachim, et al., "Analysis of the acoustic response in water and sand of different fiber optic sensing cables," SPIE Sensing Technology + Applications, 2015, Baltimore, Maryland, U.S., Proceedings vol. 9491, Sensors for Extreme Harsh Environments II; 94910E (2015) https://doi.org/10.1117/12.2178282.
Hull, John William, et al., "Well-Integrity Monitoring and Analysis Using Distributed Fiber-Optic Acoustic Sensors," IADC/SPE Drilling Conference and Exhibition, Feb. 2-4, 2010, New Orleans, Louisiana, US, SPE-128304-MS, https://doi.org/10.2118/128304-MS.
Sensys, "Sand Alert—Fixed and Portable Sand Monitoring," Isensys LLP, Sep. 2016, www.isensys.co.uk.
Johannessen, Kjetil, et al., "Distributed Acoustic Sensing—A New Way of Listening to Your Well/Reservoir," SPE Intelligent Energy International, Mar. 27-29, 2012, Utrecht, NL, SPE-149602-MS, https://doi.org/10.2118/149602-MS.
Lashgari, Hamid R., et al., "A Four-Phase Chemical/Gas Model in an Implicit-Pressure/ Explicit-Concentration Reservoir Simulator," SPE J. 21 (2016): 1086-1105 (Year: 2016).
Li, Meng, et al., "Current and Future Applications of Distributed Acoustic Sensing as a New Reservoir Geophysics Tool," The Open Petroleum Engineering Journal, 2015, 8, (Suppl 1: M3) 272-281.
Ma, King, et al. "Deep Learning on Temporal-Spectral Data for Anomaly Detection," Department of Electrical and Computer Engineering, University of Calgary, Proc. of SPIE vol. 10190, 2017.
Martin, Shawn, "Can Oil Well Monitoring Systems Withstand Stimulation Treatments," Feb. 26, 2015, https://insights.globalspec.com/article/601/can-oil-well-monitoring-systems-withstand-stimulation-treatments [retrieved on Aug. 18, 2020].

Martinez, Roberto Jr., "Diagnosis of Fracture Flow Conditions With Acoustic Sensing," SPE Hydraulic Fracturing Technology Conference, Feb. 4-6, The Woodlands, Texas, US, Publication Date 2014.
Miller, Douglas E., et al., "Vertical Seismic Profiling Using a Fiber-optic Cable as a Distributed Acoustic Sensor," 74th EAGE Conference Exhibition incorporating SPE EUROPEC 2012, Copenhagen, Denmark, Jun. 4-7, 2012.
Mohd Daud, Farik, et al., "Successful Application of Ultrasound Technology to Detect Sand Producing Intervals in the Wellbore," International Petroleum Technology Conference, Nov. 15-17, 2011, Bangkok, Thailand, IPTC-14737-MS, https://doi.org/10.2523/IPTC-14737-MS.
Molenaar, Mathieu, et al., "Downhole tests show benefits of distributed acoustic sensing," Oil and Gas Journal 109 (1):82-85, Jan. 2011.
Molenaar, Menno M., et al., "First Downhole Application of Distributed Acoustic Sensing for Hydraulic-Fracturing Monitoring and Diagnostics," SPE Drilling Completion, vol. 27, Is. 1, Mar. 2012, SPE-140561-PA, https://doi.org/10.2118/140561-PA.
Mullens, Stephen, et al., "Fiber-Optic Distributed Vibration Sensing Provides Technique for Detecting Sand Production," Offshore Technology Conference, May 3-6, 2010, Houston, Texas, US, OTC-20429-MS, https://doi.org/10.4043/20429-MS.
Naldrett, G., et al., "Production Monitoring Using Next-Generation Distributed Sensing Systems," Petrophysics, vol. 59, No. 4 (Aug. 2018); pp. 496-510; 16 Figures. DOI: 10.30632/PJV59V4-2018a5.
One Petro Search Results, Jul. 22, 2021, 10 pp. (Year: 2021).
Paleja, Rakesh, et al., "Velocity Tracking for Flow Monitoring and Production Profiling Using Distributed Acoustic Sensing," SPE Annual Technical Conference and Exhibition, Sep. 28-30, 2015, Houston, Texas, US, SPE-174823-MS, https://doi.org/10.2118/174823-MS.
Roxar sand monitor, https://www.emerson.com/en-us/automation/roxar.
Roxar, "Sand Monitor, Non-intrusive acoustic sensor," Draft 1-120209, Sundheim-Madison Feb. 2009.
Schultz, Whitney H., "Time-Lapse Multicomponent Geophone and DAS VSP Processing and Analysis," Colorado School of Mines, Geo-Physics Department, 2019.
Silixa, "Fracture Monitoring," https://silixa.com/solutions/oil-and-gas-downhole/frac-services/fracture-monitoring/.
Silixa, "Well Integrity," https://silixa.com/solutions/oil-and-gas-downhole/permanent-reservoir-and-well-surveillance/well-integrity/.
Silkina, Tatiana, "Application of Distributed Acoustic Sensing to Flow Regime Classification," Natural Gas Technology, Norwegian University of Science and Technology, Jun. 2014.
Stokely, Christopher L., "Acoustics-Based Flow Monitoring During Hydraulic Fracturing," SPE-179151-MS, Society of Petroleum Engineers, SPE Hydraulic Fracturing Technology Conference, Feb. 9-11, 2016, The Woodlands, Texas, USA, https://doi.org/10.2118/179151-MS.
Susilo, Yoliandri, et al., "Significant Increase in Sand Control Reliability of Open Hole Gravel Pack Completions in ACG Field—Azerbaijan," SPE European Formation Damage Conference Exhibition, Jun. 5-7, 2013, Noordwijk, NL, SPE-165206-MS, https://doi.org/10.2118/165206-MS.
Thiruvenkatanathan Prad: "Seeing the LYTT: Real time flow profiling in hydrocarbon wells", Jun. 11, 2020 (Jun. 11, 2020), pages 1-3, XP055776735, Retrieved from the Internet: URL:https://www.lytt.com/blog/the-new-tool-thati-s-lytting-up-inflow-profiling [retrieved—on Feb. 16, 2021], p. 1 p. 2.
Tiffin, David L., et al., "Drawdown Guidelines for Sand Control Completions", SPE International, SPE 84495, Oct. 5 (Oct. 5, 2003), pp. 1-10, XP002361435.
Van der Horst, Juun, et al., "Fibre Optic Sensing For Improved Wellbore Production Surveillance," International Petroleum Technology Conference, Jan. 19-22, 2014, Doha, Qatar, IPTC-17528-MS, https://doi.org/10.2523/IPTC-17528-MS.
Wang, Fang, et al., "Pipeline Leak Detection by Using Time-Domain Statistical Features," IEEE Sensors Journal, vol. 17, No. 19, Oct. 2017.

(56) References Cited

OTHER PUBLICATIONS

Wang, Kai, et al., "Vibration Sensor Approaches for the Monitoring of Sand Production in Bohai Bay," Hindawi Publishing Corporation, Shock and Vibration, vol. 2015, Article ID 591780, http://dx.doi.org/10.1155/2015/591780.
Williams, J., "Distributed acoustic sensing for pipeline monitoring," Pipeline and Gas Journal Jul. 2012, vol. 239 No. 7.
World first installation of a fibre optic acoustic sensor for reservoir monitoring, Oil and Gas Product News, Oct. 30, 2009.
Notification on Intention to Grant dated Mar. 5, 2022, EA Application No. 201892228.
Notice of Acceptance dated Mar. 24, 2022, AU Application No. 2017246520, filed on Oct. 3, 2018.
Decision to Grant dated Apr. 7, 2022, for European Application No. 19198488.9.
Notice of Acceptance dated Dec. 15, 2021, EA Application No. 2020090528.
International Preliminary Report on Patentability dated Mar. 31, 2022, PCT Application No. PCT/EP2019/075385.
International Preliminary Report on Patentability dated Mar. 31, 2022, PCT Application No. PCT/EP2019/075378.
International Preliminary Report on Patentability dated Mar. 3, 3022, PCT Application No. PCT/US2019/046759.
International Preliminary Report on Patentability dated Mar. 10, 2022, PCT Application No. PCT/EP2020/072811.
International Preliminary Report on Patentability dated Apr. 28, 2022, PCT Application No. PCT/EP2019/078195.
International Preliminary Report on Patentability dated Mar. 31, 2022, PCT Application No. PCT/EP2019/075387.
International Preliminary Report on Patentability dated Mar. 31, 2022, PCT Application No. PCT/EP2019/075382.
International Preliminary Report on Patentability dated Apr. 28, 2022, PCT Application No. PCT/EP2019/085454.
GCC Examination Report dated Dec. 1, 2021, for GCC Application No. GC2020-40675.
International Preliminary Report on Patentability dated Apr. 28, 2022, PCT Application No. PCT/EP2019/078197.
Advisory Action dated Mar. 2, 2022, U.S. Appl. No. 17/071,021, filed Oct. 20, 2020.
Notice of Allowance dated Apr. 6, 2022, U.S. Appl. No. 17/071,021, filed Oct. 20, 2020.
Final Office Action dated Apr. 4, 2022, U.S. Appl. No. 16/698,407, filed Nov. 27, 2019.
Office Action dated Mar. 15, 2022, EA Application No. 202191441.
Examination Report dated Oct. 17, 2021, GC Application No. 2020-40879.
International Preliminary Report on Patentability dated Apr. 28, 2022, PCT Application No. PCT/EP2020/051817.
Ansari, Rafay et al., "Advanced Petrophysical Surveillance Improves the Understanding of Well Behavior in Unconventional Reservoirs," Society of Petroleum Engineers (SPE-170878-MS), The Netherlands, Oct. 27-29, 2014.
Office Action dated Apr. 26, 2022, U.S. Appl. No. 16/710,237, filed Dec. 11, 2019.
Notification on Intention to Grant dated Mar. 5, 2022, EA Application No. 201892227.
Office Action dated Jan. 7, 2022, U.S. Appl. No. 16/091,519, filed Oct. 4, 2018.
Office Action dated Dec. 12, 2020, EG Application No. PCT1590/2018.
Office Action dated Apr. 22, 2020, EA Application No. 201892228.
Office Action dated Nov. 23, 2020, EA Application No. 201892228.
Office Action dated Jun. 28, 2021, EA Application No. 201892228.
EP Rule 161(1) and 162 EPC Communication dated Jul. 12, 2018, EP Application No. 17715935.7.
European Office Action dated Feb. 22, 2022, EP Application No. 20170700.7.
Office Action dated Aug. 1, 2021, EG Application No. 1588/2018.
Office Action dated Mar. 23, 2020, EA Application No. 201892227.
Office Action dated Nov. 16, 2020, EA Application No. 201892227.
Office Action dated Jun. 17, 2021, EA Application No. 201892227.
EP Rule 161(1) and 162 EPC Communication dated Nov. 29, 2018, EP Application No. 17715932.4.
Decision to Grant dated Feb. 2, 2020, EP Application No. 17715932.4.
European Article 94(3) dated Jun. 8, 2020, EP Application No. 20154638.9.
Intention to Grant dated Feb. 25, 2021, EP Application No. 20154638.9.
Decision to Grant dated Jul. 15, 2021, EP Application No. 20154638.9.
Intention to Grant dated Feb. 23, 2021, for European Application No. 18714513.1.
Decision to Grant dated Jun. 24, 2021, for European Application No. 18714513.1.
Intention to Grant dated Feb. 3, 2021, for European Application No. 19198488.9.
Intention to Grant dated Nov. 23, 2021, for European Application No. 19198488.9.
Eurasian Notice of Allowance dated Apr. 29, 2021, for Eurasian Application No. 201992243/31.
TT Invitation to Amend dated Nov. 5, 2021, for Eurasian Application No. 201992243/31.
Eurasian Office Action dated Nov. 20, 2020, EA Application No. 2020090528.
Eurasian Office Action dated May 27, 2021, EA Application No. 2020090528.
EP Rule 161(1) and 162 EPC Communication dated Apr. 7, 2020, Ep Application No. 18765814.1.
Intention to Grant dated Mar. 16, 2021, EP Application No. 18765814.1.
Decision to Grant dated Sep. 9, 2021, Ep Application No. 18765814.1.
International Preliminary Report on Patentability dated Jun. 24, 2021, PCT Application No. PCT/EP2019/057149.
GCC Examination Report dated Jan. 30, 2021, GCC Application No. 2019/38809.
EP Rule 161(1) and 162 EPC Communication dated Jul. 20, 2021, EP Application No. 19714346.4.
Office Action dated Aug. 25, 2021, U.S. Appl. No. 16/755,211, filed Apr. 10, 2020.
Notice of Allowance dated Jan. 21, 2022, U.S. Appl. No. 16/755,211, filed Apr. 10, 2020.
Eurasian Office Action dated Jan. 27, 2021, EA Application No. 202090867.
Eurasian Office Action dated Sep. 3, 2021, EA Application No. 202090867.
Eurasian Office Action dated Jan. 25, 2022, EA Application No. 202090867.
EP Rule 161(1) and 162 EPC Communication dated May 19, 2020, EP Application No. 18788701.3.
International Preliminary Report on Patentability dated Jun. 10, 2020, PCT Application No. PCT/EP2019/082808.
GCC Examination Report dated Nov. 17, 2020, GCC Application No. 2019/38718.
GCC Examination Report dated Jan. 6, 2021, GCC Application No. 2019/38718.
European Article 94(3) Examination Report dated Nov. 11, 2021, EP Application No. 19809084.7.
International Preliminary Report on Patentability date Sep. 23, 2021, PCT Application No. PCT/EP2019/056425.
Office Action dated Nov. 5, 2021, U.S. Appl. No. 16/817,559, filed Mar. 12, 2021.
GCC Examination Report date Jul. 26, 2021, GCC Application No. 2020/39381.
EP Rule 161(1) and 162 EPC Communication date Oct. 21, 2021, EP Application No. 19712714.5.
International Preliminary Report on Patentability dated Jan. 6, 2022, PCT Application No. PCT/IB2019/055355.
EP Rule 161(1) and 162 EPC Communication date Feb. 4, 2022, EP Application No. 19765548.3.
Office Action dated Jan. 12, 2022, U.S. Appl. No. 17/025,874, filed Sep. 18, 2020.

(56) References Cited

OTHER PUBLICATIONS

International Search Report Search Report dated Nov. 6, 2020, PCT Application No. PCT/EP2019/085454.
Final Office Action dated Dec. 7, 2021, U.S. Appl. No. 17/071,021, filed Oct. 20, 2020.
International Preliminary Report on Patentability dated Jun. 10, 2021, PCT Application No. PCT/EP2019/082809.
Office Action dated Nov. 15, 2021, U.S. Appl. No. 16/698,407, filed Nov. 27, 2019.
Examination Report dated Dec. 6, 2020, GCC Application No. GC 2019-38726.
Examination Report/Notice of Allowance dated Jun. 9, 2021, GCC Application No. GC 2019-38726.
EP Rule 161(1) and 162 EPC Communication dated Jul. 6, 2021, EP Application No. 21194305.5.
European Extended Search Report dated Nov. 23, 2021, EP Application No. 21194305.5.
Office Action dated Sep. 21, 2021, U.S. Appl. No. 17/330,117, filed May 12, 2021.
Final Office Action dated Jan. 7, 2022, U.S. Appl. No. 17/330,117, filed May 12, 2021.
3CC Examination Report dated Oct. 13, 2021, GCC Application No. 2020/40676.
International Search Report and Written Opinion dated Oct. 14, 2020, PCT Application No. PCT/EP2020/052445.
Hildebrandt Marcel et al., "A Recommender System for Complex Real-World Applications with Nonlinear Dependencies and Knowledge Graph Context", May 25, 2019 (May 25, 2019), Advances in Databases and Information Systems; [Lecture Notes in Computer Science; Lect.Notes Computer], Springer International Publishing, Cham, pp. 179-193, ISBN: 9783319104034.
WorldOil.com, "Adelous unveils distributed acoustic sensor solution for upstream oil gas," May 28, 2015. https://www.worldoil.com/news/2015/5/28/adelos-unveils-distributed-acoustic-sensor-solution-for-upstream-oil-gas.
Intention to Grant dated Sep. 26, 2019, EP Application No. 17715932.4.
CA Examination Report dated Feb. 16, 2022, CA Application No. 3,020,007.

\* cited by examiner

EVENT MODEL TRAINING USING IN SITU DATA

CROSS-REFERENCE TO RELATED APPLICATIONS

This application claims the benefit of and priority to PCT/EP2021/065081 filed Jun. 4, 2021, and entitled "Event Model Training Using In-Situ Data," and PCT/EP2020/067045 filed on Jun. 18, 2020 and entitled "Event Model Training Using In-Situ Data," each of which is incorporated herein by reference in its entirety for all purposes.

STATEMENT REGARDING FEDERALLY SPONSORED RESEARCH OR DEVELOPMENT

Not applicable.

BACKGROUND

It can be desirable to identify various events in a wellbore environment. For example, to obtain hydrocarbons from subterranean formations, wellbores are drilled from the surface to access the hydrocarbon-bearing formation. After drilling a wellbore to the desired depth, a production string is installed in the wellbore to produce the hydrocarbons from one or more production zones of the formation to the surface. The production of the fluids can be detected at the wellhead based on total flow of fluid. However, it can be difficult to determine where the fluid is inflowing into the wellbore when multiple productions zones are present and an extent of the fluid inflow (e.g., a fluid inflow rate).

BRIEF SUMMARY

In some embodiments, a method of identifying events within a wellbore comprises: obtaining a first set of measurements of a first signal within a wellbore; identifying one or more events within the wellbore using the first set of measurements; obtaining a second set of measurements of a second signal within the wellbore, wherein the first signal and the second signal represent different physical measurements; training one or more event models using the second set of measurements and the identification of the one or more events as inputs; and using the one or more event models to identify at least one additional event within the wellbore.

In some embodiments, a system for identifying events within a wellbore comprises: a memory; an identification program stored in the memory; and a processor, wherein the identification program, when executed on the processor, configures the process to: receive a first set of measurements of a first signal within a wellbore; identify one or more events within the wellbore using the first set of measurements; receive a second set of measurements of a second signal within the wellbore, wherein the first signal and the second signal represent different physical measurements; train one or more event models using the second set of measurements and the identification of the one or more events as inputs; and use the one or more event models to identify at least one additional event within the wellbore.

In some embodiments, a method of identifying events within a wellbore comprises: obtaining a first set of measurements of a first signal within a wellbore; identifying one or more events within the wellbore using the first set of measurements, wherein the one or more events comprise a gas phase inflow, a liquid phase inflow, or sand ingress into the wellbore; obtaining an acoustic data set from within the wellbore, wherein the first signal is not an acoustic signal; training one or more fluid inflow models using the acoustic data set and the identification of the one or more events as inputs; and using the trained one or more fluid inflow models to identify at least one additional fluid inflow event within the wellbore.

In some embodiments, a method of predicting wellbore sensor data comprises: obtaining a first set of measurements of a first signal within a wellbore; identifying one or more events within the wellbore using the first set of measurements; obtaining a second set of measurements of a second signal within the wellbore, wherein the first signal and the second signal represent different physical measurements; training one or more event models using the second set of measurements and the identification of the one or more events as inputs; identifying, using the one or more event models, one or more additional events within the wellbore; using the one or more additional events with one or more formation properties; and predicting a third set of measurements in response to combining the one or more additional events with the formation properties, wherein the third set of measurements represents a third signal that is different than the first signal and the second signal.

In some embodiments, a system for predicting wellbore sensor data comprises: a memory; a prediction program stored in the memory; and a processor, wherein the prediction program, when executed on the processor, configures the process to: receive a first set of measurements of a first signal, wherein the first set of measurements originate from within a wellbore; identify one or more events within the wellbore using the first set of measurements; receive a second set of measurements of a second signal, wherein the second set of measurements originate from within the wellbore, wherein the first signal and the second signal represent different physical measurements; train one or more event models using the second set of measurements and the identification of the one or more events as inputs; identify, using the one or more event models, one or more additional events within the wellbore; use the one or more additional events with one or more formation properties; and determine a third set of measurements in response to combining the one or more additional events with the formation properties, wherein the third set of measurements represent predicted physical parameters within the wellbore, wherein the third set of measurements represents a third signal that is different than the first signal and the second signal.

In some embodiments, a method of predicting wellbore sensor data comprises: training one or more event models using a second set of measurements and an identification of one or more events as inputs, wherein a first set of measurements of a first signal are obtained within a wellbore, wherein one or more events within the wellbore are identified using the first set of measurements, wherein the second set of measurements of a second signal are obtained within the wellbore, and wherein the first signal and the second signal represent different physical measurements; identifying, using the one or more event models, one or more additional events within the wellbore; using the one or more additional events with one or more formation properties; and predicting a third set of measurements in response to combining the one or more additional events with the formation properties, wherein the third set of measurements represents a third signal that is different than the first signal and the second signal.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
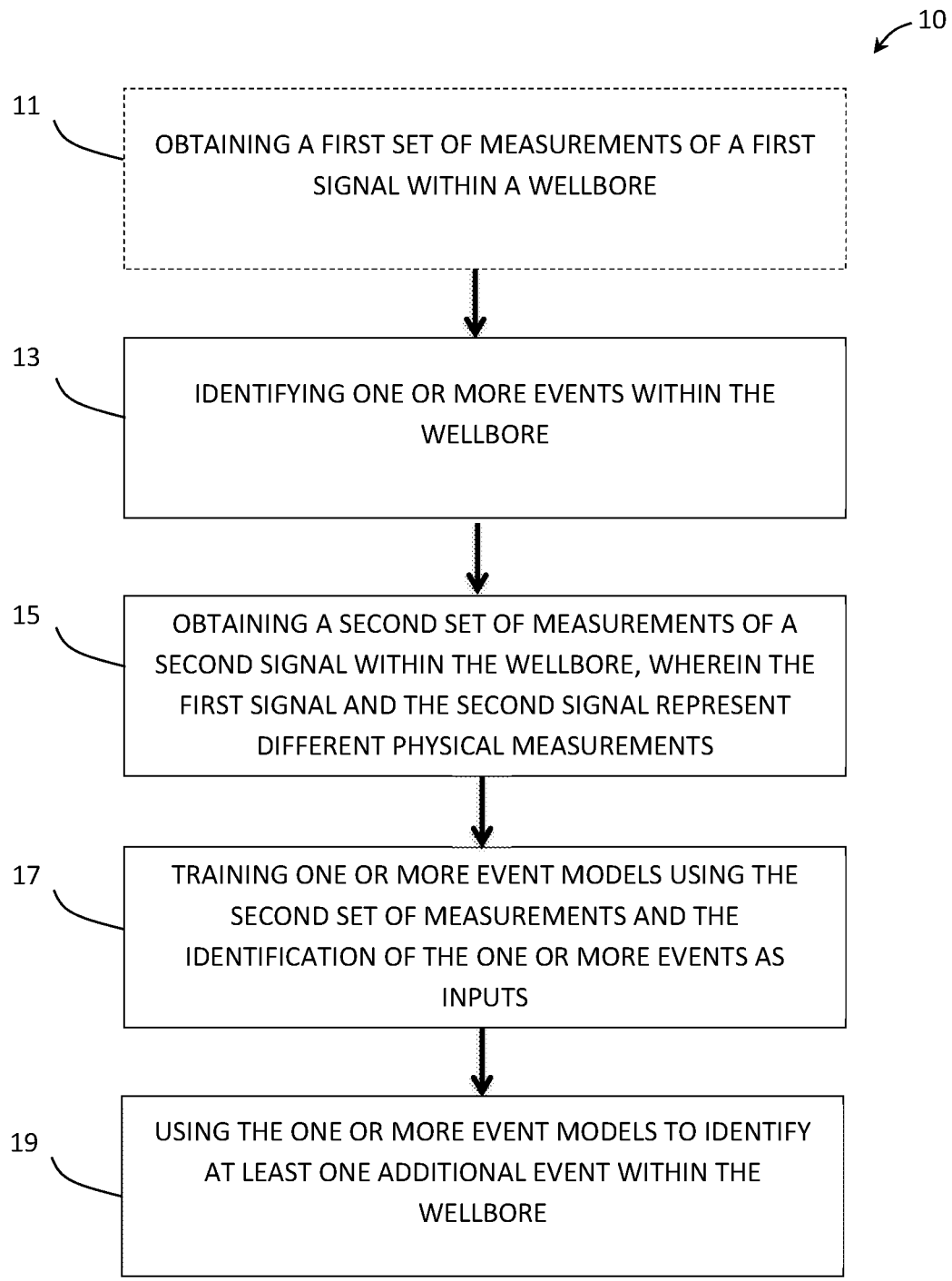
FIG. 1 is a flow diagram of a method for identifying events within a wellbore according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "above" meaning toward the surface of the wellbore and with "down," "lower," "downward," "downstream," or "below" meaning toward the terminal end of the well, regardless of the wellbore orientation. Reference to inner or outer will be made for purposes of description with "in," "inner," or "inward" meaning towards the central longitudinal axis of the wellbore and/or wellbore tubular, and "out," "outer," or "outward" meaning towards the wellbore wall. As used herein, the term "longitudinal" or "longitudinally" refers to an axis substantially aligned with the central axis of the wellbore tubular, and "radial" or "radially" refer to a direction perpendicular to the longitudinal axis. The various characteristics mentioned above, as well as other features and characteristics described in more detail below, will be readily apparent to those skilled in the art with the aid of this disclosure upon reading the following detailed description of the embodiments, and by referring to the accompanying drawings.

As utilized herein, a 'fluid flow event' includes fluid inflow (e.g., any fluid inflow regardless of composition thereof), gas phase inflow, aqueous phase inflow, hydrocarbon phase inflow, any fluid outflow (e.g., any fluid outflow regardless of composition thereof), gas phase outflow, aqueous phase outflow, hydrocarbon phase outflow, fluid flow within the wellbore (e.g., any fluid flow regardless of the composition thereof), any fluid injection, any fluid phase flow or mixed phase flow, and/or any fluid flow through one or more leak paths or annuli within the wellbore. The fluid can comprise other components such as solid particulate matter (e.g., sand, etc.) in some embodiments, as discussed in more detail herein.

Disclosed herein are systems and methods for identifying events within a wellbore, for example, determining the presence of an event, such as a fluid flow event, sand ingress, a specific fluid phase, leaks, equipment failures, and the like at one or more locations within a subterranean wellbore. As used herein, the term acoustic signals refers to signals representative of measurements of acoustic sounds, dynamic strain, vibrations, and the like, whether or not within the audible or auditory range.

Disclosed herein are systems and methods for identifying events within a subterranean wellbore, for example, so that a wellbore operator may more effectively control the fluid production from the wellbore. According to embodiments of this disclosure, an event can be identified within the wellbore, and data corresponding to the event can be obtained and used to provide training data for one or more event models. The event can be identified in a number of ways including inducing or having a known, local event, and/or using one or more sensors that are different from the obtained data to provide information to identify the event. For example, the injection of a fluid from an injection mandrel can be used as a known fluid injection event at a specific location within the wellbore. Data from sensors within the wellbore during the fluid injection can then be used to provide training data for a fluid injection model. As another example, a first set of measurements or data of a first signal within a wellbore can be utilized to provide identify an event using one or more event models, and a second set of measurements of a second signal within the wellbore can be obtained based on the event identification. The event identification using the one or more event models can be used with the second set of measurements to provide training data for one or more additional event models. Utilizing the first set of measurements as a local reference to identify local events allows for the one or more event models to be trained using identified signals. This can help to provide data for training the one or more models that might not otherwise be available, and/or provide data to allow one or more existing models to be calibrated. For example, the one or more event models may be trained using laboratory data and then calibrated using the data obtained during an actual event.

By way of example, in some embodiments, the first set of measurements comprises temperature features that can be determined from temperature measurements taken along a length being monitored, such as a length of a wellbore. The temperature measurements can be used in one or more first wellbore event models that can provide an output indicative of event location(s), for example, fluid inflow locations along a wellbore. This can allow those locations with the event (e.g., fluid inflow) to be identified using temperature based measurements (e.g., from the wellbore). When combined with a (e.g., distributed) temperature sensing system that can provide distributed and continuous temperature measurements, the systems can allow for event (e.g., fluid inflow) locations to be tracked through time. In embodiments, various frequency domain features can be obtained from an acoustic signal originating from the event (e.g., within the wellbore). The acoustic signals can be obtained using a distributed acoustic sensing (DAS) system that allows for continuous and distributed acoustic sensing. The acoustic signals can be taken along the same portions of the length (e.g., length of the wellbore) as the temperature measurements, thereby allowing for information about the events (e.g., fluid inflow events), to be determined using both the temperature features and the frequency domain features. The identification of the event using the temperature measurements can be used to label the acoustic data, and corresponding frequency domain features, to provide a frequency domain feature based training set for one or more second event models. In some embodiments, one or more second event models can be trained with the one or more events identified via the DTS data and the acoustic measurements. The trained one or more second event models can subsequently be utilized with one or more frequency domain features to identify at least one additional event (e.g., fluid inflow locations and/or rates for one or more fluids and/or fluid phases of a fluid inflow event).

In aspects, the one or more trained event models can subsequently be utilized alone or together with the one or more wellbore event models, thus allowing the event locations to be determined using temperature features, an/or acoustic features. The trained one or more second event models can be used to verify or validate information (e.g., event locations) as determined from the one or more first or event models and/or other sensors. In aspects, the trained one or more event models can be utilized to predict sensor data. The herein disclosed systems and methods can thus help to provide an improved event location determination for use in managing the event.

FIG. 1 is a flow diagram of a method 10 for identifying events within a wellbore according to some embodiments. As depicted in FIG. 1, the method 10 of identifying events within a wellbore comprises: identifying one or more events within the wellbore at 13; obtaining a second set of measurements of a second signal within the wellbore, at 15, wherein the first signal and the second signal represent different physical measurements; training one or more event models using the second set of measurements and the identification of the one or more events as inputs 17; and using the one or more event models to identify at least one additional event at 19, which can be at least one additional event in the same wellbore or a different wellbore. The one or more events identified at step 13 can be identified using a local or induced event, and/or the one or more events can be identified based on a first set of measurements of a first signal within the wellbore as an optional process at step 11. The first set of measurements and/or the first signal can comprise signals from one or more sensors, and in some aspects, signals from multiple sensors can be used in the identification of the event. When a first set of measurements obtained, the identification of the one or more events can use the first set of measurements and first signal to identify the one or more events within the wellbore at step 13.

The new signal processing architecture disclosed herein allows for the identification of various events (e.g., the identification and detection of the presence of the event at one or more locations) within a wellbore. Such wellbore events can include a fluid inflow event (e.g., including fluid inflow detection, fluid inflow location determination, fluid inflow quantification, fluid inflow discrimination, etc.), fluid outflow event (e.g., fluid outflow detection, fluid outflow quantification), fluid flow within the wellbore (e.g., any fluid flow regardless of the composition thereof), any fluid injection, any fluid phase flow or mixed phase flow, and/or any fluid flow through one or more leak paths or annuli within the wellbore, fluid phase segregation, fluid flow discrimination within a conduit, well integrity monitoring, including in-well leak detection (e.g., downhole casing and tubing leak detection, leaking fluid phase identification, etc.), flow assurance (e.g., wax deposition), annular fluid flow diagnosis, overburden monitoring, fluid flow detection behind a casing, fluid induced hydraulic fracture detection in the overburden (e.g., micro-seismic events, etc.), sand detection (e.g., sand ingress, sand flows, etc.), and the like, each in real time or near real time in some embodiments. Without limitation, in embodiments, the one or more events identified at 13 can comprise flow events, leak events, sand ingress events, leak events, or a combination thereof.

In some aspects, the one or more events can be identified at step 13 using known operating parameters such as an induced event. Sensor inputs such as operating controls and sensors can be associated with the event that is known or controlled such that an identification of the event may be known and/or one or more parameters of the event (e.g., an extent of the event) may be known. For example, a fluid can be injected into a known location within the wellbore such that the identification of the event (e.g., fluid injection) is occurring at a known location, and one or more parameters of the event (e.g., fluid phase, flow rate, etc.) may also be known. This information can then be used as the identification of the event that can be used with a second set of measurement associated with the event to provide labeled data for training one or more second event models.

As an example of a known event, a gas injection mandrel is a tool that can be disposed at a known depth in the wellbore and can be used to inject gas into the wellbore. The gas can serve to lift fluids within the wellbore towards the surface of the wellbore, thereby helping to transport the produced fluids along the wellbore. The flow rate through the gas injection mandrel can be determined and controlled using sensors and controllers on the production site. Further, the composition of the gas can also be known based on the gas injection being induced and controlled as part of the gas injection process. In this example, the event could include gas injection at a known location and/or gas flow along the wellbore at a point above the gas injection mandrel. The additional parameters such as the gas flowrate would also be known based on the sensors and controllers associated with the gas injection process. Thus, a known and/or induced event can be used as the basis for collecting additional sensor information associated with the event and/or one or more event parameters.

In some aspects, the event may not be known, and a first set of measurements can optionally be obtained that have a first signal used to identify the one or more events at step 11. For example, fluid inflow, fluid leaks, overburden movements, sand ingress, and the like can occur within the wellbore. These events may often be transitory and the occurrence of the event (e.g., an identification of the event), its duration, and the extent of the event may not be easily known based on controllable operating parameters of the wellbore. In this instance, the first set of measurements comprising the first signal can be used with one or more first event models to identify the event. The first set of measurements and/or the first signal can comprise signals from one or more sensors, and in some aspects, signals from multiple sensors can be used in the identification of the event. The one or more first event models can comprise any of the models as described herein, and can use the first signal to identify the event, its duration, and/or extent within the wellbore. In some aspects, the one or more first event models can comprise models based on first principles analysis, physics-based models, or the like. In some aspects, the one or more first event models can comprise one or more machine learning models. This can allow the event and/or parameters associated with the event to be identified when the event is not known or induced.

When a first set of measurements is used as the basis for identifying the event within the wellbore, the first signal and the second signal can be different. For example, the first signal and the second signal can represent different physical measurements. Any type of signal used in industrial processes can be used for the first signal and the second signal. In some aspects, the first set of measurements can comprise, for example, at least one of an acoustic sensor measurement, a temperature sensor measurement (e.g., distributed temperature sensor (DTS) measurements and/or point temperature sensor measurements), flow meter measurements, pressure sensor measurements (e.g., distributed or point pressure sensor measurements), a strain sensor measurements, position sensor measurements, current meter measurements, level sensor measurements, phase sensor measurements, composition sensor measurements, optical sensor measurements, image sensor measurements, or any combination thereof. While the temperature and/or acoustic monitoring techniques described herein are indicated as being distributed measurements, any of the distributed measurements can also be achieved using one or more point sources, which can be individual sources or connected sources along a path.

Figure 3:
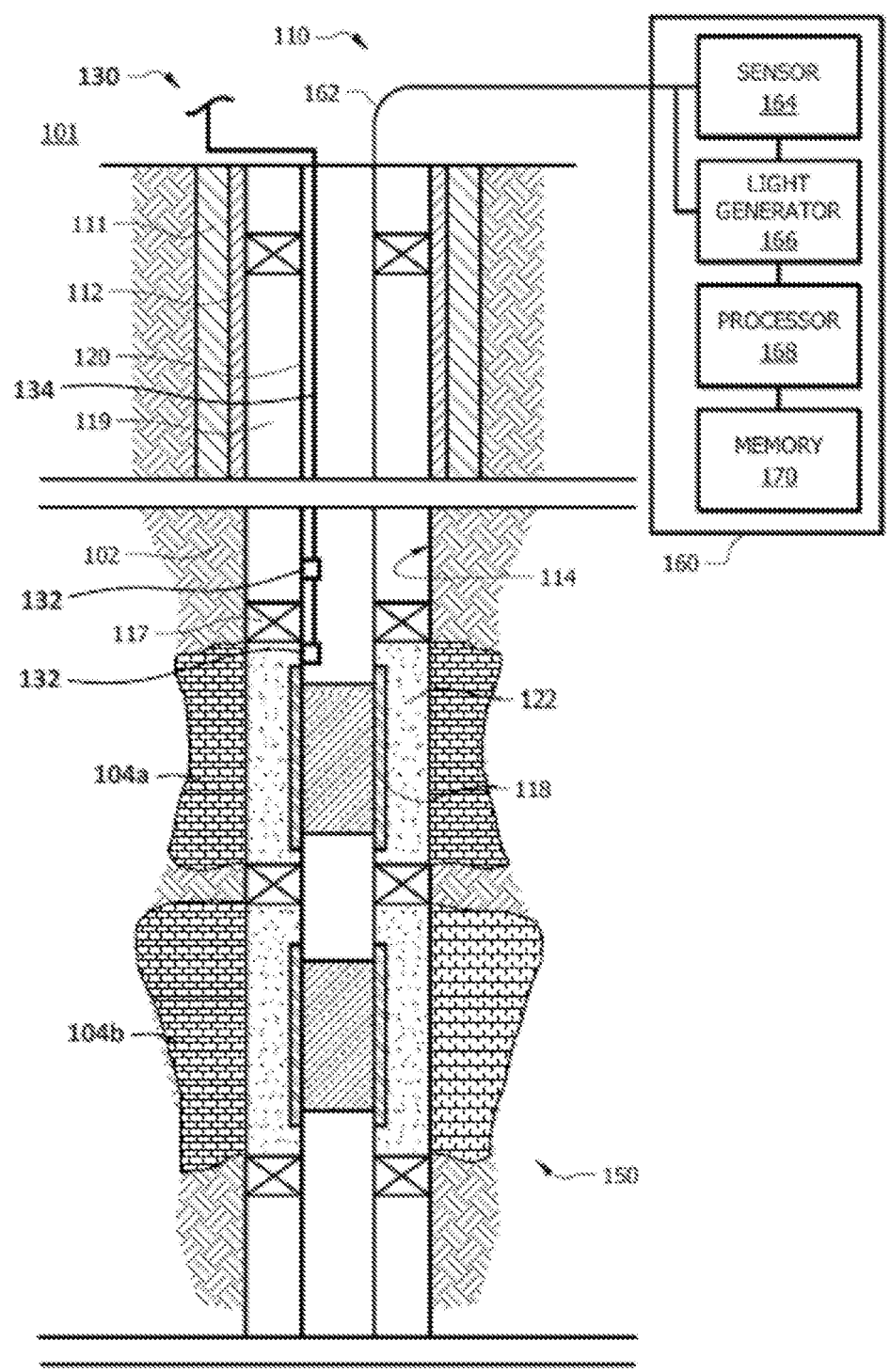
FIG. 3 is a schematic, cross-sectional illustration of a downhole wellbore environment according to some embodiments.

In aspects, the second set of measurements obtained at 15 comprises acoustic measurements obtained within the wellbore. Such acoustic measurements can be obtained as described hereinbelow with reference to FIG. 3, which is a schematic, cross-sectional illustration of a downhole wellbore environment 110 comprising wellbore 114 according to some embodiments. As depicted in FIG. 3, fiber optic distributed acoustic sensors (DAS) can be utilized to capture distributed acoustic signals, as described further hereinbelow.

As noted hereinabove, the first signal and the second signal represent different physical measurements. For example, in embodiments wherein the second set of measurements obtained at 15 comprise acoustic measurements obtained within the wellbore 114, the first set of measurements will not comprise such acoustic measurements or measurements of acoustic or vibrational waves (e.g., dynamic strain measurements). In aspects, the first set of measurements can comprise, for example, at least one of distributed temperature sensor (DTS) measurements, point temperature measurements, production logging tool (PLT) measurements, flow meter measurements, pressure sensor (e.g., distributed or point sensor pressure sensor) measurements, or combinations thereof. Fiber optic distributed temperature sensors (DTS) can be utilized to capture distributed temperature sensing signals, as described further hereinbelow. Although DTS is detailed hereinbelow, it is to be understood that a variety of combinations of first signal and second signal can be utilized to train one or more event models using the second set of measurements of the second signal and one or more events identified using the first set of measurements of the first signal. That is, in embodiments, neither the first set of measurements nor the second set of measurements comprises DTS measurements; in embodiments, neither the first set of measurements nor the second set of measurements comprises DAS measurements; in embodiments, neither the first set of measurements nor the second set of measurements comprises DTS or DAS measurements.

As utilized herein, "fluid flow discrimination" indicates an identification and/or assignment of the detected fluid flow (e.g., single phase flow, mixed phase flows, time-based slugging, altering fluid flows, etc.), gas flow, hydrocarbon liquid (e.g., 'oil') flow, and/or aqueous phase (e.g., water) flow, including any combined or multiphase flows (e.g., inflows, outflows, and/or flows along the wellbore and/or one or more annuli). The methods of this disclosure can thus be utilized, in aspects, to provide information on various events such as a fluid flow and/or a fluid flow point or location as well as flow regimes within a conduit rather than simply a location at which gas, water, or hydrocarbon liquid is present in the wellbore tubular (e.g., present in a flowing fluid), which can occur at any point above the ingress or egress location as the fluid flows to or from the surface of the wellbore. In some embodiments, the system allows for a quantitative measurement of various fluid flows such as a relative concentration of in-well hydrocarbon liquid, water, and/or gas.

In some instances, the systems and methods can provide information in real time or near real time. As used herein, the term "real time" refers to a time that takes into account various communication and latency delays within a system, and can include actions taken within about ten seconds, within about thirty seconds, within about a minute, within about five minutes, or within about ten minutes of the action occurring. Various sensors (e.g., distributed temperature sensing sensors, distributed fiber optic acoustic sensors, point temperature sensors, point acoustic sensors, production logging tools, etc.) can be used to obtain a distributed temperature signal and/or an acoustic signal at various points along a length being monitored, for example, along a wellbore. The distributed temperature sensing signal and/or the acoustic signal can then be processed using signal processing architecture with various feature extraction techniques (e.g., temperature feature extraction techniques, spectral feature extraction techniques) to obtain a measure of one or more temperature features, one or more frequency domain features, and/or combinations thereof that enable selectively extracting the distributed temperature sensing signals and acoustic signals of interest from background noise and consequently aiding in improving the accuracy of the identification of events, including, for example, the movement of fluids (e.g., gas inflow locations, water inflow locations, hydrocarbon liquid inflow locations, etc.) in real time. While discussed in terms of being real time in some instances, the data can also be analyzed at a later time at the same location and/or a displaced location. For example, the data can be logged and later analyzed at the same or a different location.

As used herein, various frequency domain features can be obtained from the acoustic signal, and in some contexts, the frequency domain features can also be referred to herein as spectral features or spectral descriptors. In some embodiments, the spectral features can comprise other features, including those in the time domain, various transforms (e.g., wavelets, Fourier transforms, etc.), and/or those derived from portions of the acoustic signal or other sensor inputs. Such other features can be used on their own or in combination with one or more frequency domain features, including in the development of transformations of the features, as described in more detail herein.

In some embodiments, distributed temperature sensing signals and acoustic signal(s) can be obtained in a manner that allows for a signal to be obtained along a length of the sensor, for example, an entire wellbore or a portion of interest (e.g., a depth) thereof. In wellbore contexts, production logging systems can use a production logging system (PLS) to determine flow profile in wells. The PLS can be 10-20 meters long and the sensors can be distributed along the length of the PLS. The PLS can measure a variety of parameters such as temperatures, pressures, flow rates, phase measurements (e.g., gas flow rate, water flow rate, hydrocarbon flow rate, etc.), and the like. Furthermore, a PLS can be run through a well once or a few times (down and then up once or a few times and out), and the sensors may be exposed to the conditions at a given depth for a defined period of time (e.g., seconds to hours). Accordingly, PLSs can provide an indication that certain events, such as downhole water inflow, may be occurring, on a time scale sufficient to identify an event to allow a second set of measurements to be obtained and used for training.

Fiber optic distributed temperature sensors (DTS) and fiber optic distributed acoustic sensors (DAS) can capture distributed temperature sensing and acoustic signals, respectively, resulting from downhole events, such as wellbore events (e.g., gas flow, hydrocarbon liquid flow, water flow, mixed flow, leaks, overburden movement, and the like), as well as other background events. This allows for signal processing procedures that distinguish events and flow signals from other sources to properly identify each type of event. This in turn results in a need for a clearer understanding of the fingerprint of in-well event of interest (e.g., fluid flow, water flow, gas flow, hydrocarbon liquid flow, fluid flow along the tubulars, etc.) in order to be able to segregate and identify a signal resulting from an event of interest from other ambient background signals. As used herein, the resulting fingerprint of a particular event can also be referred to as an event signature, as described in more detail herein. In some embodiments, temperature features and acoustic features can each be used with a model (e.g., a machine learning model such as a multivariate model, neural network, etc.) to provide for detection, identification, and/or determination of the extents of various events. A number of different models can be developed and used to determine when and where certain events have occurred within a wellbore and/or the extents of such events.

The ability to identify various wellbore events may allow for various actions or processes to be taken in response to the events. For example, reducing deferrals in wellbores resulting from one or more events such as water ingress and facilitating effective remediation relies upon accurate and timely decision support to inform the operator of the events. As another example, with respect to events within a wellbore, a well can be shut in, production can be increased or decreased, and/or remedial measures can be taken in the wellbore, as appropriate based on the identified event(s). An effective response, when needed, benefits not just from a binary yes/no output of an identification/detection of in-well events but also from a measure of an extent of the event, such as a relative amount of fluids (e.g., amount of gas flow, amount of hydrocarbon liquid flow, amount of water flow, etc.) from each of the identified zones of events so that zones contributing the greatest fluid amount(s) can be acted upon first to improve or optimize production. The systems and methods described herein can be used, in applications, to identify the source of an event or problem, as well as additional information about the event (referred to herein as an "extent" of the event), such as a direction and amount of flow, and/or an identification of the type of problem being faced. For example, when an event comprising water inflow and a location thereof are detected, determination of an extent of the inflow event comprising a relative flow rate of the hydrocarbon liquid at the water inflow location may allow for a determination of whether or not to remediate, the type or method of remediation, the timing for remediation, and/or deciding to alter (e.g., reduce) a production rate from the well. For example, production zones can be isolated, production assemblies can be open, closed, or choked at various levels, side wells can be drilled or isolated, and the like. Such determinations can be used to improve on the drawdown of the well while reducing the production expenses associated with various factors such as produced water.

Once obtained, the temperature and acoustic features can be used in various models in order to be able to segregate a noise resulting from an event of interest from other ambient background noise. Specific models can be determined for each event by considering one or more temperature features and/or acoustic features for known events. The combination of the temperature features and/or acoustic features with an identification of the event and/or parameters associated with the event can be used to form a known data set used for training, which can be referred to as a labeled data set. From these known events, the temperature and/or acoustic features specific to each event can be developed and signatures (e.g., having ranges or thresholds) and/or models can be established to determine a presence (or absence) of each event. Based on the specifics of each temperature and/or acoustic feature, the resulting signatures or models can be used to sufficiently distinguish between events to allow for a relatively fast identification of such events. The resulting signatures or models can then be used along with processed distributed temperature sensing and/or acoustic signal data to determine if an event is occurring at a point of interest along the path of the temperature and/or acoustic sensor(s).

Any of the processing techniques disclosed herein can be used to initially determine a signature or model(s), and then process and compare the temperature and/or acoustic features in a sampled temperature sensing and/or acoustic signal with the resulting signatures or model(s). According to this disclosure, the events can be identified based on being known or induced events, and/or identified using a first set of measurements (e.g., DTS) of a first signal in the wellbore with one or more first event models. The identification of the event can then be used with a second set of measurements to provide labeled data that can be used to determine and/or train one or more second event models using sensor data that is physically disparate from the first set of measurements. In some aspects the determination and/or training of the one or more second event models can comprise using one or more known second event models, and using the identified labeled data to calibrate the model, for example, by adjusting one or more parameters or aspects of the model to match the in-situ data.

The systems and methods of this disclosure can be utilized for detecting (e.g., identifying one or more events out of many potential events) and characterizing wellbore events. In some embodiments, the wellbore events can comprise fluid flow locations and/or fluid flow regimes within a conduit in the wellbore. In some embodiments, other wellbore events such as fluid phase segregation, fluid flow discrimination within a conduit, well integrity monitoring, in-well leak detection, annular fluid flow diagnosis, overburden monitoring, fluid flow detection behind a casing, sand detection (e.g., sand ingress, sand flows, etc.), and the like can be detected. In some aspects, the identification of the event(s) can be based on using the sensor measurements at each location associated with the sensor for a given sampling period, and multiple measurements through time and/or along a length of the wellbore may not be needed in order to identify one or more events from multiple possible events (e.g., the event identification need not be known prior to detecting the signals).

As described herein, temperature features and/or spectral descriptors or 'frequency domain features' can be used with DTS temperature and/or DAS acoustic data processing, respectively, to provide for event detection and/or event extent determination. For example, the temperature and/or spectral features can be used with wellbore event detection/identification (e.g., fluid profiling, fluid flow location detection, fluid phase discrimination such as the determination that the fluid at one or more locations such as the detected fluid flow location comprises gas flow, hydrocarbon liquid flow, aqueous phase flow, a combined fluid flow, and/or a time varying fluid flow such as slugging single or multiphase flow, and the like). One or more first or wellbore event models can be utilized herein for event identification. Once identified, the event identification along with a second set of measurements from a second sensor (e.g., labeled data) can subsequently be utilized to train one or more second event models. Once trained, the one or more second event models can be utilized alone or in combination with one or more wellbore event models or other sensor data to identify at least one additional event (e.g., one or more additional occurrence of the event, etc.) using the second sensor data. The additional event can occur in the same wellbore or a different wellbore. For example, the one or more second event models can be trained and used in other wellbores in the field to identify the presence and identification of the events in those other wellbores.

In some aspects, the event identification and corresponding data obtained using the additional sensors can be used to calibrate existing models. In this context, training the one or more second event models can include a calibration process. In some aspects, the models or structure of the model (e.g., the type of model, identification of the model variables, etc.) can be known or pre-trained, and the event identification and corresponding data can be used as a new training data set or used to supplement the original training data set to re-train the one or more second event models. For example, a model can be developed using laboratory and/or testing data, and the event identification (e.g., using a known or induced event, using one or more first event models, etc.) can be used with the second set of measurements to re-train or calibrate the developed model alone or in combination with the laboratory or testing data. This process may allow the structure of the model (e.g., the features relied upon, the relationship of the features, etc.) to remain the same while updating various derived parameters of the model. For example, one or more parameters (e.g., coefficients, weightings, etc.) can be updated or calibrated to provide a more accurate model using data obtained from an actual in-situ generation of the sensor data. This process may be useful to calibrate existing models for specific wellbores, formations, or fields to improve the event identifications in those locations and account for variations between locations, wellbores, etc.

In some aspects, the calibration of the models can be used to identify calibrations for one or more additional event models. As noted above, the identified labeled data can be used to re-train and/or calibrate existing model(s), thereby updating one or more parameters of the existing model(s). When the parameters of the existing model(s) are redetermined or calibrated, a calibration factor can be developed that can be applied to other existing model(s). The calibration factor can then allow for one or more additional existing models to be updated to improve the accuracy of the models without needing data derived from an in-situ occurrence of the event.

For example, an in-situ event such as gas injection within the wellbore can be determined based on having a known or induced event and/or using data within the wellbore along with one or more event models. Once the event is identified, a second set of measurements can be obtained as described herein, and along with the event identification, the second set of measurements can be used to provide a labeled data set. In this example, acoustic data associated with gas injection can be obtained during the gas injection event. The resulting labeled data set can be used to calibrate one or more second event models used for detecting gas injection using one or more frequency domain features derived from the acoustic data. An existing model may be developed based on test data such as simulating gas injection into a fluid in a test apparatus. The structure of the existing model (e.g., the specific one or more frequency domain features used, and the relationship of the one or more frequency domain features to each other) can be used in the training process with the labeled data set. When the parameters of the existing model are re-determined, a calibration factor that correlates to the original parameters of the existing model, and updated parameters of the calibrated model can be determined. The calibration factor can then be applied to similar existing models such as a water injection model, a hydrocarbon injection model, a fluid flow model, and the like. The calibration factor can then help to adjust one or more existing models to more accurately reflect the parameters relevant to the location in which the in-situ data is obtained without the need for the specific event identified by the model to occur.

The in-situ identification of training data can also be used to cross-check and validate existing models. For example, the in-situ identified data can be used to train the one or more second event models. When an additional event is identified using the one or more second models, the event identification can be used to identify additional data using the first signals, which would correspond to the first set of measurements. The first set of models can be trained to verify whether or not the newly trained model matches the original model within a given threshold. When the models match, the system can provide an indication that the event is the only event present. When the models do not match, it can be an indication that another, unidentified event is present within the data. Additional training and event identification can then be used to identify the additional event. The cross-checking and validation process can be carried out using subsequent data in time, at different depths along the wellbore, and/or across different wellbores.

Application of the signal processing techniques and one or more event detection models for wellbore events such as downhole surveillance can provide a number of benefits including improving reservoir recovery by monitoring efficient drainage of reserves through downhole fluid surveillance (e.g., production flow monitoring), improving well operating envelopes through identification of drawdown levels (e.g., gas, water, etc.), facilitating targeted remedial action for efficient well management and well integrity, reducing operational risk through the clear identification of anomalies and/or failures in well barrier elements.

In some embodiments, use of the systems and methods described herein may provide knowledge of the events, including an identification of the event(s), and the locations experiencing various events, thereby potentially allowing for improved actions (e.g., remediation actions for wellbore events, security actions for security events, etc.) based on the processing results. The methods and systems disclosed herein can also provide information on the events. For example, for wellbore events, information about a variability of the amount of fluid inflow being produced by the different fluid influx zones as a function of different production rates, different production chokes, downhole pressure conditions can be determined, different fluid outflow rates in injection wells, fluid leak rates, equipment failures, and the like, thereby enabling control of fluid flow in the wellbore. Embodiments of the systems and methods disclosed herein can also allow for a computation of the relative concentrations of fluid flow (e.g., relative amounts of gas, hydrocarbon liquid, and water in the fluid flow) in the wellbore, thereby offering the potential for more targeted and effective remediation.

As disclosed herein, embodiments of the data processing techniques can use various sequences of real time digital signal processing steps to identify the temperature and/or acoustic signals resulting from various events from background noise, and allow real time detection of the events and their locations using distributed fiber optic temperature and/or acoustic sensor data as the input data feed.

One or more models can be developed using test data along with parameters for the event(s) to provide a labeled data set used as input for training the model. Since the data can be identified along with the corresponding event during operation (e.g., during operation of a wellbore), the data can be referred to as in-situ training data. The resulting trained models can then be used to identify one or more signatures based on features of the test data and one or more machine learning techniques to develop correlations for the presence of various events. In the model development, specific events can be created in a test set-up, and the features of the model (e.g. temperature, signals, acoustic signals, pressure signals, flow signals, etc.) can be obtained and recorded to develop test data. The test data can be used to train one or more models defining the various events. The resulting model can then be used to determine one or more events. In some embodiments, actual field data can be used and correlated to actual events using inputs from, for example, other temperature sensors, other acoustic sensors, and/or other production sensors (e.g., pressure sensors, flow meters, optical sensors, etc.) to provide in-situ data used for training the one or more models. The data can be labeled to create a training data set based on actual production situations (e.g., in-situ data). The data can then be used alone or in combination with the test data to develop the model(s). According to this disclosure, one or more event models are trained using a second set of measurements of a second signal in a wellbore and identification of one or more events provided with a first set of measurements of a first signal in the wellbore.

As described herein, the systems and methods can be used to identify the presence and/or extent of one or more wellbore events. As noted above, various wellbore events can be determined using the system and method, such as, without limitation, fluid flow detection, fluid phase segregation, fluid flow discrimination within a conduit, well integrity monitoring, in well leak detection, annular fluid flow diagnosis, overburden monitoring, fluid flow detection behind a casing, wax deposition events, sand detection (e.g., sand ingress, sand flows, etc.), or the like. Fluid flow can comprise fluid flow along or within a tubular within a wellbore such as fluid flow within a production tubular. Fluid flow can also comprise fluid flow from the reservoir or formation into a wellbore tubular, and/or fluid flow from the wellbore tubular into the reservoir (e.g., fluid injection). Such flow into the wellbore and/or a wellbore tubular can be referred to as fluid inflow. While fluid inflow may be separately identified at times in this disclosure in examples, such fluid inflow is considered a part of fluid flow within the wellbore.

In some aspects, the first set of measurement and/or the second set of measurements can comprise temperature and/or acoustic measurements. In these aspects, temperature features and/or acoustic features can be determined from respective measurements taken along a length, for example, a length of a wellbore. In some embodiments, the temperature and/or acoustic measurements can be used with one or more temperature and/or acoustic signatures, respectively, to determine the presence of absence of an event. The signatures can comprise a number of thresholds or ranges for comparison with various temperature features. When the detected temperature features fall within the signatures, the event may be determined to be present. In some embodiments, temperature measurements can be used in one or more first or event detection models that can provide an output indicative of the presence or absence of one or more events along the length of the wellbore. This can allow event locations to be identified using temperature based measurements from the wellbore. When combined with a distributed temperature sensing system that can provide distributed and continuous temperature measurements, the systems can allow for fluid inflow locations to be tracked through time. The identified event locations can be utilized as described herein to identify data from a different physical parameter that can be used to train one or more second event models.

A system of this disclosure will now be described with reference to a FIG. 3, which is a schematic, cross-sectional illustration of a downhole wellbore operating environment 101 according to some embodiments. More specifically, environment 101 includes a wellbore 114 traversing a subterranean formation 102, casing 112 lining at least a portion of wellbore 114, and a tubular 120 extending through wellbore 114 and casing 112. A plurality of completion assemblies such as spaced screen elements or assemblies 118 may be provided along tubular 120 at one or more production zones 104*a*, 104*b* within the subterranean formation 102. In particular, two production zones 104a, 104b are depicted within subterranean formation 102 of FIG. 3; however, the precise number and spacing of the production zones 104a, 104b may be varied in different embodiments. The completion assemblies can comprise flow control devices such as sliding sleeves, adjustable chokes, and/or inflow control devices to allow for control of the flow from each production zone. The production zones 104a, 104b may be layers, zones, or strata of formation 102 that contain hydrocarbon fluids (e.g., oil, gas, condensate, etc.) therein.

In addition, a plurality of spaced zonal isolation devices 117 and gravel packs 122 may be provided between tubular 120 and the sidewall of wellbore 114 at or along the interface of the wellbore 114 with the production zones 104a, 104b. In some embodiments, the operating environment 101 includes a workover and/or drilling rig positioned at the surface and extending over the wellbore 114. While FIG. 3 shows an example completion configuration in FIG. 3, it should be appreciated that other configurations and equipment may be present in place of or in addition to the illustrated configurations and equipment. For example, sections of the wellbore 114 can be completed as open hole completions or with gravel packs without completion assemblies.

In general, the wellbore 114 can be formed in the subterranean formation 102 using any suitable technique (e.g., drilling). The wellbore 114 can extend substantially vertically from the earth's surface over a vertical wellbore portion, deviate from vertical relative to the earth's surface over a deviated wellbore portion, and/or transition to a horizontal wellbore portion. In general, all or portions of a wellbore may be vertical, deviated at any suitable angle, horizontal, and/or curved. In addition, the wellbore 114 can be a new wellbore, an existing wellbore, a straight wellbore, an extended reach wellbore, a sidetracked wellbore, a multi-lateral wellbore, and other types of wellbores for drilling and completing one or more production zones. As illustrated, the wellbore 114 includes a substantially vertical producing section 150 which includes the production zones 104a, 104b. In this embodiment, producing section 150 is an open-hole completion (i.e., casing 112 does not extend through producing section 150). Although section 150 is illustrated as a vertical and open-hole portion of wellbore 114 in FIG. 3, embodiments disclosed herein can be employed in sections of wellbores having any orientation, and in open or cased sections of wellbores. The casing 112 extends into the wellbore 114 from the surface and can be secured within the wellbore 114 with cement 111.

The tubular 120 may comprise any suitable downhole tubular or tubular string (e.g., drill string, casing, liner, jointed tubing, and/or coiled tubing, etc.), and may be inserted within wellbore 114 for any suitable operation(s) (e.g., drilling, completion, intervention, workover, treatment, production, etc.). In the embodiment shown in FIG. 3, the tubular 120 is a completion assembly string. In addition, the tubular 120 may be disposed within in any or all portions of the wellbore 114 (e.g., vertical, deviated, horizontal, and/or curved section of wellbore 114).

In this embodiment, the tubular 120 extends from the surface to the production zones 104a, 104b and generally provides a conduit for fluids to travel from the formation 102 (particularly from production zones 104a, 104b) to the surface. A completion assembly including the tubular 120 can include a variety of other equipment or downhole tools to facilitate the production of the formation fluids from the production zones. For example, zonal isolation devices 117 can be used to isolate the production zones 104a, 104b within the wellbore 114. In this embodiment, each zonal isolation device 117 comprises a packer (e.g., production packer, gravel pack packer, frac-pac packer, etc.). The zonal isolation devices 117 can be positioned between the screen assemblies 118, for example, to isolate different gravel pack zones or intervals along the wellbore 114 from each other. In general, the space between each pair of adjacent zonal isolation devices 117 defines a production interval, and each production interval may correspond with one of the production zones 104a, 104b of subterranean formation 102.

The screen assemblies 118 provide sand control capability. In particular, the sand control screen elements 118, or other filter media associated with wellbore tubular 120, can be designed to allow fluids to flow therethrough but restrict and/or prevent particulate matter of sufficient size from flowing therethrough. The screen assemblies 118 can be of any suitable type such as the type known as "wire-wrapped", which are made up of a wire closely wrapped helically about a wellbore tubular, with a spacing between the wire wraps being chosen to allow fluid flow through the filter media while keeping particulates that are greater than a selected size from passing between the wire wraps. Other types of filter media can also be provided along the tubular 120 and can include any type of structures commonly used in gravel pack well completions, which permit the flow of fluids through the filter or screen while restricting and/or blocking the flow of particulates (e.g. other commercially-available screens, slotted or perforated liners or pipes; sintered-metal screens; sintered-sized, mesh screens; screened pipes; pre-packed screens and/or liners; or combinations thereof). A protective outer shroud having a plurality of perforations therethrough may be positioned around the exterior of any such filter medium.

The gravel packs 122 can be formed in the annulus 119 between the screen elements 118 (or tubular 120) and the sidewall of the wellbore 114 in an open hole completion. In general, the gravel packs 122 comprise relatively coarse granular material placed in the annulus to form a rough screen against the ingress of sand into the wellbore while also supporting the wellbore wall. The gravel pack 122 is optional and may not be present in all completions.

In some embodiments, one or more of the completion assemblies can comprise flow control elements such as sliding sleeves, chokes, valves, or other types of flow control devices that can control the flow of a fluid from an individual production zone or a group of production zones. The force on the production face can then vary based on the type of completion within the wellbore and/or each production zone (e.g., in a sliding sleeve completion, open hole completion, gravel pack completion, etc.). In some embodiments, a sliding sleeve or other flow controlled production zone can experience a force on the production face that is relatively uniform within the production zone, and the force on the production face can be different between each production zone. For example, a first production zone can have a specific flow control setting that allows the production rate from the first zone to be different than the production rate from a second production zone. Thus, the choice of completion type (e.g., which can be specified in a completion plan) can effect on the need for or the ability to provide a different production rate within different production zones.

Referring still to FIG. 3, a monitoring system 110 can comprise an acoustic monitoring system and/or a temperature monitoring system. The monitoring system 1110 can be positioned in the wellbore 114. As described herein, the monitoring system 110 may be utilized to detect or monitor fluid inflow event(s) into the wellbore 114. The various monitoring systems (e.g., acoustic monitoring systems, temperature monitoring systems, etc.) may be referred to herein as an "flow detection system," and/or an "flow monitoring system."

Figure 4A:
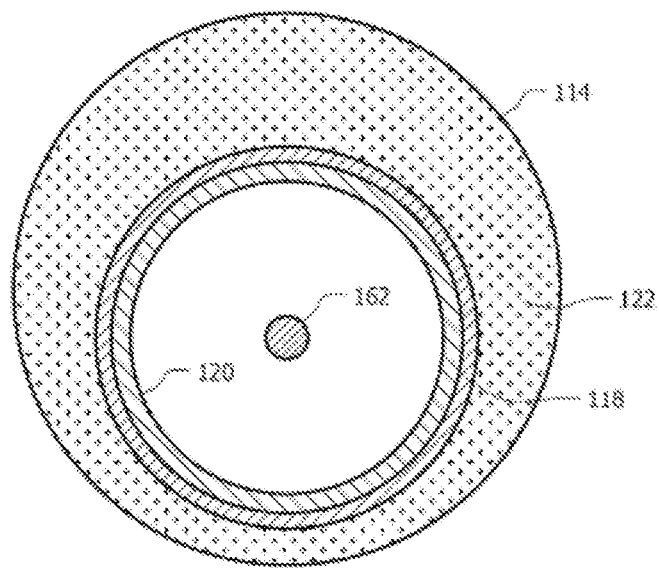
FIG. 4A and FIG. 4B are schematic, cross-sectional views of embodiments of a well with a wellbore tubular having an optical fiber inserted therein according to some embodiments.
Figure 4B:
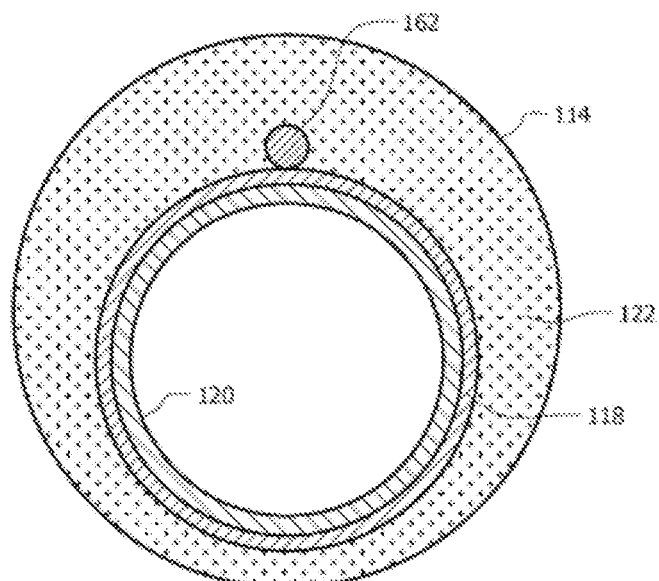
Figure 5:
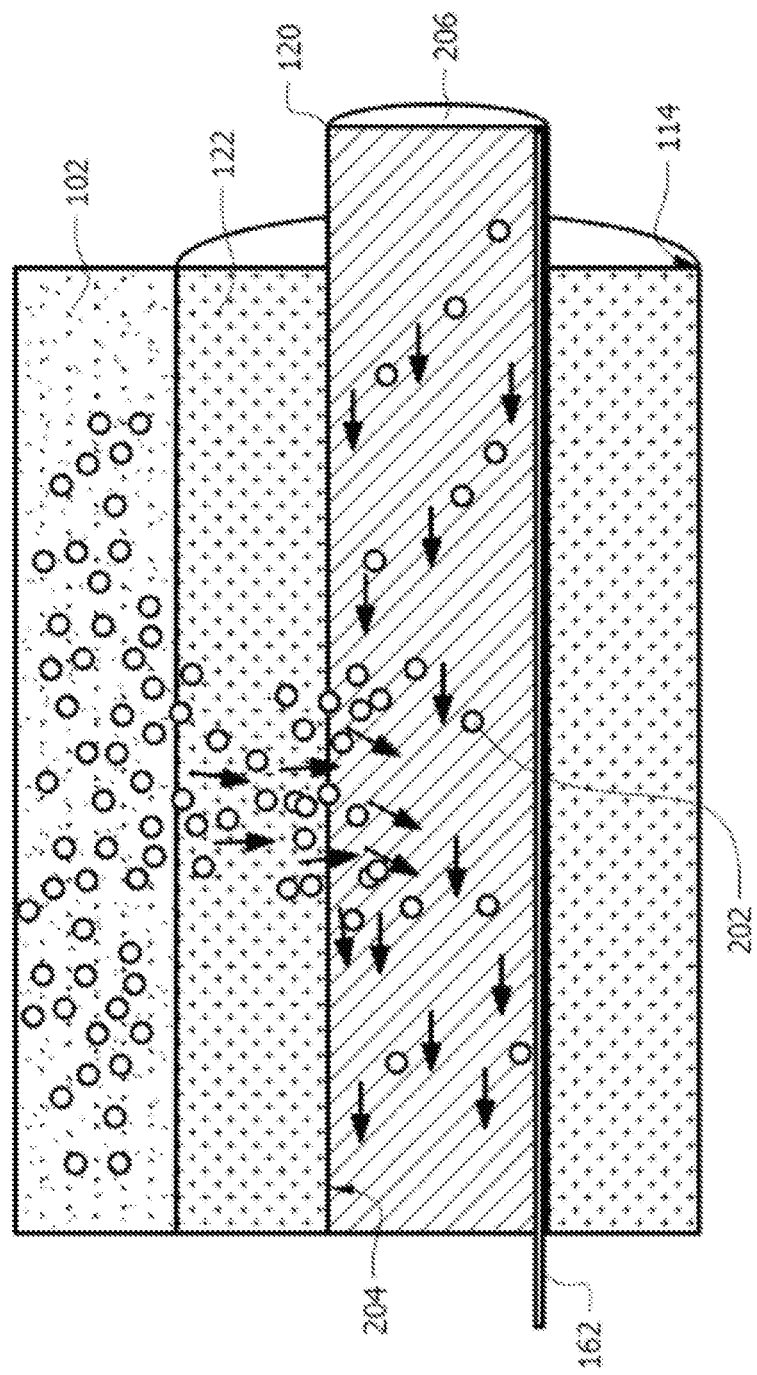
FIG. 5 is a schematic view of an embodiment of a wellbore tubular with fluid inflow and sand ingress according to some embodiments.

The monitoring system 110 comprises an optical fiber 162 that is coupled to and extends along tubular 120. In cased completions, the optical fiber 162 can be installed between the casing and the wellbore wall within a cement layer and/or installed within the casing or production tubing. Referring briefly to FIGS. 4A and 4B, optical fiber 162 of the monitoring system 110 may be coupled to an exterior of tubular 120 (e.g., such as shown in FIG. 4B) or an interior of tubular (e.g., such as shown in FIG. 4A). When the optical fiber 162 is coupled to the exterior of the tubular 120, as depicted in the embodiment of FIG. 4B, the optical fiber 162 can be positioned within a control line, control channel, or recess in the tubular 120. In some embodiments an outer shroud contains the tubular 120 and protects the optical fiber 162 during installation. A control line or channel can be formed in the shroud and the optical fiber 162 can be placed in the control line or channel (not specifically shown in FIGS. 2A and 2B).

Referring again to FIG. 3, generally speaking, during operation of a the monitoring system, an optical backscatter component of light injected into the optical fiber 162 may be used to detect various conditions incident on the optical fiber such as acoustic perturbations (e.g., dynamic strain), temperature, static strain, and the like along the length of the optical fiber 162. The light can be generated by a light generator or source 166 such as a laser, which can generate light pulses. The light used in the system is not limited to the visible spectrum, and light of any frequency can be used with the systems described herein. Accordingly, the optical fiber 162 acts as the sensor element with no additional transducers in the optical path, and measurements can be taken along the length of the entire optical fiber 162. The measurements can then be detected by an optical receiver such as sensor 164 and selectively filtered to obtain measurements from a given depth point or range, thereby providing for a distributed measurement that has selective data for a plurality of zones (e.g., production zones 104a, 104b) along the optical fiber 162 at any given time. For example, time of flight measurements of the backscattered light can be used to identify individual zones or measurement lengths of the fiber optic 162. In this manner, the optical fiber 162 effectively functions as a distributed array of sensors spread over the entire length of the optical fiber 162, which typically across production zones 104a, 104b within the wellbore 114.

The light backscattered up the optical fiber 162 as a result of the optical backscatter can travel back to the source, where the signal can be collected by a sensor 164 and processed (e.g., using a processor 168). In general, the time the light takes to return to the collection point is proportional to the distance traveled along the optical fiber 162, thereby allowing time of flight measurements of distance along the optical fiber. The resulting backscattered light arising along the length of the optical fiber 162 can be used to characterize the environment around the optical fiber 162. The use of a controlled light source 166 (e.g., having a controlled spectral width and frequency) may allow the backscatter to be collected and any parameters and/or disturbances along the length of the optical fiber 162 to be analyzed. In general, the various parameters and/or disturbances along the length of the optical fiber 162 can result in a change in the properties of the backscattered light.

An acquisition device 160 may be coupled to one end of the optical fiber 162 that comprises the sensor 164, light generator 166, a processor 168, and a memory 170. As discussed herein, the light source 166 can generate the light (e.g., one or more light pulses), and the sensor 164 can collect and analyze the backscattered light returning up the optical fiber 162. In some contexts, the acquisition device 160 (which comprises the light source 166 and the sensor 164 as noted above), can be referred to as an interrogator. The processor 168 may be in signal communication with the sensor 164 and may perform various analysis steps described in more detail herein. While shown as being within the acquisition device 160, the processor 168 can also be located outside of the acquisition device 160 including being located remotely from the acquisition device 160. The sensor 164 can be used to obtain data at various rates and may obtain data at a sufficient rate to detect the acoustic signals of interest with sufficient bandwidth. While described as a sensor 164 in a singular sense, the sensor 164 can comprise one or more photodetectors or other sensors that can allow one or more light beams and/or backscattered light to be detected for further processing. In an embodiment, depth resolution ranges in a range of from about 1 meter to about 10 meters, or less than or equal to about 10, 9, 8, 7, 6, 5, 4, 3, 2, or 1 meter can be achieved. Depending on the resolution needed, larger averages or ranges can be used for computing purposes. When a high depth resolution is not needed, a system may have a wider resolution (e.g., which may be less expensive) can also be used in some embodiments. Data acquired by the monitoring system 110 (e.g., via fiber 162, sensor 164, etc.) may be stored on memory 170.

The monitoring system 110 can be used for detecting a variety of parameters and/or disturbances in the wellbore including being used to detect temperatures along the wellbore, acoustic signals along the wellbore, static strain and/or pressure along the wellbore, or any combination thereof.

In some embodiments, the monitoring system 110 can be used to detect temperatures within the wellbore. The temperature monitoring system can include a distributed temperature sensing (DTS) system. A DTS system can rely on light injected into the optical fiber 162 along with the reflected signals to determine a temperature and/or strain based on optical time-domain reflectometry. In order to obtain DTS measurements, a pulsed laser from the light generator 166 can be coupled to the optical fiber 162 that serves as the sensing element. The injected light can be backscattered as the pulse propagates through the optical fiber 162 owing to density and composition as well as to molecular and bulk vibrations. A portion of the backscattered light can be guided back to the acquisition device 160 and split of by a directional coupler to a sensor 164. It is expected that the intensity of the backscattered light decays exponentially with time. As the speed of light within the optical fiber 162 is known, the distance that the light has passed through the optical fiber 162 can be derived using time of flight measurements.

In both distributed acoustic sensing (DAS) and DTS systems, the backscattered light includes different spectral components which contain peaks that are known as Rayleigh and Brillouin peaks and Raman bands. The Rayleigh peaks are independent of temperature and can be used to determine the DAS components of the backscattered light. The Raman spectral bands are caused by thermally influenced molecular vibrations. The Raman spectral bands can then be used to obtain information about distribution of temperature along the length of the optical fiber 162 disposed in the wellbore.

The Raman backscattered light has two components, Stokes and Anti-Stokes, one being only weakly dependent on temperature and the other being greatly influenced by temperature. The relative intensities between the Stokes and Anti-Stokes components and are a function of temperature at which the backscattering occurred. Therefore, temperature can be determined at any point along the length of the optical fiber 162 by comparing at each point the Stokes and Anti-stokes components of the light backscattered from the particular point. The Brillouin peaks may be used to monitor strain along the length of the optical fiber 162.

The DTS system can then be used to provide a temperature measurement along the length of the wellbore during the production of fluids, including fluid inflow events. The DTS system can represent a separate system from the DAS system or a single common system, which can comprise one or more acquisition devices in some embodiments. In some embodiments, a plurality of fibers 162 are present within the wellbore, and the DAS system can be coupled to a first optical fiber and the DTS system can be coupled to a second, different, optical fiber. Alternatively, a single optical fiber can be used with both systems, and a time division multiplexing or other process can be used to measure both DAS and DTS on the same optical fiber.

In an embodiment, depth resolution for the DTS system can range from about 1 meter to about 10 meters, or less than or equal to about 10, 9, 8, 7, 6, 5, 4, 3, 2, or 1 meter can be achieved. Depending on the resolution needed, larger averages or ranges can be used for computing purposes. When a high depth resolution is not needed, a system may have a wider resolution (e.g., which may be less expensive) can also be used in some embodiments. Data acquired by the DTS system 110 (e.g., via fiber 162, sensor 164, etc.) may be stored on memory 170.

While the temperature monitoring system described herein can use a DTS system to acquire the temperature measurements for a location or depth range in the wellbore 114, in general, any suitable temperature monitoring system can be used. For example, various point sensors, thermocouples, resistive temperature sensors, or other sensors can be used to provide temperature measurements at a given location based on the temperature measurement processing described herein. Further, an optical fiber comprising a plurality of point sensors such as Bragg gratings can also be used. As described herein, a benefit of the use of the DTS system is that temperature measurements can be obtained across a plurality of locations and/or across a continuous length of the wellbore 114 rather than at discrete locations.

The monitoring system 110 can comprise an acoustic monitoring system to monitor acoustic signals within the wellbore. The acoustic monitoring system can comprise a DAS based system, though other types of acoustic monitoring systems, including other distributed monitoring systems, can also be used.

During operation of a DAS system an optical backscatter component of light injected into the optical fiber 162 (e.g., Rayleigh backscatter) may be used to detect acoustic perturbations (e.g., dynamic strain) along the length of the fiber 162. The light backscattered up the optical fiber 162 as a result of the optical backscatter can travel back to the source, where the signal can be collected by a sensor 164 and processed (e.g., using a processor 168) as described herein. In general, any acoustic or dynamic strain disturbances along the length of the optical fiber 162 can result in a change in the properties of the backscattered light, allowing for a distributed measurement of both the acoustic magnitude (e.g., amplitude), frequency and, in some cases, of the relative phase of the disturbance. Any suitable detection methods including the use of highly coherent light beams, compensating interferometers, local oscillators, and the like can be used to produce one or more signals that can be processed to determine the acoustic signals or strain impacting the optical fiber along its length.

While the system 101 described herein can be used with a DAS system (e.g., DAS system 110) to acquire an acoustic signal for a location or depth range in the wellbore 114, in general, any suitable acoustic signal acquisition system can be used in performing embodiments of method 10 (see e.g., FIG. 1). For example, various microphones, geophones, hydrophones, or other sensors can be used to provide an acoustic signal at a given location based on the acoustic signal processing described herein. Further, an optical fiber comprising a plurality of point sensors such as Bragg gratings can also be used. As described herein, a benefit of the use of the DAS system 110 is that an acoustic signal can be obtained across a plurality of locations and/or across a continuous length of the wellbore 114 rather than at discrete locations.

The monitoring system 110 can be used to generate temperature measurements and/or acoustic measurements along the length of the wellbore. The resulting measurements can be processed to obtain various temperature and/or acoustic based features that can then be used to identify one or more events, including any of those described herein. Each of the specific types of features obtained from the monitoring system is described in more detail below.

The temperature features and/or frequency domain features can be understood by considering an example of fluid inflow into the wellbore. In this example, fluid can be produced into the wellbore 114 and into the completion assembly string. During operations, the fluid flowing into the wellbore may comprise hydrocarbon fluids, such as, for instance hydrocarbon liquids (e.g., oil), gases (e.g., natural gas such as methane, ethane, etc.), and/or water, any of which can also comprise particulates such as sand. However, the fluid flowing into the tubular may also comprise other components, such as, for instance steam, carbon dioxide, and/or various multiphase mixed flows. The fluid flow can further be time varying such as including slugging, bubbling, or time altering flow rates of different phases. The amounts or flow rates of these components can vary over time based on conditions within the formation 102 and the wellbore 114. Likewise, the composition of the fluid flowing into the tubular 120 sections throughout the length of the entire production string (e.g., including the amount of sand contained within the fluid flow) can vary significantly from section to section at any given time.

Continuing with the example, as the fluid enters the wellbore 114, the fluid can create acoustic signals and temperature changes that can be detected by the monitoring system such as the DTS system and/or the DAS systems as described herein. With respect to the temperature variations, the temperature changes can result from various fluid effects within the wellbore such as cooling based on gas entering the wellbore, temperature changes resulting from liquids entering the wellbore, and various flow related temperature changes as a result of the fluids passing through the wellbore. For example, as fluids enter the wellbore, the fluids can experience a sudden pressure drop, which can result in a change in the temperature. The magnitude of the temperature change depends on the phase and composition of the inflowing fluid, the pressure drop, and the pressure and temperature conditions. The other major thermodynamic process that takes place as the fluid enters the well is thermal mixing which results from the heat exchange between the fluid body that flows into the wellbore and the fluid that is already flowing in the wellbore. As a result, inflow of fluids from the reservoir into the wellbore can cause a deviation in the flowing well temperature profile. Other events within the wellbore can also generate similar temperature and/or acoustic signals that can be used to identify the one or more events.

By obtaining the temperature in the wellbore, a number of temperature features can be obtained from the temperature measurements. The temperature features can provide an indication of one or more temperature trends at a given location in the wellbore during a measurement period. The resulting features can form a distribution of temperature results that can then be used with various models to identify one or more events within the wellbore at the location.

The temperature measurements can represent output values from the DTS system, which can be used with or without various types of pre-processing such as noise reduction, smoothing, and the like. When background temperature measurements are used, the background measurement can represent a temperature measurement at a location within the wellbore taken in the absence of the flow of a fluid. For example, a temperature profile along the wellbore can be taken when the well is initially formed and/or the wellbore can be shut in and allowed to equilibrate to some degree before measuring the temperatures at various points in the wellbore. The resulting background temperature measurements or temperature profile can then be used in determining the temperature features in some embodiments.

In general, the temperature features represent statistical variations of the temperature measurements through time and/or depth. For example, the temperature features can represent statistical measurements or functions of the temperature within the wellbore that can be used with various models to determine whether or not fluid flow events have occurred. The temperature features can be determined using various functions and transformations, and in some embodiments can represent a distribution of results. In some embodiments, the temperature features can represent a normal or Gaussian distribution. In some embodiments, the temperature measurements can represent measurement through time and depth, such as variations taken first with respect to time and then with respect to depth or first with respect to depth and then with respect to time. The resulting distributions can then be used with models such as multivariate models to determine the presence of the fluid flow events.

In some embodiments, the temperature features can include various features including, but not limited to, a depth derivative of temperature with respect to depth, a temperature excursion measurement, a baseline temperature excursion, a peak-to-peak value, a Fast Fourier transform (FFT), a Laplace transform, a wavelet transform, a derivative of temperature with respect to depth, a heat loss parameter, an autocorrelation, and combinations thereof.

In some embodiments, the temperature features can comprise a depth derivative of temperature with respect to depth. This feature can be determined by taking the temperature measurements along the wellbore and smoothing the measurements. Smoothing can comprise a variety of steps including filtering the results, de-noising the results, or the like. In some embodiments, the temperature measurements can be median filtered within a given window to smooth the measurements. Once smoothed, the change in the temperature with depth can be determined. In some embodiments, this can include taking a derivative of the temperature measurements with respect to depth along the longitudinal axis of the wellbore 114. The depth derivative of temperature values can then be processed, and the measurement with a zero value (e.g., representing a point of no change in temperature with depth) that have preceding and proceeding values that are non-zero and have opposite signs in depth (e.g., zero below which the value is negative and above positive or vice versa) can have the values assign to the nearest value. This can then result in a set of measurements representing the depth derivative of temperature with respect to depth.

In some embodiments, the temperature features can comprise a temperature excursion measurement. The temperature excursion measurement can comprise a difference between a temperature reading at a first depth and a smoothed temperature reading over a depth range, where the first depth is within the depth range. In some embodiments, the temperature excursion measurement can represent a difference between de-trended temperature measurements over an interval and the actual temperature measurements within the interval. For example, a depth range can be selected within the wellbore 114. The temperature readings within a time window can be obtained within the depth range and de-trended or smoothed. In some embodiments, the de-trending or smoothing can include any of those processes described above, such as using median filtering of the data within a window within the depth range. For median filtering, the larger the window of values used, the greater the smoothing effect can be on the measurements. For the temperature excursion measurement, a range of windows from about 10 to about 100 values, or between about 20-60 values (e.g., measurements of temperature within the depth range) can be used to median filter the temperature measurements. A difference can then be taken between the temperature measurement at a location and the de-trended (e.g., median filtered) temperature values. The temperature measurements at a location can be within the depth range and the values being used for the median filtering. This temperature feature then represents a temperature excursion at a location along the wellbore 114 from a smoothed temperature measurement over a larger range of depths around the location in the wellbore 114.

In some embodiments, the temperature features can comprise a baseline temperature excursion. The baseline temperature excursion represents a difference between a de-trended baseline temperature profile and the current temperature at a given depth. In some embodiments, the baseline temperature excursion can rely on a baseline temperature profile that can contain or define the baseline temperatures along the length of the wellbore 114. As described herein, the baseline temperatures represent the temperature as measured when the wellbore 114 is shut in. This can represent a temperature profile of the formation in the absence of fluid flow. While the wellbore 114 may affect the baseline temperature readings, the baseline temperature profile can approximate a formation temperature profile. The baseline temperature profile can be determined when the wellbore 114 is shut in and/or during formation of the wellbore 114, and the resulting baseline temperature profile can be used over time. If the condition of the wellbore 114 changes over time, the wellbore 114 can be shut in and a new baseline temperature profile can be measured or determined. It is not expected that the baseline temperature profile is re-determined at specific intervals, and rather it would be determined at discrete times in the life of the wellbore 114. In some embodiments, the baseline temperature profile can be re-determined and used to determine one or more temperature features such as the baseline temperature excursion.

Once the baseline temperature profile is obtained, the baseline temperature measurements at a location in the wellbore 114 can be subtracted from the temperature measurement detected by the temperature monitoring system 110 at that location to provide baseline subtracted values. The results can then be obtained and smoothed or detrended. For example, the resulting baseline subtracted values can be median filtered within a window to smooth the data. In some embodiments, a window between 10 and 500 temperature values, between 50 and 400 temperature values, or between 100 and 300 temperature values can be used to median filter the resulting baseline subtracted values. The resulting smoothed baseline subtracted values can then be processed to determine a change in the smoothed baseline subtracted values with depth. In some embodiments, this can include taking a derivative of the smoothed baseline subtracted values with respect to depth along the longitudinal axis of the wellbore. The resulting values can represent the baseline temperature excursion feature.

In some embodiments, the temperature features can comprise a peak-to-peak temperature value. This feature can represent the difference between the maximum and minimum values (e.g., the range, etc.) within the temperature profile along the wellbore 114. In some embodiments, the peak-to-peak temperature values can be determined by detecting the maximum temperature readings (e.g., the peaks) and the minimum temperature values (e.g., the dips) within the temperature profile along the wellbore 114. The difference can then be determined within the temperature profile to determine peak-to-peak values along the length of the wellbore 114. The resulting peak-to-peak values can then be processed to determine a change in the peak-to-peak values with respect to depth. In some embodiments, this can include taking a derivative of the peak-to-peak values with respect to depth along the longitudinal axis of the wellbore 114. The resulting values can represent the peak-to-peak temperature values.

Other temperature features can also be determined from the temperature measurements. In some embodiments, various statistical measurements can be obtained from the temperature measurements along the wellbore 114 to determine one or more temperature features. For example, a cross-correlation of the temperature measurements with respect to time can be used to determine a cross-correlated temperature feature. The temperature measurements can be smoothed as described herein prior to determining the cross-correlation with respect to time. As another example, an autocorrelation measurement of the temperature measurements can be obtained with respect to depth. Autocorrelation is defined as the cross-correlation of a signal with itself. An autocorrelation temperature feature can thus measure the similarity of the signal with itself as a function of the displacement. An autocorrelation temperature feature can be used, in applications, as a means of anomaly detection for one or more events (e.g., fluid flow, fluid leaks, sand ingress, etc.). The temperature measurements can be smoothed and/or the resulting autocorrelation measurements can be smoothed as described herein to determine the autocorrelation temperature features.

In some embodiments, the temperature features can comprise a Fast Fourier transform (FFT) of the distributed temperature sensing (e.g., DTS) signal. This algorithm can transform the distributed temperature sensing signal from the time domain into the frequency domain, thus allowing detection of the deviation in DTS along length (e.g., depth).

This temperature feature can be utilized, for example, for anomaly detection for one or more events.

In some embodiments, the temperature features can comprise the Laplace transform of DTS. This algorithm can transform the DTS signal from the time domain into Laplace domain allows us to detect the deviation in the DTS along length (e.g., depth of wellbore 114). This temperature feature can be utilized, for example, for anomaly detection for event detection. This feature can be utilized, for example, in addition to (e.g., in combination with) the FFT temperature feature.

In some embodiments, the temperature features can comprise a wavelet transform of the distributed temperature sensing (e.g., DTS) signal and/or of the derivative of DTS with respect to depth, dT/dz. The wavelet transform can be used to represent the abrupt changes in the signal data. This feature can be utilized, for example, in fluid flow detection. A wavelet is described as an oscillation that has zero mean, which can thus make the derivative of DTS in depth more suitable for this application. In embodiments and without limitation, the wavelet can comprise a Morse wavelet, an Analytical wavelet, a Bump wavelet, or a combination thereof.

In some embodiments, the temperature features can comprise a derivative of DTS with respect to depth, or dT/dz. The relationship between the derivative of flowing temperature $T_f$ with respect to depth (L) (e.g., $dT_f/dL$) has been described by several models. For example, and without limitation, the model described by Sagar (Sagar, R., Doty, D. R., & Schmidt, Z. (1991, November 1). Predicting Temperature Profiles in a Flowing Well. Society of Petroleum Engineers. doi:10.2118/19702-PA) which accounts for radial heat loss due to conduction and describes a relationship (Equation (1) below) between temperature change in depth and mass rate. The mass rate $w_t$ is conversely proportional to the relaxation parameter A and, as the relaxation parameter A increases, the change in temperature in depth increases. Hence this temperature feature can be designed to be used, for example, in events comprising flow quantification.

$$\frac{dT_f}{dL} = -A\left[(T_f - T_e) + \frac{g}{g_c}\frac{\sin\theta}{JC_{pm}A} - \frac{F_c}{A}\right] \quad (1)$$

The formula for the relaxation parameter, A, is provided in Equation (2):

$$A = \left(\frac{2\pi}{w_t C_{pl}}\right)\left(\frac{r_{ti} U k_e}{k_e + r_{ti} U f / 12}\right)\left(\frac{1}{86,400 \times 12}\right) \quad (2)$$

A=coefficient, ft$^{-1}$
$C_{pL}$=specific heat of liquid, Btu/lbm-° F.
$C_{pm}$=specific heat of mixture, Btu/lbm-° F.
$C_{po}$=specific heat of oil, Btu/lbm-° F.
$C_{pw}$=specific heat of water, Btu/lbm-° F.
$d_c$=casing diameter, in.
$d_t$=tubing diameter, in.
$d_{wb}$=wellbore diameter, in.
D=depth, ft
$D_{inj}$=injection depth, ft
f=modified dimensionless heat conduction time function for long times for earth
f(t)=dimensionless transient heat conduction time function for earth $F_c$=correction factor
$\overline{F_c}$=average correction factor for one length interval
g=acceleration of gravity, 32.2 ft/sec$^2$
g$_c$=conversion factor, 32.2 ft-lbm/sec$^2$-lbf
g$_G$=geothermal gradient, ° F./ft
h=specific enthalpy, Btu/lbm
J=mechanical equivalent of heat, 778 ft-lbf/Btu
$k_{an}$=thermal conductivity of material in annulus, Btu/D-ft-° F.
$k_{ang}$=thermal conductivity of gas in annulus, Btu/D-ft-° F.
$k_{anw}$=thermal conductivity of water in annulus, Btu/D-ft-° F.
$k_{cem}$=thermal conductivity of cement, Btu/D-ft-° F.
$k_e$=thermal conductivity of earth, Btu/D-ft-° F.
L=length of well fem perforations, ft
$L_{in}$=length from perforation to inlet, ft
p=pressure, psi
$p_{wh}$=wellhead pressure, psig
$q_{gf}$=formation gas flow rate, scf/D
$q_{ginj}$=injection gas flow rate, scf/D
$q_o$=oil flow rate, STB/D
$q_w$=water Dow rate, STB/D
Q=hem transfer between fluid and surrounding area, Btu/lbm
$r_{ci}$=inside casing radius, in.
$r_{co}$=outside casing radius, in.
$r_{ti}$=inside tubing radius, in.
$r_{to}$=outside tubing radius, in.
$r_{wb}$=wellbore radius, in.
$R_{gL}$=gas/liquid ratio, scf/STB
T=temperature, ° F.
$T_{bh}$=bottomhole temperature, ° F.
$T_c$=casing temperature, ° F.
$T_e$=surrounding earth temperature, ° F.
$T_{ein}$=earth temperature at inlet, ° F.
$T_f$=flowing fluid temperature, ° F.
$T_{fin}$=flowing fluid temperature at inlet, ° F.
$T_h$=cement/earth interface temperature, ° F.
U=overall heat transfer coefficient, Btu/D-ft$^2$-° F.
v=fluid velocity, ft/sec
V=volume
$w_t$=total mass flow rate, lbm/sec
Z=height from bottom of hole, ft
$Z_{in}$=height from bottom of hole at inlet, ft
α=thermal diffusivity of earth, 0.04 ft$^2$/hr
$\gamma_{API}$=oil gravity, °API
$\gamma_g$=gas specific gravity (air=1)
$\gamma_o$=oil specific gravity
$\gamma_w$=water specific gravity
θ=angle of inclination, degrees
μ=Joule-Thomson coefficient In some embodiments, the temperature features can comprise a heat loss parameter. As described hereinabove, Sagars model describes the relationship between various input parameters, including the mass rate $w_t$ and temperature change in depth $dT_f/dL$. These parameters can be utilized as temperature features in a machine learning model which uses features from known cases (production logging results) as learning data sets, when available. These features can include geothermal temperature, deviation, dimensions of the tubulars 120 that are in the well (casing 112, tubing 120, gravel pack 122 components, etc.), as well as the wellbore 114, well head pressure, individual separator rates, downhole pressure, gas/liquid ratio, and/or a combination thereof. Such heat loss parameters can, for example, be utilized as inputs in a machine learning model for events comprising fluid flow quantification of the mass flow rate $w_t$.

In some embodiments, the temperature features an comprise a time-depth derivative and/or a depth-time derivative. A temperature feature comprising a time-depth derivative can comprise a change in a temperature measurement at one or more locations across the wellbore taken first with respect to time, and a change in the resulting values with respect to depth can then be determined. Similarly, a temperature feature comprising a depth-time derivative can comprise a change in a temperature measurement at one or more locations across the wellbore taken first with respect to depth, and a change in the resulting values with respect to time can then be determined.

In some embodiments, the temperature features can be based on dynamic temperature measurements rather than steady state or flowing temperature measurements. In order to obtain dynamic temperature measurements, a change in the operation of the system (e.g., wellbore) can be introduced, and the temperature monitored using the temperature monitoring system. For example in a wellbore environment, the change in conditions can be introduced by shutting in the wellbore, opening one or more sections of the wellbore to flow, introducing a fluid to the wellbore (e.g., injecting a fluid), and the like. When the wellbore is shut in from a flowing state, the temperature profile along the wellbore may be expected to change from the flowing profile to the baseline profile over time. Similarly, when a wellbore that is shut in is opened for flow, the temperature profile may change from a baseline profile to a flowing profile. Based on the change in the condition of the wellbore, the temperature measurements can change dynamically over time. In some embodiments, this approach can allow for a contrast in thermal conductivity to be determined between a location or interval having radial flow (e.g., into or out of the wellbore) to a location or interval without radial flow. One or more temperature features can then be determined using the dynamic temperature measurements. Once the temperature features are determined from the temperature measurements obtained from the temperature monitoring system, one or more of the temperature features can be used to identify events along the length being monitored (e.g., within the wellbore), as described in more detail herein.

As described with respect to the temperature measurements, the flow of fluids in the wellbore 114 an also create acoustic sounds that can be detected using the acoustic monitoring system such as a DAS system. Accordingly, the flow of the various fluids in the wellbore 114 and/or through the wellbore 114 can create vibrations or acoustic sounds that can be detected using acoustic monitoring system. Each type of fluid flow event such as the different fluid flows and fluid flow locations can produce an acoustic signature with unique frequency domain features. Other events such as leaks, overburden movements, equipment failures, and the like (e.g., any of the events described herein) can also create acoustic signals that can have a unique relationship between one or more frequency domain features.

As used herein, various frequency domain features can be obtained from the acoustic signal, and in some contexts, the frequency domain features can also be referred to herein as spectral features or spectral descriptors. The frequency domain features are features obtained from a frequency domain analysis of the acoustic signals obtained within the wellbore. The frequency domain features can be derived from the full spectrum of the frequency domain of the acoustic signal such that each of the frequency domain features can be representative of the frequency spectrum of the acoustic signal. Further, a plurality of different frequency domain features can be obtained from the same acoustic signal (e.g., the same acoustic signal at a location or depth within the wellbore), where each of the different frequency domain features is representative of frequencies across the same frequency spectrum of the acoustic signal as the other frequency domain features. For example, the frequency domain features (e.g., each frequency domain feature) can be a statistical shape measurement or spectral shape function of the spectral power measurement across the same frequency bandwidth of the acoustic signal. Further, as used herein, frequency domain features can also refer to features or feature sets derived from one or more frequency domain features, including combinations of features, mathematical modifications to the one or more frequency domain features, rates of change of the one or more frequency domain features, and the like.

The frequency domain features can be determined by processing the acoustic signals from within the wellbore at one or more locations along the wellbore. As the acoustics signals at a given location along the wellbore contain a combination of acoustic signals, the determination of the frequency domain features can be used to separate and identify individual events. As an example, FIG. 3 illustrates sand 202 flowing from the formation 102 into the wellbore 114 and then into the tubular 120. As the sand 202 flows into the tubular 120, it can collide against the inner surface 204 of the tubular 120, and with the fiber 162 (e.g., in cases where the fiber 162 is placed within the tubular 120), in a random fashion. Without being limited by this or any particular theory, the intensity of the collisions depends on the effective mass and the rate of change in the velocity of the impinging sand particles 202, which can depend on a number of factors including, without limitation, the direction of travel of the sand 202 in the wellbore 114 and/or tubular 120. The resulting random impacts can produce a random, broadband acoustic signal that can be captured on the optical fiber 162 coupled (e.g., strapped) to the tubular 120. The random excitation response tends to have a broadband acoustic signal with excitation frequencies extending up to the high frequency bands, for example, up to and beyond about 5 kHz depending on the size of the sand particles 202. In general, larger particle sizes may produce higher frequencies. The intensity of the acoustic signal may be proportional to the concentration of sand 202 generating the excitations such that an increased broad band power intensity can be expected at increasing sand 202 concentrations. In some embodiments, the resulting broadband acoustic signals that can be identified can include frequencies in the range of about 5 Hz to about 10 kHz, frequencies in the range of about 5 Hz to about 5 kHz or about 50 Hz to about 5 kHz, or frequencies in the range of about 500 Hz to about 5 kHz. Any frequency ranges between the lower frequencies values (e.g., 5 Hz, 50 Hz, 500 Hz, etc.) and the upper frequency values (e.g., 10 kHz, 7 kHz, 5 kHz, etc.) can be used to define the frequency range for a broadband acoustic signal.

In addition to the sand entering the wellbore, fluid flow at the location can also create acoustic signals along with fluid flowing axially or longitudinally through the wellbore. Background noise can also be present. Other acoustic signal sources can include fluid flow with or without sand 202 through the formation 102, fluid flow with or without sand 202 through a gravel pack 122, fluid flow with or without sand 202 within or through the tubular 120 and/or sand screen 118, fluid flow with sand 202 within or through the tubular 120 and/or sand screen 118, fluid flow without sand 202 into the tubular 120 and/or sand screen 118, gas/liquid flow, hydraulic fracturing, fluid leaks past restrictions (e.g., gas leaks, liquid leaks, etc.) mechanical instrumentation and geophysical acoustic noises and potential point reflection noise within the fiber caused by cracks in the fiber optic cable/conduit under investigation. The combined acoustic signal can then be detected by the acoustic monitoring system. In order to detect one or more of these events, the acoustic signal can be processed to determine one or more frequency domain features of the acoustic signal at a depth in the wellbore.

In order to determine the frequency domain features, an acoustic signal can be obtained using the acoustic monitoring system during operation of the wellbore. The resulting acoustic signal can be optionally pre-processed using a number of steps. Depending on the type of DAS system employed, the optical data may or may not be phase coherent and may be pre-processed to improve the signal quality (e.g., denoised for opto-electronic noise normalization/detrending single point-reflection noise removal through the use of median filtering techniques or even through the use of spatial moving average computations with averaging windows set to the spatial resolution of the acquisition unit, etc.). The raw optical data from the acoustic sensor can be received, processed, and generated by the sensor to produce the acoustic signal.

In some embodiments, a processor or collection of processors (e.g., processor 168 in FIG. 3) may be utilized to perform the optional pre-processing steps described herein. In an embodiment, the noise detrended "acoustic variant" data can be subjected to an optional spatial filtering step following the other pre-processing steps, if present. A spatial sample point filter can be applied that uses a filter to obtain a portion of the acoustic signal corresponding to a desired depth or depth range in the wellbore. Since the time the light pulse sent into the optical fiber returns as backscattered light can correspond to the travel distance, and therefore depth in the wellbore, the acoustic data can be processed to obtain a sample indicative of the desired depth or depth range. This may allow a specific location within the wellbore to be isolated for further analysis. The pre-processing may also include removal of spurious back reflection type noises at specific depths through spatial median filtering or spatial averaging techniques. This is an optional step and helps focus primarily on an interval of interest in the wellbore. For example, the spatial filtering step can be used to focus on a producing interval where there is high likelihood of sand ingress, for example. The resulting data set produced through the conversion of the raw optical data can be referred to as the acoustic sample data.

The acoustic data, including the optionally pre-processed and/or filtered data, can be transformed from the time domain into the frequency domain using a transform. For example, a Fourier transform such as a Discrete Fourier transformations (DFT), a short time Fourier transform (STFT), or the like can be used to transform the acoustic data measured at each depth section along the fiber or a section thereof into a frequency domain representation of the signal. The resulting frequency domain representation of the data can then be used to provide the data from which the plurality of frequency domain features can be determined. Spectral feature extraction using the frequency domain features through time and space can be used to determine one or more frequency domain features.

The use of frequency domain features to identify fluid flow events and locations, flow phase identification, and/or flow quantities of one or more fluid phases can provide a number of advantages. First, the use of frequency domain features results in significant data reduction relative to the raw DAS data stream. Thus, a number of frequency domain features can be calculated and used to allow for event identification while the remaining data can be discarded or otherwise stored, and the remaining analysis can performed using the frequency domain features. Even when the raw DAS data is stored, the remaining processing power is significantly reduced through the use of the frequency domain features rather than the raw acoustic data itself. Further, the use of the frequency domain features can, with the appropriate selection of one or more of the frequency domain features, provide a concise, quantitative measure of the spectral character or acoustic signature of specific sounds pertinent to downhole fluid surveillance and other applications.

While a number of frequency domain features can be determined for the acoustic sample data, not every frequency domain feature may be used to identify fluid flow events and locations, flow phase identification, and/or flow quantities of one or more fluid phases. The frequency domain features represent specific properties or characteristics of the acoustic signals.

In some embodiments, combinations of frequency domain features can be used as the frequency domain features themselves, and the resulting combinations are considered to be part of the frequency domain features as described herein. In some embodiments, a plurality of frequency domain features can be transformed to create values that can be used to define various event signatures. This can include mathematical transformations including ratios, equations, rates of change, transforms (e.g., wavelets, Fourier transforms, other wave form transforms, etc.), other features derived from the feature set, and/or the like as well as the use of various equations that can define lines, surfaces, volumes, or multi-variable envelopes. The transformation can use other measurements or values outside of the frequency domain features as part of the transformation. For example, time domain features, other acoustic features, and non-acoustic measurements can also be used. In this type of analysis, time can also be considered as a factor in addition to the frequency domain features themselves. As an example, a plurality of frequency domain features can be used to define a surface (e.g., a plane, a three-dimensional surface, etc.) in a multivariable space, and the measured frequency domain features can then be used to determine if the specific readings from an acoustic sample fall above or below the surface. The positioning of the readings relative to the surface can then be used to determine if the event is present or not at that location in that detected acoustic sample.

The frequency domain features can include any frequency domain features derived from the frequency domain representations of the acoustic data. Such frequency domain features can include, but are not limited to, the spectral centroid, the spectral spread, the spectral roll-off, the spectral skewness, the root mean square (RMS) band energy (or the normalized sub-band energies/band energy ratios), a loudness or total RMS energy, a spectral flatness, a spectral slope, a spectral kurtosis, a spectral flux, a spectral autocorrelation function, or a normalized variant thereof.

The spectral centroid denotes the "brightness" of the sound captured by the optical fiber (e.g., optical fiber 162 shown in FIG. 3) and indicates the center of gravity of the frequency spectrum in the acoustic sample. The spectral centroid can be calculated as the weighted mean of the frequencies present in the signal, where the magnitudes of the frequencies present can be used as their weights in some embodiments.

The spectral spread is a measure of the shape of the spectrum and helps measure how the spectrum is distributed around the spectral centroid. In order to compute the spectral spread, Si, one has to take the deviation of the spectrum from the computed centroid as per the following equation (all other terms defined above):

$$S_i = \sqrt{\frac{\sum_{k=1}^{N}(f(k)-C_i)^2 X_i(k)}{\sum_{k=1}^{N} X_i(k)}}. \quad \text{(Eq. 2)}$$

The spectral roll-off is a measure of the bandwidth of the audio signal. The Spectral roll-off of the $i^{th}$ frame, is defined as the frequency bin 'y' below which the accumulated magnitudes of the short-time Fourier transform reach a certain percentage value (usually between 85%-95%) of the overall sum of magnitudes of the spectrum.

$$\sum_{k=1}^{y}|X_i(k)| = \frac{c}{100}\sum_{k=1}^{N}|X_i(k)|, \quad \text{(Eq. 3)}$$

where c=85 or 95. The result of the spectral roll-off calculation is a bin index and enables distinguishing acoustic events based on dominant energy contributions in the frequency domain (e.g., between gas influx and liquid flow, etc.).

The spectral skewness measures the symmetry of the distribution of the spectral magnitude values around their arithmetic mean.

The RMS band energy provides a measure of the signal energy within defined frequency bins that may then be used for signal amplitude population. The selection of the bandwidths can be based on the characteristics of the captured acoustic signal. In some embodiments, a sub-band energy ratio representing the ratio of the upper frequency in the selected band to the lower frequency in the selected band can range between about 1.5:1 to about 3:1. In some embodiments, the sub-band energy ratio can range from about 2.5:1 to about 1.8:1, or alternatively be about 2:1 The total RMS energy of the acoustic waveform calculated in the time domain can indicate the loudness of the acoustic signal. In some embodiments, the total RMS energy can also be extracted from the temporal domain after filtering the signal for noise.

The spectral flatness is a measure of the noisiness/tonality of an acoustic spectrum. It can be computed by the ratio of the geometric mean to the arithmetic mean of the energy spectrum value and may be used as an alternative approach to detect broad-banded signals. For tonal signals, the spectral flatness can be close to 0 and for broader band signals it can be closer to 1.

The spectral slope provides a basic approximation of the spectrum shape by a linearly regressed line. The spectral slope represents the decrease of the spectral amplitudes from low to high frequencies (e.g., a spectral tilt). The slope, the y-intersection, and the max and media regression error may be used as features.

The spectral kurtosis provides a measure of the flatness of a distribution around the mean value.

The spectral flux is a measure of instantaneous changes in the magnitude of a spectrum. It provides a measure of the frame-to-frame squared difference of the spectral magnitude vector summed across all frequencies or a selected portion of the spectrum. Signals with slowly varying (or nearly constant) spectral properties (e.g., noise) have a low spectral flux, while signals with abrupt spectral changes have a high spectral flux. The spectral flux can allow for a direct measure of the local spectral rate of change and consequently serves as an event detection scheme that could be used to pick up the onset of acoustic events that may then be further analyzed using the feature set above to identify and uniquely classify the acoustic signal.

The spectral autocorrelation function provides a method in which the signal is shifted, and for each signal shift (lag) the correlation or the resemblance of the shifted signal with the original one is computed. This enables computation of the fundamental period by choosing the lag, for which the signal best resembles itself, for example, where the autocorrelation is maximized. This can be useful in exploratory signature analysis/even for anomaly detection for well integrity monitoring across specific depths where well barrier elements to be monitored are positioned.

Any of these frequency domain features, or any combination of these frequency domain features (including transformations of any of the frequency domain features and combinations thereof), can be used to detect and identify one or more events and locations. In some aspects, a selected set of characteristics can be used to identify the events, and/or all of the frequency domain features that are calculated can be used as a group in characterizing the identity and location of the one or more events. The specific values for the frequency domain features that are calculated can vary depending on the specific attributes of the acoustic signal acquisition system, such that the absolute value of each frequency domain feature can change between systems. In some aspects, the frequency domain features can be calculated for each event based on the system being used to capture the acoustic signal and/or the differences between systems can be taken into account in determining the frequency domain feature values for each fluid inflow event between or among the systems used to determine the values and the systems used to capture the acoustic signal being evaluated. For example, the frequency domain features can be normalized based on the acquired values to provide more consistent readings between systems and locations.

One or a plurality of frequency domain features can be used to identify events and locations. In an embodiment, one, or at least two, three, four, five, six, seven, eight, etc. different frequency domain features can be used to identify the one or more events and their locations. The frequency domain features can be combined or transformed in order to define the event signatures for one or more events, such as, for instance, a fluid flow event location or flowrate. While exemplary numerical ranges are provided herein, the actual numerical results may vary depending on the data acquisition system and/or the values can be normalized or otherwise processed to provide different results.

In embodiments, the method 10 of identifying one or more events within wellbore 114 further comprises creating labeled data using the identified one or more events identified at 13 and the second set of measurements obtained at 15.

Figure 2A:
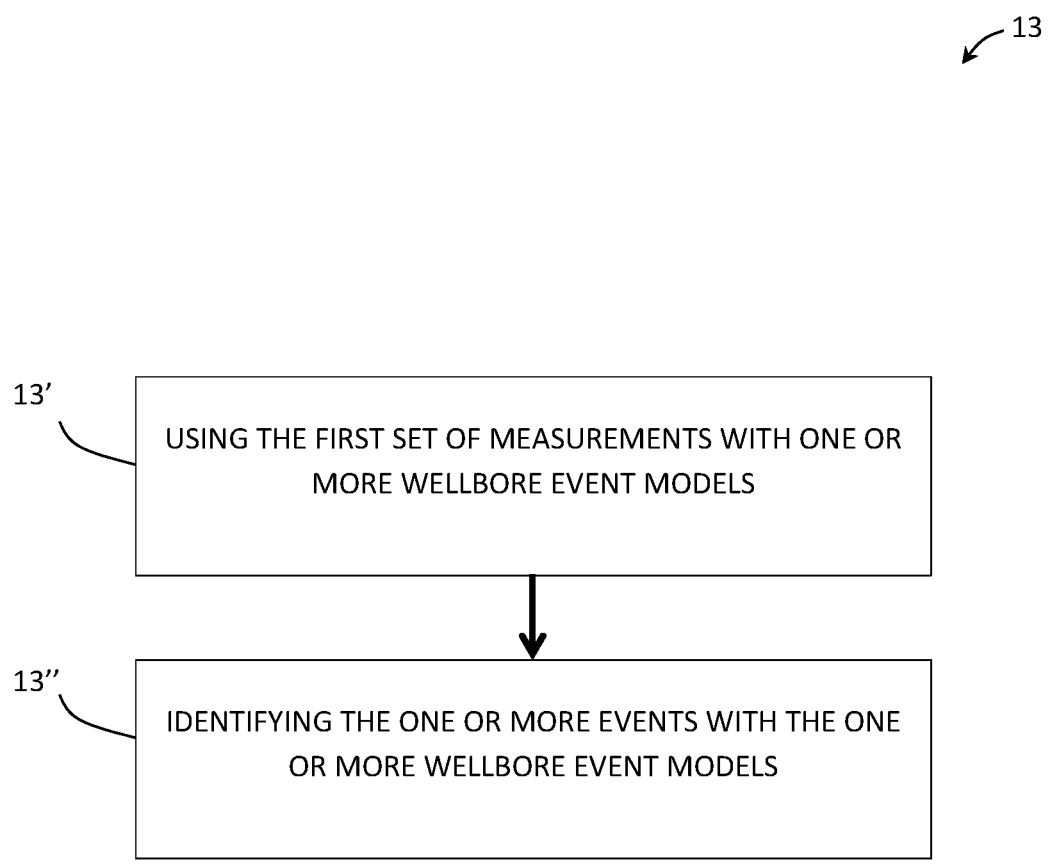
FIG. 2A is a flow diagram of a method of identifying one or more events within the wellbore using a first set of measurements.
Figure 2B:
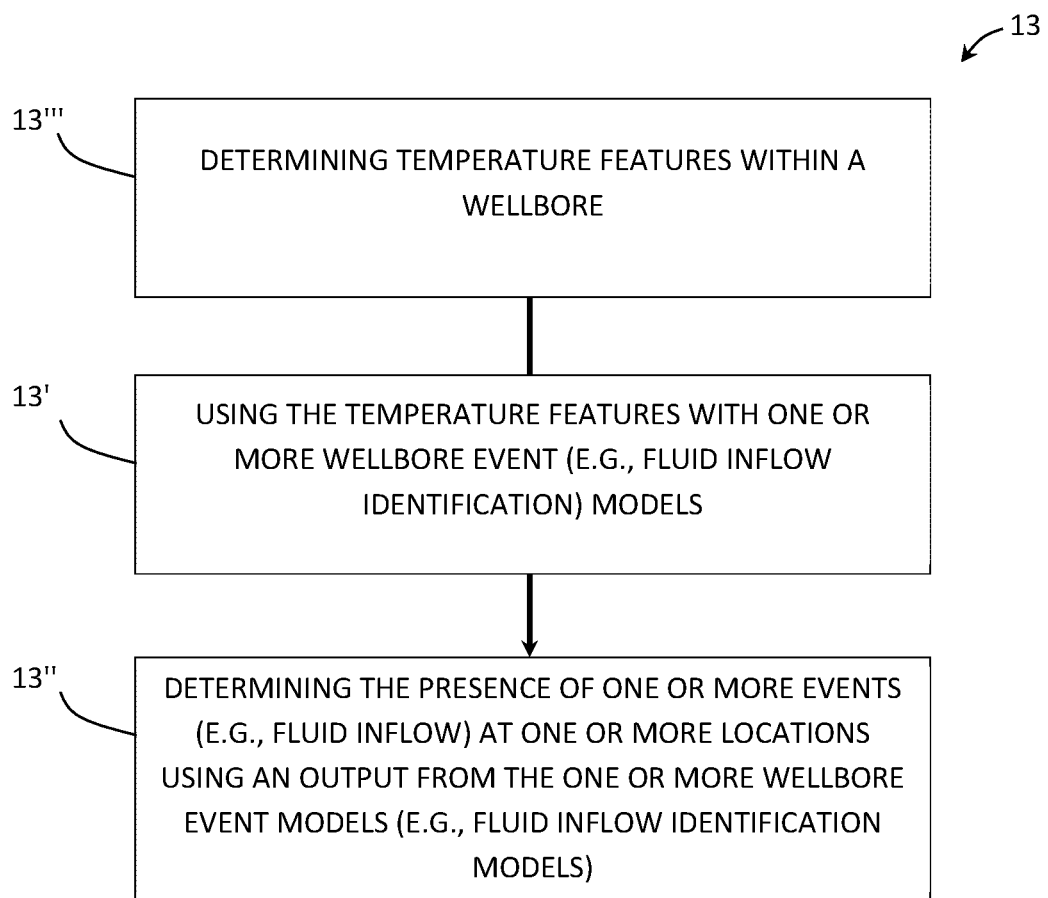
FIG. 2B is a flow diagram of a method for identifying one or more fluid inflow locations within a wellbore using a first set of measurements according to some embodiments.

As depicted in FIG. 2A, which is a flow diagram of identifying one or more events within the wellbore 114 using the first set of measurements at 13, in embodiments, identifying the one or more events at 13 comprises: using the first set of measurements with one or more wellbore event models at 13'; and identifying the one or more events with the one or more wellbore event models at 13". For example, when the first set of measurements comprises DTS measurements, the first set of (e.g., DTS) measurements can be utilized as described hereinabove with one or more wellbore event models to identify the one or more events. For example, as depicted in FIG. 2B, in such embodiments, identifying one or more events within the wellbore 114 using the first set of measurements at 13 can comprise determining temperature features at 13''', using the temperature features with one or more wellbore event models at 13', and determining the presence of (i.e., "identifying") the one or more events (such as, without limitation, fluid flow) at one or more locations in the wellbore 114 using an output from the one or more wellbore event models at 13".

In some aspects, the one or more wellbore event models can comprise physics, fluid mechanics, or first principles models. For example, temperature based measurements can be used in a first principles model to identify the inflow of a gas phase hydrocarbon into the wellbore. Various phenomena such as Joule-Thomson cooling can result in a localized temperature change to identify the inflow of gas. Other first principles or similar type models can also be used to identify the one or more events at 13. In some aspects, the one or more wellbore event models can comprise a plurality of models using different parameters. For example, first principles models can be combined with temperature based machine learning models to fully identify the one or more events at 13.

In embodiments, subsequent training of the one or more event models at 17, the method 10 can further comprise at 19 (e.g., using the one or more event models to identify the at least one additional event within the wellbore 114): monitoring the first signal within the wellbore 114; monitoring the second signal within the wellbore 114; using the first signal in the one or more wellbore event models; using the second signal in the (now trained) one or more event models; and detecting the at least one additional event based on outputs of both the one or more wellbore event models and the one or more event models. In this manner, the trained one or more event models and the one or more wellbore event models utilized to identify the one or more events at 13 that were subsequently utilized to train the one or more event models at 17 can be utilized at 19 to identify the at least one additional event within the wellbore 114.

In some aspects, the second signal can comprise an acoustic signal. In such embodiments, a method of identifying events within a wellbore according to this disclosure can comprise: obtaining a first set of measurements of a first signal within a wellbore 114 at 11; identifying one or more events within the wellbore 114 at 13; obtaining an acoustic data set from within the wellbore 114 at 15, wherein the first signal is not an acoustic signal; training, at 17, one or more second event models using the acoustic data set and the identification of the one or more events as inputs; and using the trained one or more second event models at 19 to identify at least one additional event within the wellbore 114.

As noted hereinabove, the second signal comprises an acoustic signal, the first set of measurements can comprise distributed temperature sensor (DTS) measurements. Alternatively or additionally, the first set of measurements can comprise production volumetric (e.g., PLT) information. Identifying the one or more events within the wellbore 114 at 13 can comprise: identifying a first location having a first event of the one or more events; and identifying the first event at the first location using one or more wellbore event models.

Referring to FIG. 1, training the one or more event models at 17 can comprise: obtaining acoustic data for the first location from the acoustic data set (e.g., as described hereinabove with reference to FIG. 3); and training the one or more event models using the acoustic data for the first location and the identification of the first event at the first location. Using the trained one or more event models at 19 to identify the at least one additional event within the wellbore 114 can comprise using the one or more trained event models (optionally in conjunction with the one or more wellbore event models) to identify the at least one additional event. The event can be identified along the length of the wellbore 114, or in some aspects, within another wellbore.

For an event comprising fluid flow, one or more fluids that can include gas, a liquid aqueous phase, a liquid hydrocarbon phase, and potentially other fluids as well as various combinations thereof can enter the wellbore 114 at one or more locations along the wellbore 114. Temperature features can be utilized to identify these inflow locations. As noted hereinabove, temperature features can be utilized with one or more first or wellbore event models to provide an output of the one or more first or wellbore event models and then be utilized with the one or more second event models to provide an output of the second model. Subsequent to training of the one or more event models, the presence (and/or extent) of the at least one additional event at one or more locations can be determined using an output from the one or more first or wellbore event models, an output from the one or more second event models, or a combined output obtained using the output from the one or more first or wellbore event models and the output from the one or more second event models.

The temperature features can be determined using the temperature monitoring system to obtain temperature measurements along the length being monitored (e.g., the length of the wellbore). In some embodiments, a DTS system can be used to receive distributed temperature measurement signals from a sensor disposed along the length (e.g., the length of the wellbore), such as an optical fiber. The resulting signals from the temperature monitoring system can be used to determine one or more temperature features as described herein. In some embodiments, a baseline or background temperature profile can be used to determine the temperature features, and the baseline temperature profile can be obtained prior to obtaining the temperature measurements.

In some embodiments, a plurality of temperature features can be determined from the temperature measurements, and the plurality of temperature features can comprise at least two of: a depth derivative of temperature with respect to depth, a temperature excursion measurement, a baseline temperature excursion, a peak-to-peak value, a fast Fourier transform, a Laplace transform, a wavelet transform, a derivative of temperature with respect to length (e.g., depth), a heat loss parameter, an autocorrelation, as detailed hereinabove, and/or the like. Other temperature features can also be used in some embodiments. The temperature excursion measurement can comprise a difference between a temperature reading at a first depth, and a smoothed temperature reading over a depth range, where the first depth is within the depth range. The baseline temperature excursion can comprise a derivative of a baseline excursion with depth, where the baseline excursion can comprise a difference between a baseline temperature profile and a smoothed temperature profile. The peak-to-peak value can comprise a derivative of a peak-to-peak difference with depth, where the peak-to-peak difference comprises a difference between a peak high temperature reading and a peak low temperature reading with an interval. The fast Fourier Transform can comprise an FFT of the distributed temperature sensing signal. The Laplace transform can comprise a Laplace transform of the distributed temperature sensing signal. The wavelet transform can comprise a wavelet transform of the distributed temperature sensing signal or of the derivative of the distributed temperature sensing signal with respect to length (e.g., depth). The derivative of the distributed temperature sensing signal with respect to length (e.g., depth) can comprise the derivative of the flowing temperature with respect to depth. The heat loss parameter can comprise one or more of the geothermal temperature, a deviation, dimensions of the tubulars that are in the well, well head pressure, individual separator rates, downhole pressure, gas/liquid ratio, or the like. The autocorrelation can comprise a cross-correlation of the distributed temperature sensing signal with itself.

Once the temperature features are obtained, the temperature features can be used with one or more first or wellbore event models to identify the presence of the event at one or more locations. In some embodiments, the one or more first or wellbore event models can accept a plurality of temperature features as inputs. In general, the temperature features are representative of feature at a particular location (e.g., a depth resolution portion of the optical fiber along the length of the wellbore 114 being monitored) along the length. The one or more first or wellbore event models can comprise one or more models configured to accept the temperature features as input(s) and provide an indication of whether or not there is an event at the particular location along the length. The output of the one or more first or wellbore event models can be in the form of a binary yes/no result, and/or a likelihood of an event (e.g., a percentage likelihood, etc.). Other outputs providing an indication of an event are also possible. In some embodiments, the one or more first or wellbore event models can comprise a machine learning model using supervised or unsupervised learning algorithms such as a multivariate model, neural network, or the like.

In some embodiments, the one or more first or wellbore event models can comprise a multivariate model. A multivariate model allows for the use of a plurality of variables in a model to determine or predict an outcome. A multivariate model can be developed using known data on events along with features for those events to develop a relationship between the features and the presence of the event at the locations within the available data. One or more multivariate models can be developed using data, where each multivariate model uses a plurality of features as inputs to determine the likelihood of an event occurring at the particular location along the length.

As noted above, in some embodiments, the one or more first or wellbore event models can comprise one or more multivariate models that use one or more features (e.g., temperature features, frequency domain features, other features derived from other types of sensors, etc.). The multivariate model can use multivariate equations, and the multivariate model equations can use the features or combinations or transformations thereof to determine when an event is present. The multivariate model can define a threshold, decision point, and/or decision boundary having any type of shapes such as a point, line, surface, or envelope between the presence and absence of the specific event. In some embodiments, the multivariate model can be in the form of a polynomial, though other representations are also possible. The model can include coefficients that can be calibrated based on known event data. While there can be variability or uncertainty in the resulting values used in the model, the uncertainty can be taken into account in the output of the model. Once calibrated or tuned, the model can then be used with the corresponding features to provide an output that is indicative of the occurrence of an event.

The multivariate model is not limited to two dimensions (e.g., two features or two variables representing transformed values from two or more features), and rather can have any number of variables or dimensions in defining the threshold between the presence or absence of the event. When used, the detected values can be used in the multivariate model, and the calculated value can be compared to the model values. The presence of the event can be indicated when the calculated value is on one side of the threshold and the absence of the event can be indicated when the calculated value is on the other side of the threshold. In some embodiments, the output of the multivariate model can be based on a value from the model relative to a normal distribution for the model. Thus, the model can represent a distribution or envelope and the resulting features can be used to define where the output of the model lies along the distribution at the location along the length being monitored (e.g., along the length of the wellbore). Thus, each multivariate model can, in some embodiments, represent a specific determination between the presence or absence of an event at a specific location along the length. Different multivariate models, and therefore thresholds, can be used for different events, and each multivariate model can rely on different features or combinations or transformations of features. Since the multivariate models define thresholds for the determination and/or identification of events, the multivariate models and the one or more first or wellbore event models using such multivariate models can be considered to be based event signatures for each type of event.

In some embodiments, the one or more first or wellbore event models can comprise a plurality of models. Each of the models can use one or more of the features as inputs. The models can comprise any suitable model that can relate one or more features to an occurrence of an event (e.g., a likelihood of the event, a binary yes/no output, etc.). The output of each model can then be combined to form a composite or combined output. The combined output can then be used to determine if an event has occurred, for example, by comparing the combined output with a threshold value. The determination of the occurrence of an event can then be based on the comparison of the combined output with the threshold value.

As an example, the one or more first or wellbore event models can include a plurality of multivariate models, each using a plurality of features as described above. The output of the multivariate models can include a percentage likelihood of the occurrence of an event at the particular location at which each model is applied. The resulting output values can then be used in a function such as a simple multiplication, a weighted average, a voting scheme, or the like to provide a combined output. The resulting output can then be compared to a threshold to determine if an event has occurred. For example, a combined output indicating that there is greater than a fifty percent likelihood of an event at the particular location can be taken as an indication that the event has occurred at the location of interest.

In some embodiments, the one or more first or wellbore event models can also comprise other types of models, including other machine learning models, first principles models, and/or physics based models. In some embodiments, a machine learning approach comprises a logistic regression model. In some such embodiments, one or more features can be used to determine if an event is present at one or more locations of interest. The machine learning approach can rely on a training data set that can be obtained from a test set-up or obtained based on actual data from known events (e.g., from in-situ data as described herein in any of the aspects or embodiments). The one or more features in the training data set can then be used to train the one or more first or wellbore event models using machine learning, including any supervised or unsupervised learning approach. For example, the one or more first or wellbore event models can include or consist of a neural network, a Bayesian network, a decision tree, a logistical regression model, a normalized logistical regression model, or the like. In some embodiments, the one or more first or wellbore event models can comprise a model developed using unsupervised learning techniques such a k-means clustering and the like.

In some embodiments, the one or more first or wellbore event models can be developed and trained using a logistic regression model. As an example for training of a model used to determine the presence or absence of an event, the training of the model can begin with providing the one or more temperature features to the logistic regression model corresponding to one or more reference data sets in which event(s) are present. Additional reference data sets can be provided in which event(s) are not present. The one or more features can be provided to the logistic regression model, and a first multivariate model can be determined using the one or more features as inputs. The first multivariate model can define a relationship between a presence and an absence of the events.

Once the one or more first or wellbore event models are trained, the one or more first or wellbore event models can be used to determine the presence or absence of an event at one or more locations along the length of the wellbore 114, and the one or more events identified at 13 can be utilized at 17 to identify corresponding data for training the one or more event models. The features determined for each location along the length can be used with the one or more first or wellbore event models. The output of the one or more first or wellbore event models can provide an indication of the presence of an event at each location for which the temperature features are obtained. When the output indicates that an event has occurred at a given location, an output can be generated indicating the presence of the event. The process can be repeated along the length to provide an event profile, which can comprise an indication of the events at one or more locations along the length being monitored. In some aspects, the event may be known or induced, and the use of the first wellbore event models may not be used to identify the event.

In some embodiments, the determination of the one or more events can be presented as a profile along a length on an output device. The outputs can be presented in the form of an event profile depicted along an axis with or without a schematic. The event profile can then be used to visualize the event locations, which can allow for various processes to be carried out. For example, for events comprising fluid flow, the fluid flow locations can be compared to the producing zones within a completion to understand where fluid is entering, leaving, or flowing along the wellbore. In some embodiments, fluid flow can be detected at locations other than a producing zone, which may provide an indication that a remediation procedure is needed within the wellbore 114. For example, fluid flow during a shut-in period outside of a producing zone may indicate a leak behind the casing.

The identification of the event at step 13 allows the second set of measurements of the second signal to be obtained and associated or labeled with the event. For example, DTS measurements and/or temperature features can be used to identify an event at a location in the wellbore. A second set of measurements such as acoustic measurements can then be taken and labeled as being associated with an identified event. The labeled data can then be used to train the one or more event models at 17, as described in more detail below. Obtaining the second set of measurements at step 15 can occur simultaneously with obtaining the first set of measurements at step 11. For example, both sets of measurements can be detected at the same time. Once the event is identified using the first set of measurements, the second set of measurements can be stored with the event identification. Since some events are relatively constant, obtaining the first set of measurements can occur prior to or after obtaining the second set of measurements. For example, flow rate measurements from a PLT can be used to identify a fluid flow of a specific phase at a first time. The PLT can then be moved in the wellbore or removed altogether, and a second set of measurements can be obtained, where the fluid flow can be assumed to be the same at the time of the second set of measurement even though they are not obtained simultaneously. The resulting event identification can then be used to label the in-situ data for use in training the one or more event models at step 17.

According to this disclosure, the one or more second event models can be trained using a labeled data set, obtained from field or in situ data (i.e., from event locations identified from the first set of measurements of the first signal) that is labeled using other instrumentation to identify the presence and/or extent of an event. In some embodiments, the one or more second event models can be further trained using a labeled data set, which can be obtained using a test apparatus such as a test flow set-up and/or field data that is labeled using other instrumentation to identify the extent of an event. Using labeled data, the method of developing the one or more second event models can include determining one or more frequency domain features from the acoustic signal for at least a portion of the data from the labeled data. The one or more frequency domain features can be obtained across the portion of length where the event occurs, which can be determined using the first event model or models. The second event model can then be trained using the frequency domain features from the labeled data and/or the tests. The training of the second event model can use machine learning, including any supervised or unsupervised learning approach. For example, the one or more event models can include or be a neural network, a Bayesian network, a decision tree, a logistical regression model, a normalized logistical regression model, k-means clustering or the like.

In some embodiments, the one or more second event models can be developed and trained using a logistic regression model. As an example for training of a model used to determine the extent of an event comprising fluid flow (e.g., to determine the fluid flow rate), the training of the one or more second event models can begin with providing one or more frequency domain features to the logistic regression model corresponding to one or more event tests where known event extents have been measured. Similarly, one or more frequency domain features can be provided to the logistic regression model corresponding to one or more tests where no event is present. A first multivariate model can be determined using the one or more frequency domain features as inputs. The first multivariate model can define a relationship between a presence and an absence of the event and/or event extent.

In the one or more second event models, the multivariate model equations can use the frequency domain features or combinations or transformations thereof to determine when a specific event or event extent (e.g., a specific fluid flow rate or fluid flow rate for a fluid phase) is present. The multivariate model can define a threshold, decision point, and/or decision boundary having any type of shapes such as a point, line, surface, or envelope between the presence and absence of the event or an event extent (e.g., the specific fluid flow rate or fluid flow rate for a phase). In some embodiments, the multivariate model can be in the form of a polynomial, though other representations are also possible. When models such a neural networks are used, the thresholds can be based on node thresholds within the model. As noted herein, the multivariate model is not limited to two dimensions (e.g., two frequency domain features or two variables representing transformed values from two or more frequency domain features), and rather can have any number of variables or dimensions in defining the threshold between the presence or absence of the event (e.g., fluid flow) and the specific event extents (e.g., fluid flow rates for one or more fluids and/or fluid phases). Different multivariate models can be used for various events and/or event extents (e.g., flow rate for each fluid type and/or fluid flow phase), and each multivariate model can rely on different frequency domain features or combinations or transformations of frequency domain features.

Whether a test system or in situ sensors are used to obtain data on the event extents (e.g., flow rates), collectively referred to as "reference data", one or more models can be developed for the determination of the event extents (e.g., flow rates) using the reference data. The model(s) can be developed by determining one or more frequency domain features from the acoustic signal for at least a portion of the reference data. The training of the model(s) can use machine learning, including any supervised or unsupervised learning approach. For example, one or more of the model(s) can be a neural network, a Bayesian network, a decision tree, a logistical regression model, a normalized logistical regression model, k-means clustering, or the like.

The one or more frequency domain features used in the one or more second event models can include any frequency domain features noted hereinabove as well as combinations and transformations thereof. For example, In some embodiments, the one or more frequency domain features comprise a spectral centroid, a spectral spread, a spectral roll-off, a spectral skewness, an RMS band energy, a total RMS energy, a spectral flatness, a spectral slope, a spectral kurtosis, a spectral flux, a spectral autocorrelation function, combinations and/or transformations thereof, or any normalized variant thereof. In some embodiments, the one or more frequency domain features comprise a normalized variant of the spectral spread (NVSS) and/or a normalized variant of the spectral centroid (NVSC).

The output of the (trained) one or more second event models can comprise an indication of the event location(s) and/or extent(s) (e.g., the flow rate(s) of one or more fluids and/or fluid phases). For example, for events comprising fluid flow, the total liquid flow rate at one or more event locations can be determined from the one or more second event models. The resulting output can, in aspects, be compared to the output of the one or more first or wellbore event models to allow the event (e.g., fluid flow) location determination to be based both on the one or more first or wellbore event models (e.g., using the temperature features) and the one or more second event models (e.g., using the frequency domain features). In aspects, a final output can be a function of both the output from the one or more first or wellbore event models and the one or more second event models. In some embodiments, the outputs can be combined as a product, weighted product, ratio, or other mathematical combination. Other combinations can include voting schemes, thresholds, or the like to allow the outputs from both models to be combined. As an example, if the output from either model is zero, then the event identification at the location would also indicate that there is no event at the location. In this example, one model can indicate that an event is present, but the other model can indicate that no event is present. The final result can indicate that no event is present. When both models indicate that the event is present, the final combined output can provide a positive indication of the event at the location. It is noted that the output of the one or more second event models can provide one or more indications of event extents (e.g., a fluid flow rate of one or more fluids and/or fluid phases). While this output can be distinct from the output of the one or more first or wellbore event models, the two outputs can be combined to improve the accuracy of the event location identification.

In aspects, a combined or hybrid approach to determining event extents (e.g., fluid flow rates) at the one or more locations at which an event (e.g., fluid flow) is identified is utilized. In these embodiments, the outputs of the one or more first or wellbore event models and the one or more (trained) second event models can be used together to help to determine or confirm the presence and/or extent of an event (e.g., a flow rate of one or more fluids and/or fluid phases) along the length being monitored (e.g., within the wellbore 114). In some embodiments, the outputs of the two models can be combined to form a final event presence and/or event extent determination.

Subsequent to the training of the one or more event models at 17, the one or more second event models can use one or more frequency domain features in one or more event models to validate the identified one or more events and/or predict an extent of the event(s) (e.g., a quantity or flow rate of one or more fluids and/or fluid phases into the wellbore 114, amount of leakage from a pipeline, etc.). For example, when the event comprises fluid flow in a wellbore 114, the one or more second event models can be used to identify the fluid flow, to validate a flow location identified by the one or more first or wellbore event models, and/or predict the flow rates of one or more fluids including a gas, an aqueous liquid, a hydrocarbon liquid, or another fluid within the wellbore 114. In some embodiments, the one or more second event models can be utilized to predict the flow rate of a fluid phase such as a gas phase and/or a liquid phase (e.g., including a liquid aqueous phase and a hydrocarbon liquid phase).

In some embodiments, the frequency domain features can be used with one or more second event models to predict a fluid flow rate, such as a liquid flowrate into the wellbore 114. The one or more second event models can relate a fluid flow rate of one or more phases (e.g., including a total liquid flow rate) to one or more frequency domain features. In some embodiments, the trained one or more second event models can accept one or more frequency domain features as inputs. In general, the frequency domain features are representative of feature at a particular location (e.g., a depth resolution portion of the optical fiber along the length, e.g., the length of the wellbore) along the length. The one or more second event models can comprise one or more models configured to accept the frequency domain features as input(s) and provide an indication of the presence and/or extent of the event (e.g., a fluid flow rate) at one or more locations within wellbore 114. When the event comprises fluid inflow, for example, the output of the one or more second event models can be, for example, in the form of a flow rate of one or more fluids and/or fluid phases. In some embodiments, the one or more second event models can comprise a multivariate model, a machine learning model using supervised or unsupervised learning algorithms, or the like.

In some embodiments, one or more second event models can be developed using a machine learning approach. In some such embodiments, a single frequency domain feature (e.g., spectral flatness, RMS bin values, etc.) can be used to determine if the event is present at each location of interest. In some embodiments, the supervised learning approach can be used to determine a model of the event extent (e.g., flow rate of one or more fluids and/or fluid phases, such as gas flow rate, a hydrocarbon flow rate, a water flow rate, a total gas phase flow rate, and/or a total liquid phase (e.g., a liquid aqueous phase and a liquid hydrocarbon phase) flow rate).

In some aspects, the event identification and corresponding reference data can be used to calibrate the one or more first event models. In this context, training the one or more second event models can include a calibration process. For example, the models or structure of the model (e.g., the type of model, identification of the model variables, etc.) can be known or pre-trained, and the event identification and corresponding reference data can be used as a new training data set or used to supplement the original training data set to re-train or calibrate the one or more second event models. This can allow one or more parameters (e.g., coefficients, weightings, etc.) to be updated or calibrated to provide a more accurate model. This process may be useful to calibrate existing models for specific wellbores, formations, or fields to improve the event identifications in those locations.

Continuing the example above for a fluid flow events, the use of the event identification and reference data can allow for a fluid flow event model to be trained using the fluid flow event identification and reference data to be used as the input data. A fluid inflow model such as a hydrocarbon inflow model, may be defined by one or more frequency domain features and a relationship between the features. The event identification can be used to select the appropriate model (e.g., as defined by the identification and relationship of the one or more frequency domain features), and the reference data can be used to train the model to determine the model parameters (e.g., coefficients, weightings, etc.). This process can represent a calibration of the one or more second event models rather than developing an entirely new model.

The in-situ identification of training data can also be used to cross-check and validate existing models. For example, the in-situ identified data can be used to train the one or more second event models as described herein. When an additional event is identified using the trained one or more second models, the event identification can be used to identify additional data using the first signals, which would correspond to the first set of measurements. The first set of models can be trained to verify whether or not the newly trained model matches the original model within a given threshold. When the models match, the system can provide an indication that the event is the only event present. When the models do not match, it can be an indication that another, unidentified event is present within the data. Additional training and event identification can then be used to identify the additional event. The cross-checking and validation process can be carried out using subsequent data in time, at different depths along the wellbore, and/or across different wellbores.

Using the example above for fluid flow events, DTS data can be used to identify an event during a fluid flow event such as a hydrocarbon flow. Corresponding DAS acoustic data can be obtained during the hydrocarbon flow event, and the resulting reference data can be used to train one or more second event models for hydrocarbon flow using one or more frequency domain features obtained from the DAS data. The resulting hydrocarbon flow event models using the one or more frequency domain features can then be used alone or in combination with the DTS models to identify a hydrocarbon flow event.

Continuing with the example, the DAS data can be used to identify a hydrocarbon flow event using the trained hydrocarbon flow models. When a hydrocarbon flow event is detected, additional data such as DTS data can be obtained. The training process can then be repeated using the DTS data to train a hydrocarbon flow model, and the resulting trained model can be compared to the original DTS model for hydrocarbon flow. If the models match within a threshold (e.g., within a margin of error, etc.), then the models can be understood to detect hydrocarbon flow with reasonable certainty. However, if the models do not match, an additional event may be present. For example, the flow event as detected by the trained hydrocarbon flow model using the one or more frequency domain features may include both hydrocarbon flow and water flow. By training the model using the identified DTS data, the model may not match the original model due to the presence of the water in the flowing fluids.

When the models do not match within a threshold or margin of error, the various data can be used to identify one or more events and identify any remaining noise or background signals. The remaining signals can then be attributed to a separate event that can be identified using other signatures, models, or processes. For example, the produced fluids can be observed on the surface to provide data indicating that water is present in addition to the hydrocarbon fluids. This information can then be used with the noise signals to identify additional data that can be used to train an additional one or more event models to capture the additional events.

Even when the original model and the additional model match within a margin of error, the process can be used to improve both sets of models. In some embodiments, once one or more second event models are trained using the reference data, the one or more second event models can be used to identify one or more events. Additional data using a signal that represents a different physical measurement, which can be the same as the first signal used to train the one or more second event models, can be obtained and labeled using the identification of the event. The original thresholds, signatures, and/or models can then be retrained using the new reference data and/or a set of reference data supplemented by the new reference data (e.g., the original training data set and the new reference data combined to provide a larger training data set). This process can provide an improvement in the model output.

This process can be carried out at different locations along the wellbore, at different locations in different wellbores, and/or at different times in the same or different locations in the wellbore or a separate wellbore. This can allow for an improved reference data set (e.g., that is labeled with the identified events) that can be used to train the one or more event models over time to provide improved results for event identification.

Figure 6:
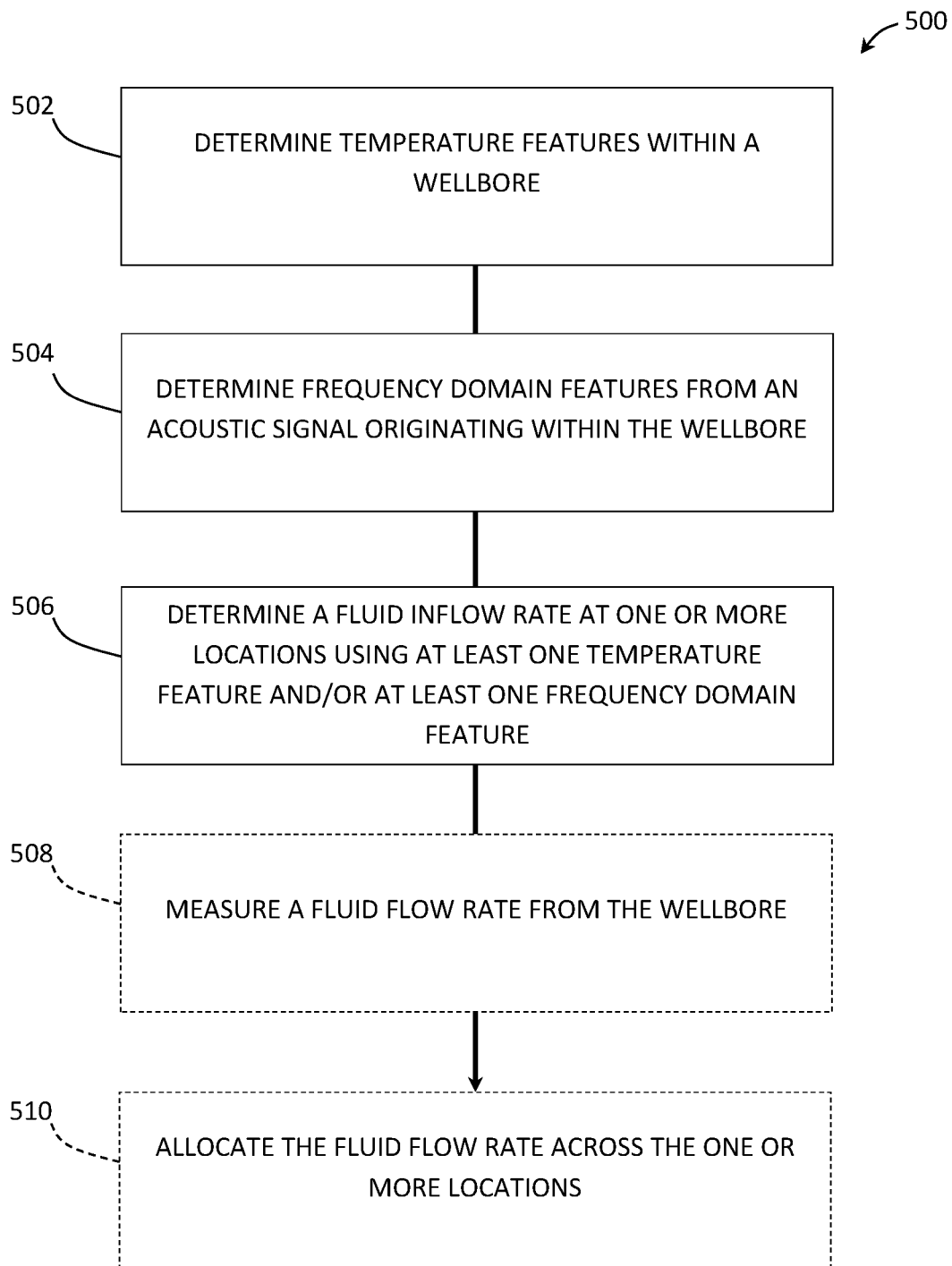
FIG. 6 is a flow diagram of a method of determining fluid inflow rates at one or more locations within a wellbore according to some embodiments.

FIG. 6 illustrates a flow chart for a method 500 of determining the presence and/or extent of an event after training of the one or more event models. Subsequent to training the one or more event models, the one or more event models can be utilized alone or in conjunction with and/or the one or more wellbore event models or other data. For example, subsequent training of one or more event models with DAS data in combination with the location of one or more events identified via DTS data, the one or more trained event models can be utilized alone or in combination with the one or more wellbore event models to identify at least one additional event in the or another wellbore. In applications, DAS and DTS can be combined as described, for example, in PCT Patent Application No. PCT/EP2020/051817, entitled, "Event Characterization Using Hybrid DAS/DTS Measurements", filed on Jan. 24, 2020, which is incorporated herein in its entirety. At step 502, temperature features can be determined using any of the processes and systems as described herein. In some embodiments, a DTS system can be used to obtain distributed temperature sensing signal along the length being monitored (e.g., along a length within the wellbore 114). The DTS system can provide distributed temperature measurements along the length over time. A baseline temperature can be stored for the length as described herein and used along with the temperature measurements to determine the temperature features. The temperature features can include any of those described herein including a depth derivative of temperature with respect to depth, a temperature excursion measurement, a baseline temperature excursion, a peak-to-peak value, a fast Fourier transform, a Laplace transform, a wavelet transform, a derivative of temperature with respect to length (e.g., depth), a heat loss parameter, an autocorrelation, a statistical measure of a variation with respect to time and/or distance, as detailed hereinabove, or a combination thereof.

At step 504, one or more frequency domain features can be obtained from an acoustic signal originating along the length being monitored (e.g., within the wellbore 114). The frequency domain features can be determined using any of the processes and systems as described herein. In some embodiments, a DAS system can be used to obtain a distributed acoustic signal along the length of wellbore 114 being monitored. The acoustic signals obtained from the DAS system can then be processed to determine one or more frequency domain features as described herein. In some embodiments, the frequency domain features can comprise at least one of: a spectral centroid, a spectral spread, a spectral roll-off, a spectral skewness, an RMS band energy, a total RMS energy, a spectral flatness, a spectral slope, a spectral kurtosis, a spectral flux, a spectral autocorrelation function, or any combination thereof, including combinations and modifications thereof.

The temperature features and/or the frequency domain features can then be used to determine a presence and/or extent of one or more events (e.g., a fluid inflow at one or more locations in a wellbore 114 and/or a fluid inflow rate thereof) at one or more locations along the length being monitored in step 506. The temperature features and/or the frequency domain features can be used in several ways to determine the presence and/or the extent of the one or more events along the length being monitored. In some embodiments, the temperature features can be used in the one or more first or wellbore event models to obtain an identification of one or more locations along the length having the event. Any of the models and methods of using the temperature features within the models as described herein can be used to determine the one or more event (e.g., fluid inflow) locations. As detailed hereinabove, the output of the one or more first or wellbore event models was utilized (e.g., at step 13 of FIG. 1) to provide labeled training data from which the one or more event models was trained, after which, the one or more wellbore event models and/or the one or more event models can be utilized alone or in combination with the one or more wellbore event models in the well or another well to provide an indication of one or more locations along the length being monitored (e.g., along the length of the wellbore) having at least one additional event in the or another wellbore.

In aspects, frequency domain features can be used in the trained one or more second event models to obtain an indication of the event extent (e.g., fluid inflow rate for one or more fluids and/or fluid phases) at the one or more locations along the length of the wellbore 114. In some embodiments, the one or more second event models can be limited to being executed at the one or more locations identified by the one or more first or wellbore event models. The one or more second event models can then predict the event extent(s) (e.g., fluid inflow rates of one or more fluids and/or fluid phases) at the one or more locations. The event extent(s) (e.g., fluid inflow rates) can then be representative of the event extents at the one or more locations along the length of the wellbore 144.

In some embodiments, subsequent to the training at 17, the output of the one or more first or wellbore event models and the one or more second event models can be combined to provide a combined output from the one or more first or wellbore event models and the one or more second event models to identify the at least one additional event at step 19. The resulting combined output can then be used to determine an event extent (e.g., a fluid inflow rate) at the one or more locations along the length of wellbore 114 being monitored as identified by the one or more first or wellbore event models. The combined output can be determined as a function of the output of the one or more first or wellbore event models and the output of the one or more second event models. Any suitable functions can be used to combine the outputs of the two models. This can include formulas, products, averages, and the like, each of which can comprise one or more constants or weightings to provide the final output. The ability to determine the event extent(s) as a function of the output of both models can allow for either model to override the output of the other model. For example, if the one or more first or wellbore event models indicate that a location along the length being monitored has an event, but the one or more second event models indicate no event, the resulting combined output may be considered to indicate that there is no event at that location. Similarly, if the one or more first or wellbore event models indicate a non-zero but low likelihood of an event at a location, the output can serve as a weighting to any event extents determined by the one or more second event models. Thus, a hybrid model approach can be utilized to provide two separate ways to verify and determine the event extents along the length (e.g., fluid inflow rates into the wellbore 114). Alternatively, subsequent to the training of the one or more second event models, the one or more second event models are utilized alone to identify the at least one additional event within the wellbore 114 at 19.

The resulting output of the one or more event model(s) (and/or the one or more wellbore event models) at 19 can be an indication of an event at one or more locations along the length. The event prediction can be for one or more events (e.g., one or more fluids (e.g., a gas, an aqueous liquid, a hydrocarbon liquid, etc.) and/or a fluid phase (e.g., a gas phase, a liquid phase, etc.)). The event extents can be used as indicated by the model in their form as output by the model. In some embodiments, the total event extents can be normalized across the one or more locations having the event. This can allow for a determination of a relative proportion of the event at each of the identified locations. This can be useful for understanding where the contributions to an event are occurring along the length, irrespective of the absolute event extent along the length.

In some embodiments, the event extents can be refined by using an independent measure of the event extent (e.g., fluid flow rate from the wellbore as measured at logging tool above the producing zones, a wellhead, surface flow line, or the like). Thus, as depicted in FIG. 6, method 500 can further comprise optional step 508 of independently measuring an event extent. For example, when the event comprises fluid inflow and the event extent comprises the fluid inflow rate, the fluid production rate can be measured by a standard fluid flowrate measurement tool that is not associated with the acoustic monitoring system or the temperature monitoring system within the wellbore 114. For example, the fluid production rate can be measured with various flow meters. The fluid production rate can comprise an indication of the fluid flow rates of one or more fluids and/or one or more fluid phases. The resulting event extent (e.g., fluid production rate) information can then be combined with the output of the models as described herein. In some embodiments, the resulting normalized event extents can be used with the actual event extents (e.g., production rates) to allocate the actual event extent (e.g., production rates) across the one or more event (e.g., fluid) inflow locations along the length being monitored (e.g., within the wellbore 114). Thus, method 500 of FIG. 6 can further comprise optional step 510 of allocating the event extent across the one or more locations. As an example, for events comprising fluid inflow and event extents comprising fluid inflow rates at one or more locations, if the model(s) indicate that thirty percent of a liquid phase inflow rate is occurring at a first location and seventy percent is occurring at a second location, the actual production rate can be allocated so that thirty percent of the produced liquid phase flowrate is attributed to the first location and the remaining seventy percent of the liquid phase flow rate is flowing into the wellbore at the second location. The allocations can be made for one or more of the fluid inflow rates and/or fluid phase inflow rates, where the actual production rates for the fluids and/or fluid phases can be used with the corresponding model outputs for one or more fluids and/or fluid phases. The allocation process can allow for an improved accuracy for the determination of fluid inflow rates at the one or more locations along the wellbore 114.

Figure 7:
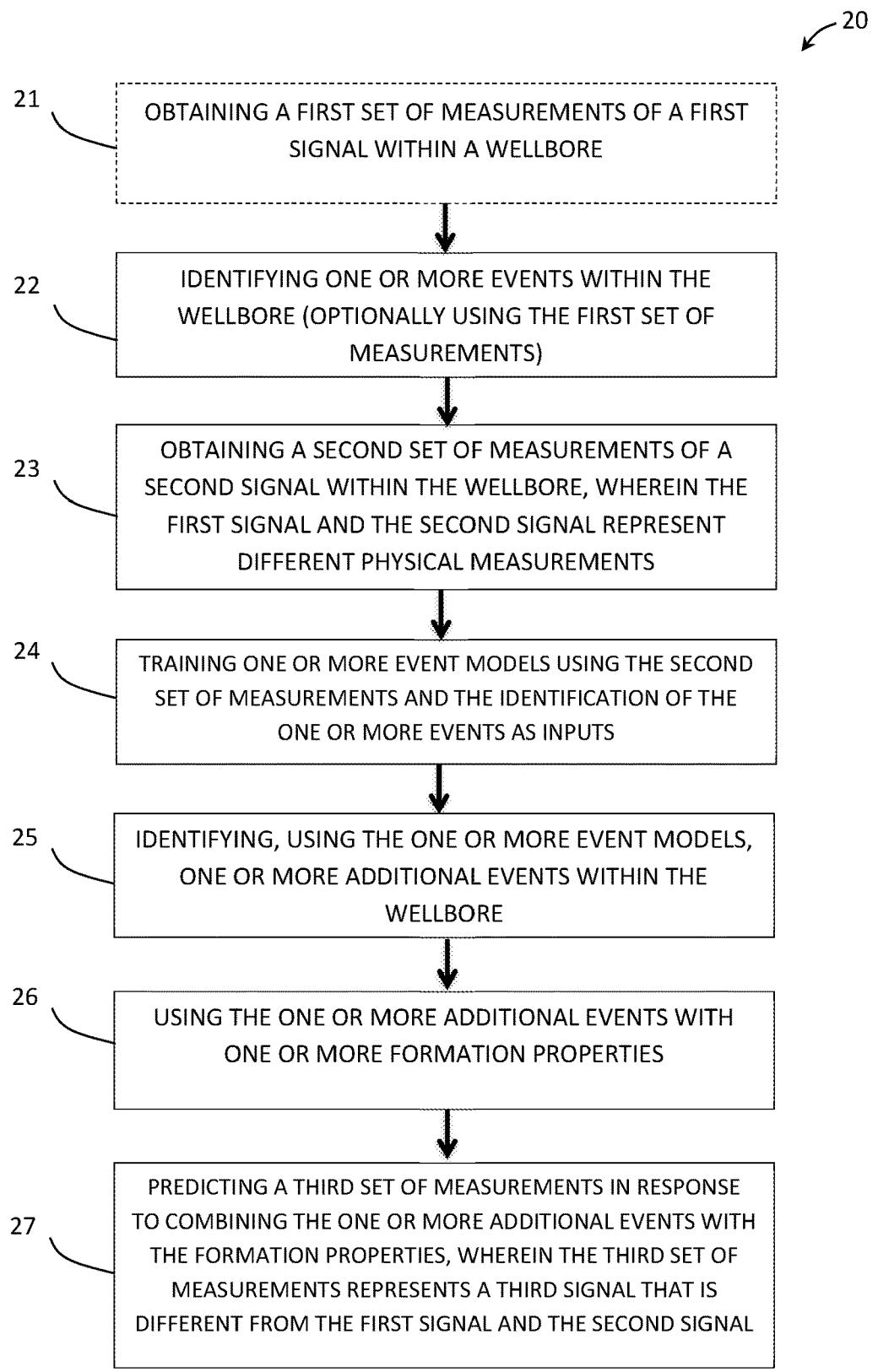
FIG. 7 is a flow diagram of a method of predicting wellbore sensor data according to some embodiments.

Also disclosed herein is a method of predicting wellbore sensor data. Description of such a method of predicting wellbore sensor data will now be made with reference to FIG. 7, which is a flow diagram of a method 20 of predicting wellbore sensor data according to some embodiments. As depicted in FIG. 7, method 20 comprises: obtaining a first set of measurements of a first signal within a wellbore 114 at 21; identifying one or more events within the wellbore 114 using the first set of measurements at 22; obtaining a second set of measurements of a second signal within the wellbore 114 at 23, wherein the first signal and the second signal represent different physical measurements; training one or more event models using the second set of measurements and the identification of the one or more events as inputs at 24; identifying, using the one or more event models, one or more additional events within the wellbore 114 at 25; using the one or more additional events with one or more formation properties at 26; and predicting a third set of measurements in response to combining the one or more additional events with the formation properties at 27, wherein the third set of measurements represents a third signal that is different than the first signal and the second signal. Steps 21, 22, 23, 24, and 25 correspond with and can be substantially as described hereinabove with reference to steps 11, 13, 15, 17, and 19, respectively, of FIG. 1.

In embodiments, a method of predicting wellbore sensor data according to this disclosure comprises: training one or more event models using a second set of measurements and an identification of one or more events as inputs, wherein a first set of measurements of a first signal are obtained within a wellbore 114, wherein one or more events within the wellbore 114 are identified using the first set of measurements, wherein the second set of measurements of a second signal are obtained within the wellbore 114, and wherein the first signal and the second signal represent different physical measurements; identifying, using the one or more event models, one or more additional events within the wellbore 114; using the one or more additional events with one or more formation properties; and predicting a third set of measurements in response to combining the one or more additional events with the formation properties, wherein the third set of measurements represents a third signal that is different than the first signal and the second signal.

The method of predicting wellbore sensor data according to this disclosure can further comprise: identifying, using the one or more event models, one or more additional events within the wellbore 114.

As noted above, the first signal and the second signal represent different physical measurements, and the third set of measurements represents a third signal that is different than the first signal and the second signal. For example, without limitation, in aspects, the third set of measurements can be predicted pressure measurements along the wellbore 114, or predicted flow measurements along the wellbore 114. As described hereinabove with regard to FIG. 1, the first set of measurements can comprise at least one of distributed temperature sensor (DTS) measurements, production logging tool (PLT) measurements, flow meter measurements, or pressure sensor measurements, and/or the second set of measurements can comprise acoustic measurements obtained within the wellbore 114. As detailed previously with reference to the method of even identification described with reference to FIG. 1, the one or more events can comprise inflow events, leak events, sand ingress events, or any combination thereof, and/or the first set of measurements and the second set of measurements can be obtained simultaneously or at different time intervals.

The method can further comprise creating labeled data using the identified one or more events and the second set of measurements. The rock properties can comprise porosity, permeability, or the like, provided, for example, as porosity or permeability logs, respectively.

By way of example, in aspects, the first set of measurements comprises DTS data and the second set of measurements comprises DAS data. The local or reference DTS data (e.g., first set of measurements) can be utilized as detailed hereinabove along with the DAS measurements (e.g., the second set of data) to train one or more event models. Once trained, the one or more trained event models can subsequently be utilized in the same or another well to predict and/or validate data. For example, in aspects, the DAS/DTS data are utilized as detailed herein to generate synthetic thermal profiles (e.g., predicted DTS data in another wellbore) and/or synthetic pressure data (e.g., DPS data) in the same or another well. The synthetic or predicted data can be utilized to cross check data obtained via another means or sensor. For example, predicted or synthetic flow logs from the one or more trained event models can be utilized to cross validate PLT data obtained in situ. Alternatively or additionally, DPS data predicted from the trained event models in combination with the rock properties can be utilized to cross check pressure measurements from one or more in situ pressure sensors. One of skill in the art and with the help of this disclosure will understand that the herein disclosed system and method can be utilized to predict a variety of wellbore sensor data, which can be utilized in many ways to enhance wellbore management, planning, and production.

Figure 8:
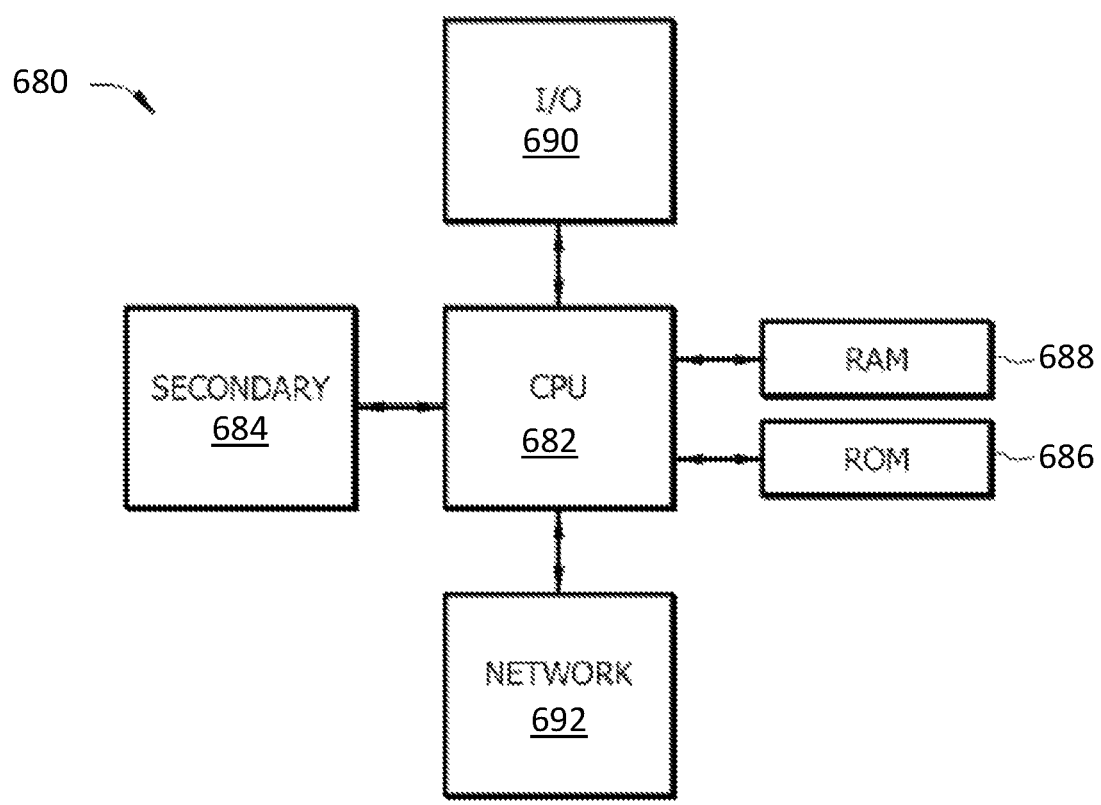
FIG. 8 schematically illustrates a computer that may be used to carry out various methods according to some embodiments.

Any of the systems and methods disclosed herein can be carried out on a computer or other device comprising a processor (e.g., a desktop computer, a laptop computer, a tablet, a server, a smartphone, or some combination thereof), such as the acquisition device 160 of FIG. 3. FIG. 8 illustrates a computer system 680 suitable for implementing one or more embodiments disclosed herein such as the acquisition device or any portion thereof. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 680 is turned on or booted, the CPU 682 may execute a computer program or application. For example, the CPU 682 may execute software or firmware stored in the ROM 686 or stored in the RAM 688. In some cases, on boot and/or when the application is initiated, the CPU 682 may copy the application or portions of the application from the secondary storage 684 to the RAM 688 or to memory space within the CPU 682 itself, and the CPU 682 may then execute instructions of which the application is comprised. In some cases, the CPU 682 may copy the application or portions of the application from memory accessed via the network connectivity devices 692 or via the I/O devices 690 to the RAM 688 or to memory space within the CPU 682, and the CPU 682 may then execute instructions of which the application is comprised. During execution, an application may load instructions into the CPU 682, for example load some of the instructions of the application into a cache of the CPU 682. In some contexts, an application that is executed may be said to configure the CPU 682 to do something, e.g., to configure the CPU 682 to perform the function or functions promoted by the subject application. When the CPU 682 is configured in this way by the application, the CPU 682 becomes a specific purpose computer or a specific purpose machine.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684. The secondary storage 684, the RAM 688, and/or the ROM 686 may be referred to in some contexts as computer readable storage media and/or non-transitory computer readable media.

I/O devices 690 may include printers, video monitors, electronic displays (e.g., liquid crystal displays (LCDs), plasma displays, organic light emitting diode displays (OLED), touch sensitive displays, etc.), keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 692 may enable the processor 682 to communicate with the Internet or one or more intranets. With such a network connection, it is contemplated that the processor 682 might receive information from the network, or might output information to the network (e.g., to an event database) in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several known methods. The baseband signal and/or signal embedded in the carrier wave may be referred to in some contexts as a transitory signal.

The processor 682 executes instructions, codes, computer programs, scripts which it accesses from hard disk, floppy disk, optical disk (these various disk based systems may all be considered secondary storage 684), flash drive, ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 684, for example, hard drives, floppy disks, optical disks, and/or other device, the ROM 686, and/or the RAM 688 may be referred to in some contexts as non-transitory instructions and/or non-transitory information.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data structures in part by directly accessing the computer program product, for example by reading from a CD-ROM disk inserted into a disk drive peripheral of the computer system 680. Alternatively, the processor 682 may process the executable instructions and/or data structures by remotely accessing the computer program product, for example by downloading the executable instructions and/or data structures from a remote server through the network connectivity devices 692. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

In some contexts, the secondary storage 684, the ROM 686, and the RAM 688 may be referred to as a non-transitory computer readable medium or a computer readable storage media. A dynamic RAM embodiment of the RAM 688, likewise, may be referred to as a non-transitory computer readable medium in that while the dynamic RAM receives electrical power and is operated in accordance with its design, for example during a period of time during which the computer system 680 is turned on and operational, the dynamic RAM stores information that is written to it. Similarly, the processor 682 may comprise an internal RAM, an internal ROM, a cache memory, and/or other internal non-transitory storage blocks, sections, or components that may be referred to in some contexts as non-transitory computer readable media or computer readable storage media.

Also disclosed herein is a system for identifying events within a wellbore 114. The system comprises: a memory (e.g., RAM 688, ROM 686); an identification program stored in the memory; and a processor 682, wherein the identification program, when executed on the processor 682, configures the process to: receive a first set of measurements of a first signal within a wellbore 114; identify one or more events within the wellbore 114 using the first set of measurements; receive a second set of measurements of a second signal within the wellbore 114, wherein the first signal and the second signal represent different physical measurements; train one or more event models using the second set of measurements and the identification of the one or more events as inputs; and use the one or more event models to identify at least one additional event within the wellbore 114.

As described hereinabove, in embodiments, the one or more events comprise inflow events, leak events, sand ingress events, or any combination thereof. The second set of measurements can comprise acoustic measurements from the wellbore 114, and/or the first set of measurements can be received from at least one of distributed temperature sensor (DTS) measurements, production logging tool (PLT) measurements, flow meter measurements, or pressure sensor measurements. The first set of measurements and the second set of measurements can be from a same time interval, or from different time intervals.

The processor 682 can be further configured to: create labeled data using the identified one or more events and the second set of measurements. In aspects, the processor 682 is further configured to: use the first set of measurements with one or more wellbore event models; and identify the one or more events with the one or more wellbore event models. In some such embodiments, the processor 682 can be further configured to: monitor the first signal within the wellbore 114; monitor the second signal within the wellbore 114; use the first signal in the one or more wellbore event models; use the second signal in the one or more event models; and detect the one or more events based on outputs of both the one or more wellbore event models and the one or more event models.

Also disclosed herein is a system for predicting wellbore sensor data. The system comprises: a memory (e.g., RAM 688, ROM 686); a prediction program stored in the memory; and a processor 682, wherein the prediction program, when executed on the processor 682, configures the process to: receive a first set of measurements of a first signal, wherein the first set of measurements originate from within a wellbore 114; identify one or more events within the wellbore 114 using the first set of measurements; receive a second set of measurements of a second signal, wherein the second set of measurements originate from within the wellbore 114, wherein the first signal and the second signal represent different physical measurements; train one or more event models using the second set of measurements and the identification of the one or more events as inputs; identify, using the one or more event models, one or more additional events within the wellbore 114; use the one or more additional events with one or more formation properties; and determine a third set of measurements in response to combining the one or more additional events with the formation properties, wherein the third set of measurements represent predicted physical parameters within the wellbore 114, wherein the third set of measurements represents a third signal that is different than the first signal and the second signal.

In aspects, the prediction program is further configured to: identify, using the one or more event models, one or more additional events within the wellbore 114. As noted hereinabove with reference to FIG. 7, the third set of measurements can be, for example, predicted pressure measurements along the wellbore 114, and/or predicted flow measurements along the wellbore 114. The second set of measurements can comprise acoustic measurements obtained within the wellbore 114. The one or more events can comprise inflow events, leak events, sand ingress events, or any combination thereof. The first set of measurements can comprise at least one of distributed temperature sensor (DTS) measurements, production logging tool (PLT) measurements, flow meter measurements, or pressure sensor measurements. The first set of measurements and the second set of measurements can be obtained simultaneously, or at different time intervals.

The prediction program can be further configured to: create labeled data using the identified one or more events and the second set of measurements.

As detailed hereinabove, a first set of measurements from a wellbore 114 can be utilized to train one or more event models operable with a second set of measurements from a wellbore 114. The first set of measurements and the second set of measurements can be obtained from the same wellbore 114, or another same or similar wellbore 114 (e.g., having a same completion type and/or in a same or similar formation). Utilizing local data as reference for training the one or more event models can simplify the use of the one or more event models and subsequently (i.e., after training the one or more event models), the trained one or more event models can be utilized alone or in conjunction with the first set of measurements (e.g., with one or more wellbore event models therefor) to identify at least one additional event in the or another wellbore 114. In aspects, the trained one or more event models can be utilized in conjunction with the first set of measurements (e.g., with one or more wellbore event models therefor) to provide additional information beyond information either the one or more event models or the one or more wellbore event models can provide independently, and/or to provide validation of the outputs from the one or more event models and/or the one or more wellbore event models. For example, when the first set of measurements comprises DTS data and the second set of measurements comprises DAS data, the one or more event models can be trained using the second set of measurements and the identification of the one or more events provided by the first set of measurements, and subsequently, the one or more trained event models can be utilized to determine the presence or absence of an influx of liquid along with influx of gas where the one or more wellbore event models (e.g., the DTS data) indicate influx of fluid, but cannot specify liquid and/or gas. In this manner, for example, influx of liquid can be decoupled from influx of gas. The system and method of identifying events in a wellbore as disclosed herein can thus be utilized to provide more information than can typically be provided by the one or more wellbore event models and/or the one or more event models alone, and/or can be utilized to build confidence in the outputs thereof.

Furthermore, the system and method of wellbore sensor data allows the first set of measurements and the second set of measurements to be utilized to predict a third set of measurements. For example, in aspects, the first set of measurements comprises DTS data and the second set of measurements comprises DAS data, and the DAS/DTS data are utilized as detailed herein to generate synthetic thermal profiles (e.g., predicted DTS data in another wellbore) and/or synthetic pressure data (e.g., DPS) data. For example, DTS data can be utilized to train one or more event models that utilize DAS measurements, and the trained model subsequently utilized in the or another well to predict and/or validate DPS data. In aspects, the synthetic or predicted data can be utilized to cross check data. For example, in aspects, predicted or synthetic pressure data can be utilized to cross validate obtained PLT data.

The herein disclosed systems and methods can be utilized within a well and/or across wells and/or fields to determine where to place additional wells and/or to optimize production from the well(s).

Having described various systems and methods, certain aspects can include, but are not limited to:

In a first aspect, a method of identifying events within a wellbore comprises: identifying one or more events within the wellbore; obtaining a first set of measurements comprising a first signal within the wellbore associated with the identified one or more event; training one or more event models using the second set of measurements and the identification of the one or more events as inputs; and using the one or more event models to identify at least one additional event.

A second aspect can include the method of the first aspect, further comprising: obtaining a second set of measurements comprising a second signal within a wellbore, wherein identifying the one or more events within the wellbore comprises identifying the one or more events within the wellbore using the second set of measurements, and wherein the first signal and the second signal represent different physical measurements.

A third aspect can include the method of the first or second aspect, wherein identifying the one or more events within the wellbore comprises using an identity of the one or more events based on a known event or induced event within the wellbore.

A fourth aspect can include the method of the first or second aspect, wherein the first set of measurements comprises acoustic measurements obtained within the wellbore.

A fifth aspect can include the method of any one of the first to fourth aspects, wherein the one or more events comprise a fluid inflow event a, a fluid outflow event, a fluid flow event within the wellbore, a fluid injection event, a fluid phase flow, a mixed phase flow, a leak event, a well integrity event, an, annular fluid flow event, an overburden event, a fluid induced hydraulic fracture event, sand detection event, or any combination thereof.

A sixth aspect can include the method of any one of the second to fifth aspects, wherein the second set of measurements comprise at least one of an acoustic sensor measurement, a temperature sensor measurement, a flow sensor measurement, a pressure sensor measurement, a strain sensor measurement, a position sensor measurement, a current meter measurement, a level sensor measurement, a phase sensor measurement, a composition sensor measurement, an optical sensor measurement, an image sensor measurement, or any combination thereof.

A seventh aspect can include the method of any one of the first to sixth aspects, further comprising: creating labeled data using the identified one or more events and the first set of measurements.

An eighth aspect can include the method of any one of the first to seventh aspects, wherein the first set of measurements and the second set of measurements are obtained simultaneously.

A ninth aspect can include the method of any one of the first to eighth aspects, wherein the first set of measurements and the second set of measurements are obtained at different time intervals.

A tenth aspect can include the method of any one of the second to ninth aspects, wherein identifying the one or more events comprises: using the second set of measurements with one or more wellbore event models; and identifying the one or more events with the one or more wellbore event models.

An eleventh aspect can include the method of the tenth aspect, further comprising: monitoring the first signal within the wellbore; monitoring the second signal within the wellbore; using the second signal in the one or more wellbore event models; using the first signal in the one or more event models; and detecting the at least one additional event based on outputs of both the one or more wellbore event models and the one or more event models.

A twelfth aspect can include the method of any one of the first to eleventh aspects, wherein the one or more event models are one or more pre-trained event models, and wherein training the one or more event models using the first set of measurements and the identification of the one or more events as inputs comprises: calibrating the one or more pre-trained event models using the first set of measurements and the identification of the one or more events as inputs; and updating at least one parameter of the one or more pre-trained event models in response to the calibrating.

A thirteenth aspect can include the method of any one of the first to twelfth aspects, further comprising: obtaining a third set of measurements comprising a third signal within a wellbore, wherein the third signal and the first signal represent different physical measurements, and wherein the third set of measurements represent the at least one additional event; and training one or more additional event models using the third set of measurements and the identification of the at least one addition event as inputs.

A fourteenth aspect can include the method of the thirteenth aspect, wherein identifying the one or more events within the wellbore using the first set of measurements comprises: using the one or more additional event models to identify the one or more events within the wellbore, and wherein training the one or more additional event models using the third set of measurements and the identification of the at least one additional event as inputs comprises: retaining the one or more additional event models using the third set of measurements and the identification of the at least one additional event as inputs.

In a fifteenth aspect, a system for identifying events within a wellbore comprises: a memory; an identification program stored in the memory; and a processor, wherein the identification program, when executed on the processor, configures the process to: identify one or more events within the wellbore; receive a first set of measurements of a first signal within the wellbore; train one or more event models using the first set of measurements and the identification of the one or more events as inputs; and use the one or more event models to identify at least one additional event.

A sixteenth aspect can include the system of the fifteenth aspect, wherein the identification program further configures the processor to: receive a second set of measurements comprising a second signal, wherein the identification of the one or more events within the wellbore comprises an identification of the one or more events within the wellbore based on the second set of measurements, and wherein the first signal and the second signal represent different physical measurements.

A seventeenth aspect can include the system of the fifteenth or sixteenth aspect, wherein the identification of the one or more events within the wellbore comprises receiving an identity of the one or more events based on a known event or induced event within the wellbore.

An eighteenth aspect can include the system of any one of the fifteenth to seventeenth aspects, wherein the first set of measurements comprise acoustic measurements from the wellbore.

A nineteenth aspect can include the system of any one of the fifteenth to eighteenth aspects, wherein the one or more events comprise a fluid inflow event a, a fluid outflow event, a fluid flow event within the wellbore, a fluid injection event, a fluid phase flow, a mixed phase flow, a leak event, a well integrity event, an, annular fluid flow event, an overburden event, a fluid induced hydraulic fracture event, sand detection event, or any combination thereof.

A twentieth aspect can include the system of any one of the fifteenth to nineteenth aspects, wherein the second set of measurements are received from at least one of an acoustic sensor, a temperature sensor, a flow sensor, a pressure sensor, a strain sensor, a position sensor, a current meter, a level sensor, a phase sensor, a composition sensor, an optical sensor, an image sensor, or any combination thereof.

A twenty first aspect can include the system of any one of the fifteenth to twentieth aspects, wherein the processor is further configured to: create labeled data using the identified one or more events and the first set of measurements.

A twenty second aspect can include the system of any one of the fifteenth to twenty first aspects, wherein the first set of measurements and the second set of measurements are from a same time interval.

A twenty third aspect can include the system of any one of the sixteenth to twenty first aspects, wherein the first set of measurements and the second set of measurements are from different time intervals.

A twenty fourth aspect can include the system of any one of the sixteenth to twenty third aspects, wherein the processor is further configured to: use the second set of measurements with one or more wellbore event models; and identify the one or more events with the one or more wellbore event models.

A twenty fifth aspect can include the system of the twenty fourth aspect, wherein the processor is further configured to: monitor the first signal within the wellbore; monitor the second signal within the wellbore; use the second signal in the one or more wellbore event models; use the first signal in the one or more event models; and detect the one or more events based on outputs of both the one or more wellbore event models and the one or more event models.

A twenty sixth aspect can include the system of any one of the fifteenth to twenty fifth aspects, wherein the one or more event models are one or more pre-trained event models, and wherein the processor is further configured to: calibrate the one or more pre-trained event models using the first set of measurements and the identification of the one or more events as inputs; and update at least one parameter of the one or more pre-trained event models in response to the calibrating.

In a twenty seventh aspect, a method of identifying events within a wellbore comprises: obtaining a first set of measurements of a first signal within a wellbore; identifying one or more events within the wellbore using the first set of measurements, wherein the one or more events comprise a gas phase inflow, a liquid phase inflow, or sand ingress into the wellbore; obtaining an acoustic data set from within the wellbore, wherein the first signal is not an acoustic signal; training one or more fluid inflow models using the acoustic data set and the identification of the one or more events as inputs; and using the trained one or more fluid inflow models to identify at least one additional fluid inflow event.

A twenty eighth aspect can include the method of the twenty seventh aspect, wherein the first set of measurements comprises distributed temperature sensor measurements.

A twenty ninth aspect can include the method of the twenty seventh or twenty eighth aspect, wherein the first set of measurements comprise production volumetric information.

A thirtieth aspect can include the method of any one of the twenty seventh to twenty ninth aspects, wherein identifying the one or more events within the wellbore comprises: identifying a first location having a first event of the one or more events; and identifying the first event at the first location using one or more wellbore event models.

A thirty first aspect can include the method of the thirtieth aspect, wherein training the one or more fluid inflow models comprises: obtaining acoustic data for the first location from the acoustic data set; and training the one or more fluid inflow models using the acoustic data for the first location and the identification of the first event at the first location.

A thirty second aspect can include the method of the thirty first aspect, wherein using the trained one or more fluid inflow models to identify the at least one additional fluid inflow event within the wellbore comprises using the one or more trained fluid inflow models to identify the at least one additional fluid inflow event along the length of the wellbore.

The embodiments disclosed herein have included systems and methods for identifying events and for predicting sensor data within a subterranean wellbore, or a plurality of such wellbores. Thus, through use of the systems and methods described herein, one may more effectively enhance the economic production therefrom.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of identifying events within a wellbore, the method comprising:
    obtaining a first set of measurements from a first sensor disposed in the wellbore;
    obtaining a second set of measurements comprising a second signal from a second sensor;
    identifying one or more events within the wellbore using the second set of measurements as inputs to one or more first event models, wherein the first set of measurements comprises a first signal within the wellbore associated with the identified one or more event, wherein the first signal and the second signal represent different physical measurements of different physical signals for the same one or more events;
    forming a labeled data set using the first set of measurements and the identification of the one or more events;
    training one or more second event models using the labeled data set, wherein the one or more second event models are configured to identify the same one or more events as the one or more first event models based on the different physical signals; and
    using the one or more second event models to identify at least one additional occurrence and location of the one or more events within the wellbore.

2. The method of claim 1, wherein the second signal is obtained within the wellbore.

3. The method of claim 1, wherein identifying the one or more events within the wellbore further comprises using an identity of the one or more events based on a known event or an induced event within the wellbore.

4. The method of claim 1, wherein the first set of measurements comprises acoustic measurements obtained within the wellbore.

5. The method of claim 1, wherein the one or more events comprise a fluid inflow event, a fluid outflow event, a fluid flow event within the wellbore, a fluid injection event, a fluid phase flow, a mixed phase flow, a leak event, a well integrity event, an, annular fluid flow event, an overburden event, a fluid induced hydraulic fracture event, sand detection event, or any combination thereof.

6. The method of claim 1, wherein the second set of measurements comprise at least one of an acoustic sensor measurement, a temperature sensor measurement, a flow sensor measurement, a pressure sensor measurement, a strain sensor measurement, a position sensor measurement, a current meter measurement, a level sensor measurement, a phase sensor measurement, a composition sensor measurement, an optical sensor measurement, an image sensor measurement, or any combination thereof.

7. The method of claim 1, wherein the first set of measurements and the second set of measurements are obtained simultaneously.

8. The method of claim 1, wherein the first set of measurements and the second set of measurements are obtained at different time intervals.

9. The method of claim 1, further comprising:
    monitoring the first signal within the wellbore;
    monitoring the second signal within the wellbore;
    using the second signal in the one or more first event models;
    using the first signal in the one or more second event models; and
    detecting the at least one additional event based on outputs of both the one or more first event models and the one or more second event models.

10. The method of claim 1, wherein the one or more second event models are one or more pre-trained event models, and wherein training the one or more second event models using the labeled data comprises:
    calibrating the one or more pre-trained event models using the first set of measurements and the identification of the one or more events as inputs; and
    updating at least one parameter of the one or more pre-trained event models in response to the calibrating.

11. The method of claim 1, further comprising:
    obtaining a third set of measurements comprising a third signal within a wellbore, wherein the third signal and the first signal represent different physical measurements of different physical signals, and wherein the third set of measurements represent the at least one additional event; and
    training one or more additional event models using the third set of measurements and the identification of the at least one addition event as inputs.

12. The method of claim 11, wherein identifying the one or more events within the wellbore using the first set of measurements comprises: using the one or more additional event models to identify the one or more events within the wellbore, and wherein training the one or more additional event models using the third set of measurements and the identification of the at least one additional event as inputs comprises: retaining the one or more additional event models using the third set of measurements and the identification of the at least one additional event as inputs.

13. A system for identifying events within a wellbore, the system comprising:
    a memory;
    an identification program stored in the memory; and
    a processor, wherein the identification program, when executed on the processor, configures the process to:
        receive, from a first sensor disposed in the wellbore, a first set of measurements of a first signal within the wellbore;
        receive, from a second sensor, a second set of measurements comprising a second signal;
        identify one or more events within the wellbore using the second set of measurements as inputs to one or more first event models, wherein the first signal is associated with the identified one or more event, and wherein the first signal and the second signal represent different physical measurements of different physical signals for the same one or more events;
        form a labeled data set using the first set of measurements and the identification of the one or more events;

train one or more second event models using the labeled data set wherein the one or more second event models are configured to identify the same one or more events as the one or more first event models based on the different physical signals; and use the one or more second event models to identify at least one additional occurrence and location of the one or more events within the wellbore.

14. The system of claim 13, wherein the identification of the one or more events within the wellbore further comprises receiving an identity of the one or more events based on a known event or induced event within the wellbore.

15. The system of claim 13, wherein the first set of measurements comprise acoustic measurements from the wellbore.

16. The system of claim 13, wherein the one or more events comprise a fluid inflow event, a fluid outflow event, a fluid flow event within the wellbore, a fluid injection event, a fluid phase flow, a mixed phase flow, a leak event, a well integrity event, an, annular fluid flow event, an overburden event, a fluid induced hydraulic fracture event, sand detection event, or any combination thereof.

17. The system of claim 13, wherein the second set of measurements are received from at least one of an acoustic sensor, a temperature sensor, a flow sensor, a pressure sensor, a strain sensor, a position sensor, a current meter, a level sensor, a phase sensor, a composition sensor, an optical sensor, an image sensor, or any combination thereof.

18. The system of claim 13, wherein the first set of measurements and the second set of measurements are from a same time interval.

19. The system of claim 13, wherein the first set of measurements and the second set of measurements are from different time intervals.

20. The system of claim 13, wherein the processor is further configured to:

monitor the first signal within the wellbore;

monitor the second signal within the wellbore;

use the second signal in the one or more first event models;

use the first signal in the one or more second event models; and detect the one or more events based on outputs of both the one or more first event models and the one or more second event models.

21. The system of claim 13, wherein the one or more event models are one or more pre-trained event models, and wherein the processor is further configured to:

calibrate the one or more pre-trained event models using the first set of measurements and the identification of the one or more events as inputs; and update at least one parameter of the one or more pre-trained event models in response to the calibrating.

22. A method of identifying events within a wellbore, the method comprising:

identifying one or more events within the wellbore;

obtaining a first set of measurements from a sensor disposed in the wellbore, wherein the first set of measurements comprises a first signal from within the wellbore caused by the identified one or more event, wherein the first signal represents a first physical measurements at a location of the one or more events obtained during an occurrence of the one or more events;

forming a labeled data set using the first set of measurements and the identification of the one or more events;

training one or more event models using the labeled data set; and using the one or more event models to identify at least one additional occurrence and location of the one or more events within the wellbore.

23. The method of claim 22, further comprising:

obtaining a second set of measurements comprising a second signal within the wellbore, wherein identifying the one or more events within the wellbore comprises identifying the one or more events within the wellbore using the second set of measurements, and wherein the first signal and the second signal represent different physical measurements of different physical signals.

24. The method of claim 22, wherein identifying the one or more events within the wellbore comprises using an identity of the one or more events based on a known event or an induced event within the wellbore.

25. The method of claim 22, wherein the one or more events comprise a gas phase inflow, a liquid phase inflow, or sand ingress into the wellbore.

* * * * *